(12) United States Patent
Tsurukawa

(10) Patent No.: US 7,744,294 B2
(45) Date of Patent: Jun. 29, 2010

(54) LENS BARREL, CAMERA, PORTABLE INFORMATION TERMINAL DEVICE, AND IMAGE INPUT DEVICE

(75) Inventor: Ikuya Tsurukawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 11/905,476

(22) Filed: Oct. 1, 2007

(65) Prior Publication Data
US 2008/0080853 A1    Apr. 3, 2008

(30) Foreign Application Priority Data
Oct. 3, 2006    (JP)    ............................. 2006-271924

(51) Int. Cl.
   *G03B 17/04*    (2006.01)
   *G02B 15/14*    (2006.01)
   *G02B 7/02*    (2006.01)
(52) U.S. Cl. ...................... 396/349; 348/335; 359/700; 359/826
(58) Field of Classification Search ................. 396/349, 396/348, 529; 348/335, 207.99; 359/642, 359/699, 700, 703, 826
See application file for complete search history.

(56) References Cited
U.S. PATENT DOCUMENTS
4,506,965 A    3/1985   Kitajima et al.
4,653,885 A    3/1987   Araki et al.
4,720,720 A    1/1988   Araki et al.
4,922,281 A    5/1990   Kitajima
4,947,202 A    8/1990   Kitajima et al.
5,069,543 A    12/1991  Kitajima et al.
2003/0231291 A1    12/2003    Kitajima et al.
2006/0061891 A1*    3/2006    Ito et al. ..................... 359/824
2006/0209192 A1*    9/2006    Shinohara et al. ...... 348/207.99

FOREIGN PATENT DOCUMENTS
| JP | 2003-149723 | 5/2003 |
| JP | 2003-315861 | 11/2003 |
| JP | 2006-330657 | 12/2006 |

\* cited by examiner

*Primary Examiner*—Rochelle-Ann J Blackman
(74) *Attorney, Agent, or Firm*—Dickstein Shapiro LLP

(57) ABSTRACT

Provided is a lens barrel configured to avoid deviation of a retracting lens holder frame and a retracting lens holder frame driving member from regular position. Also provided are a camera, a portable information terminal device, and an image input device, all of which use this lens barrel. With the above devices, even when normal cam engagement is damaged by occurrence of drop impact or the like, it is possible to secure normal driving of the retracting lens holder frame and to reduce malfunction of the retracting lens holder frame.

8 Claims, 40 Drawing Sheets

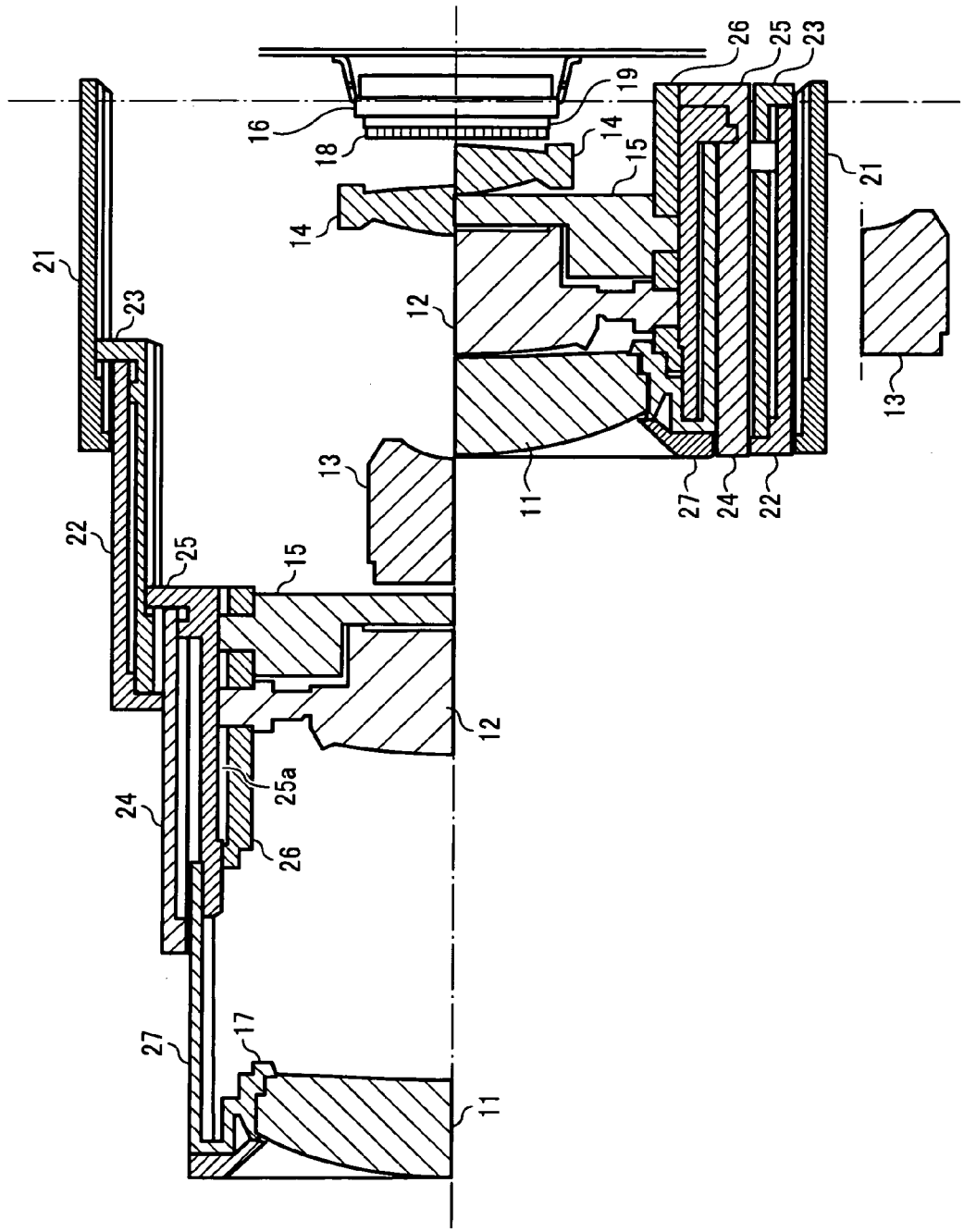

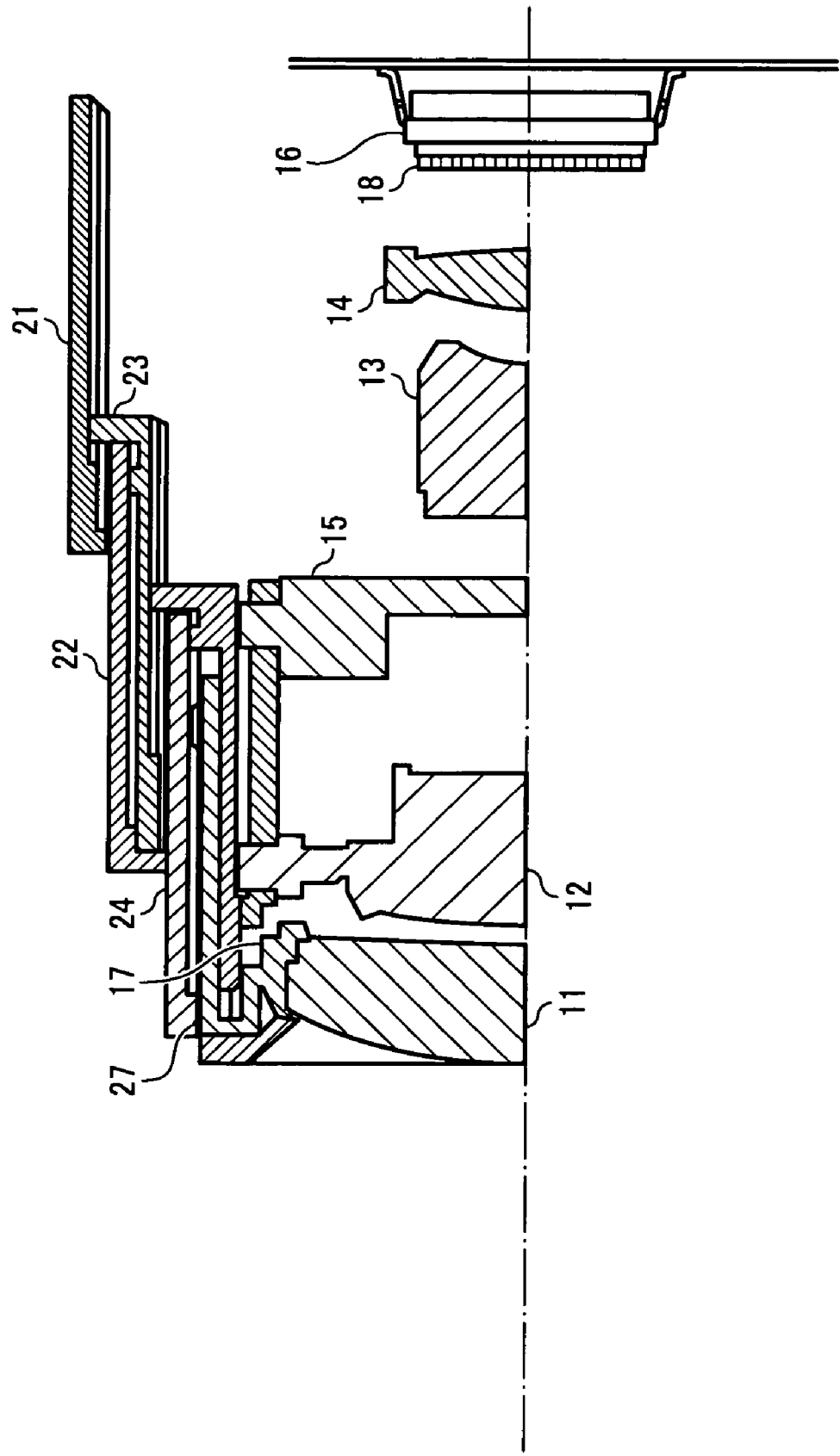

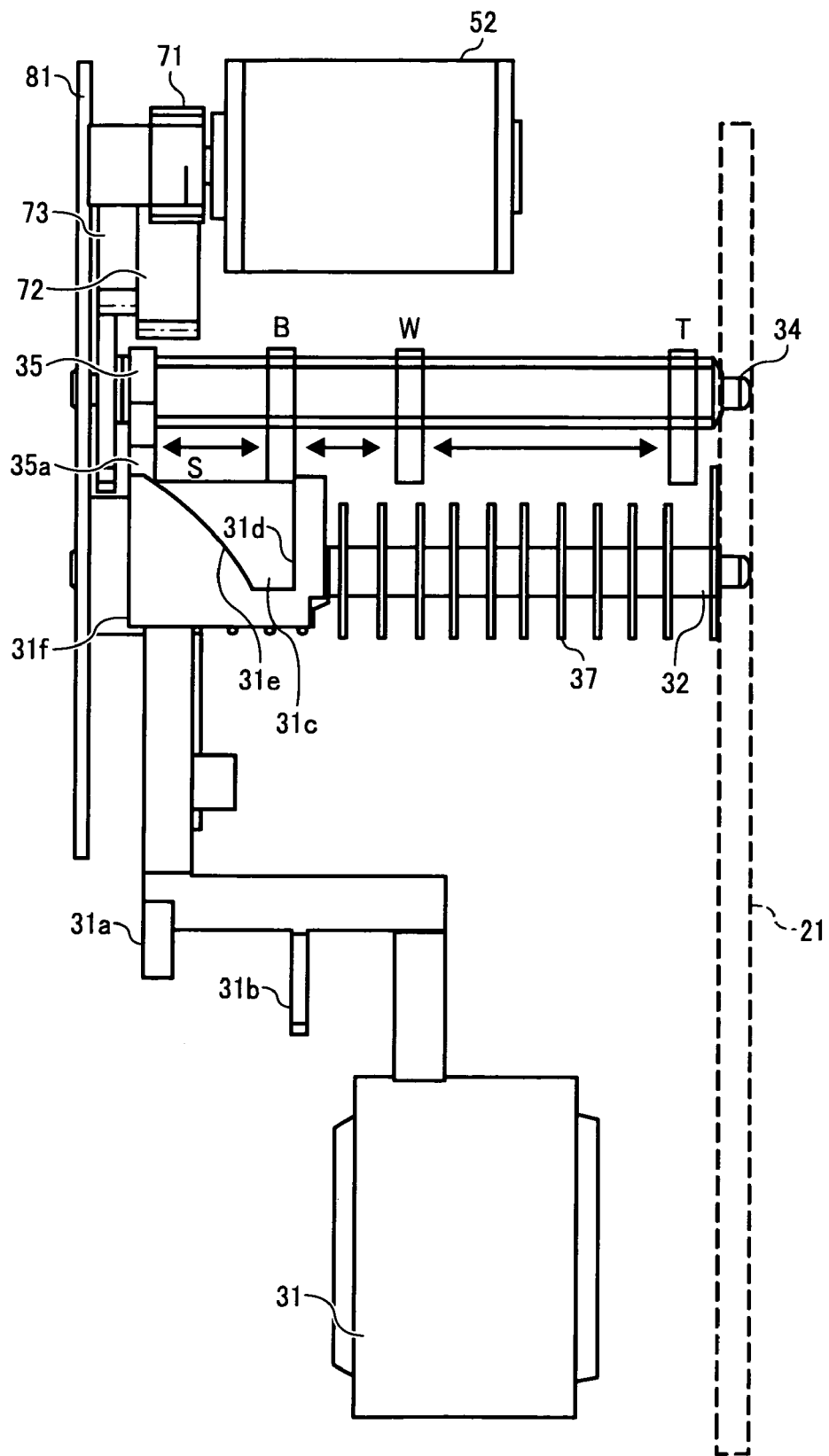

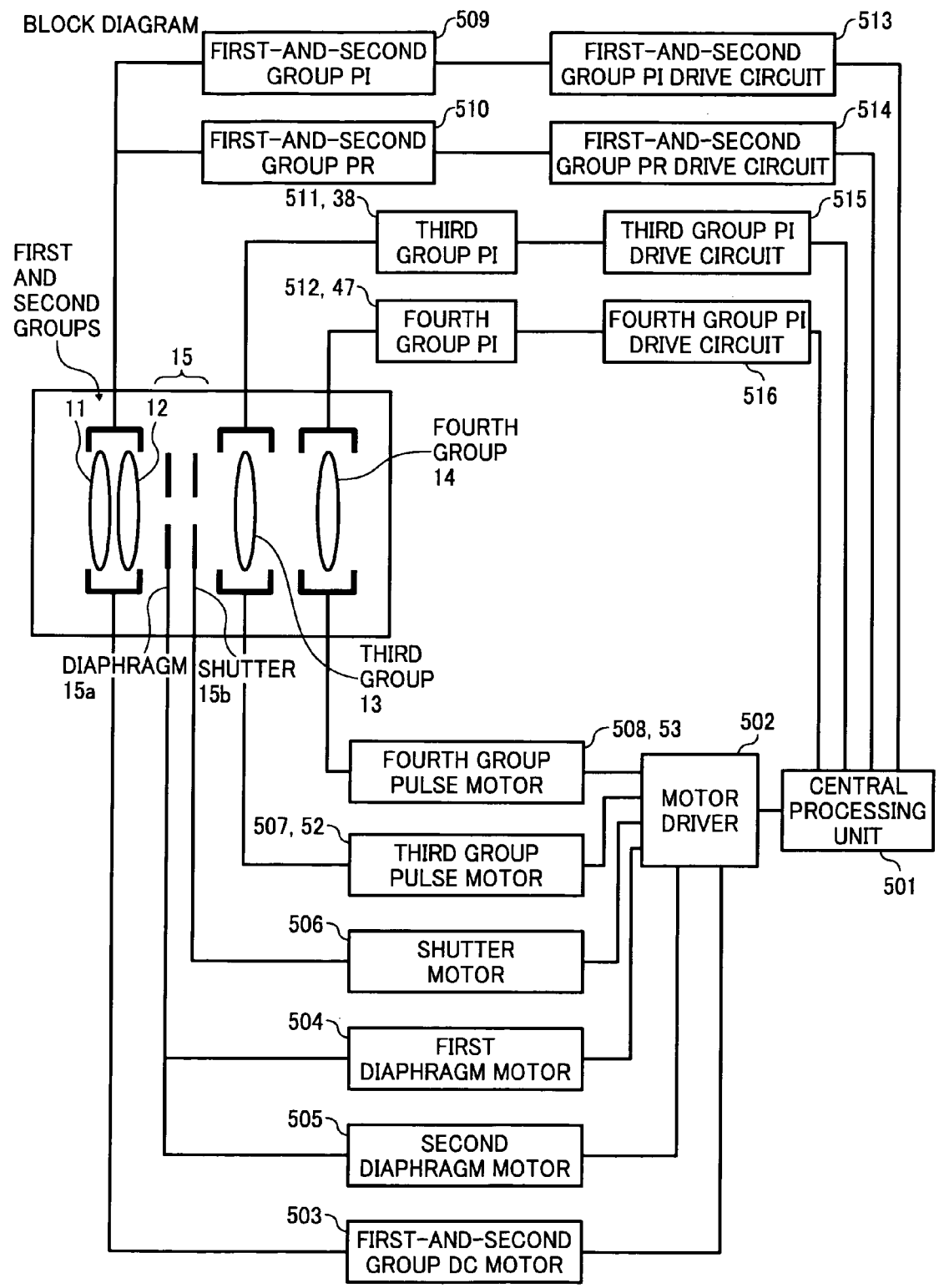

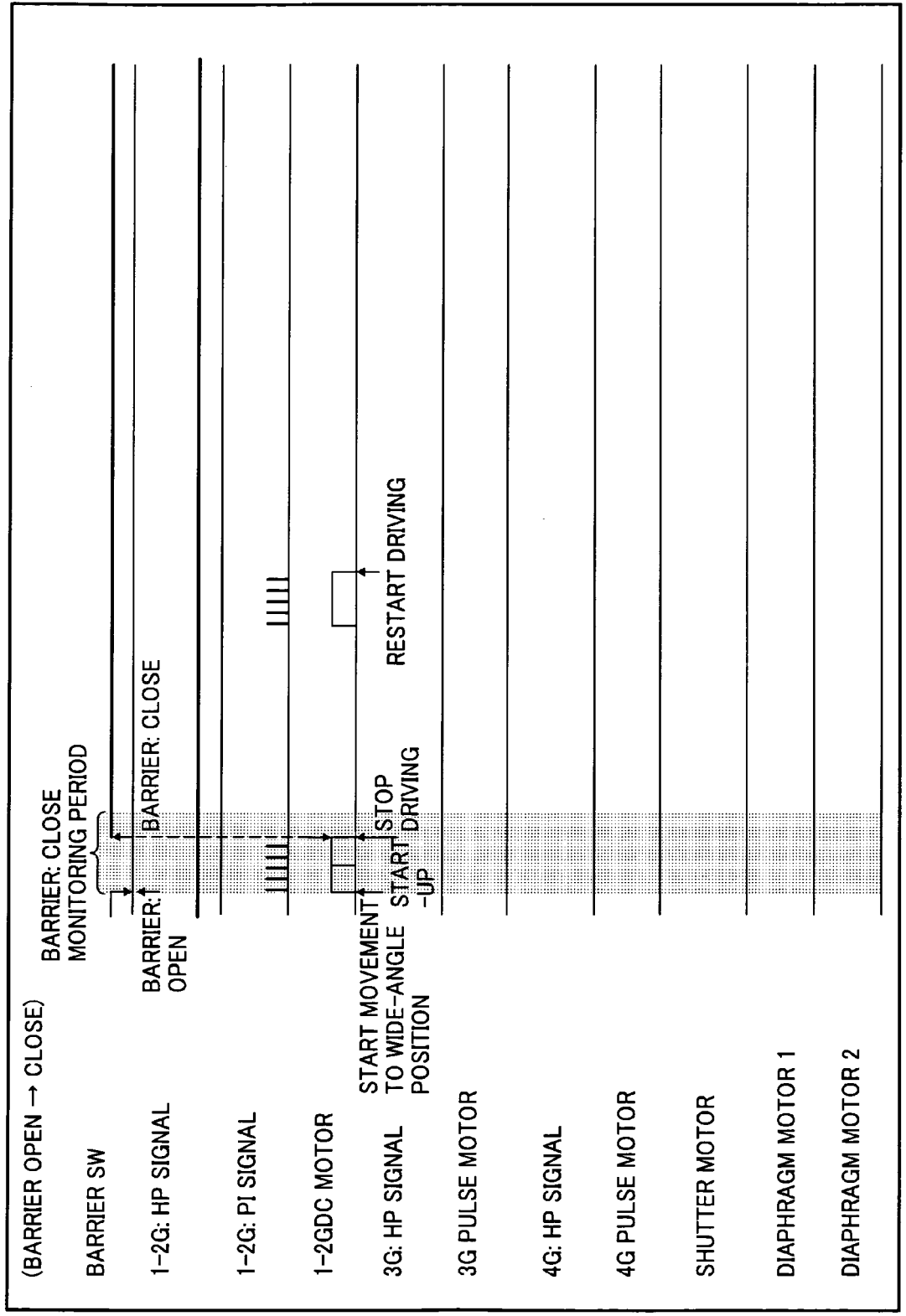

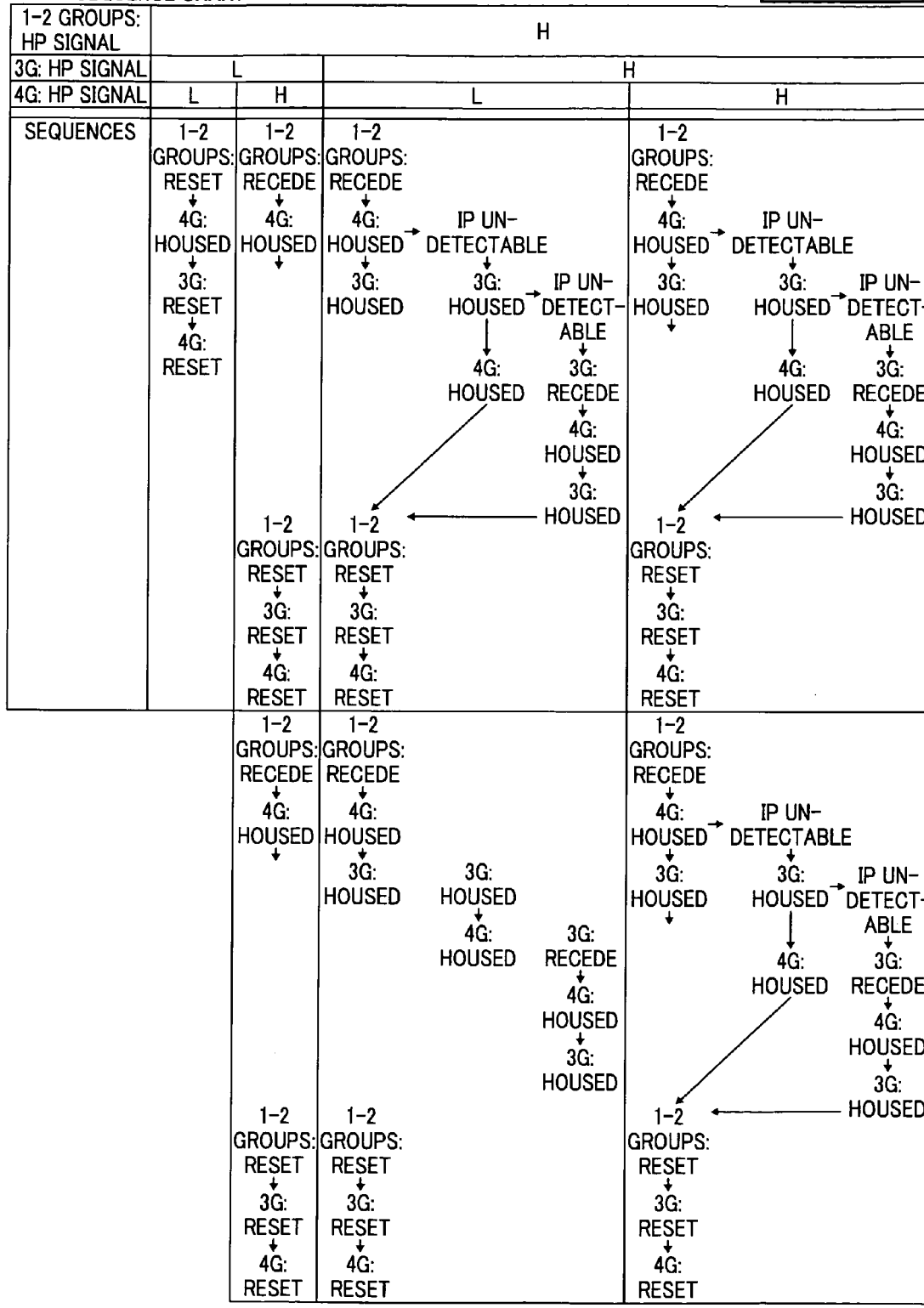

FIG. 24A2
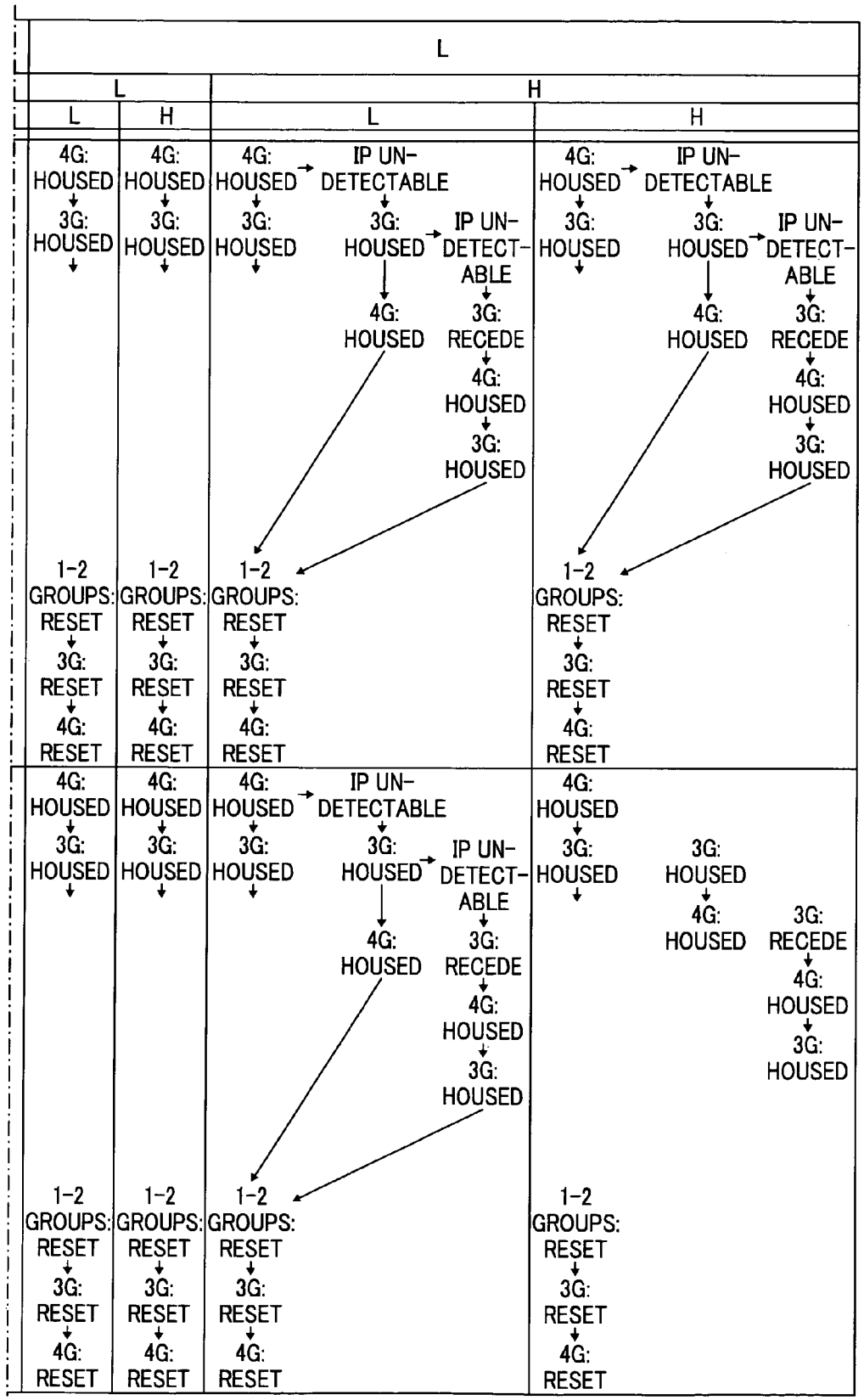

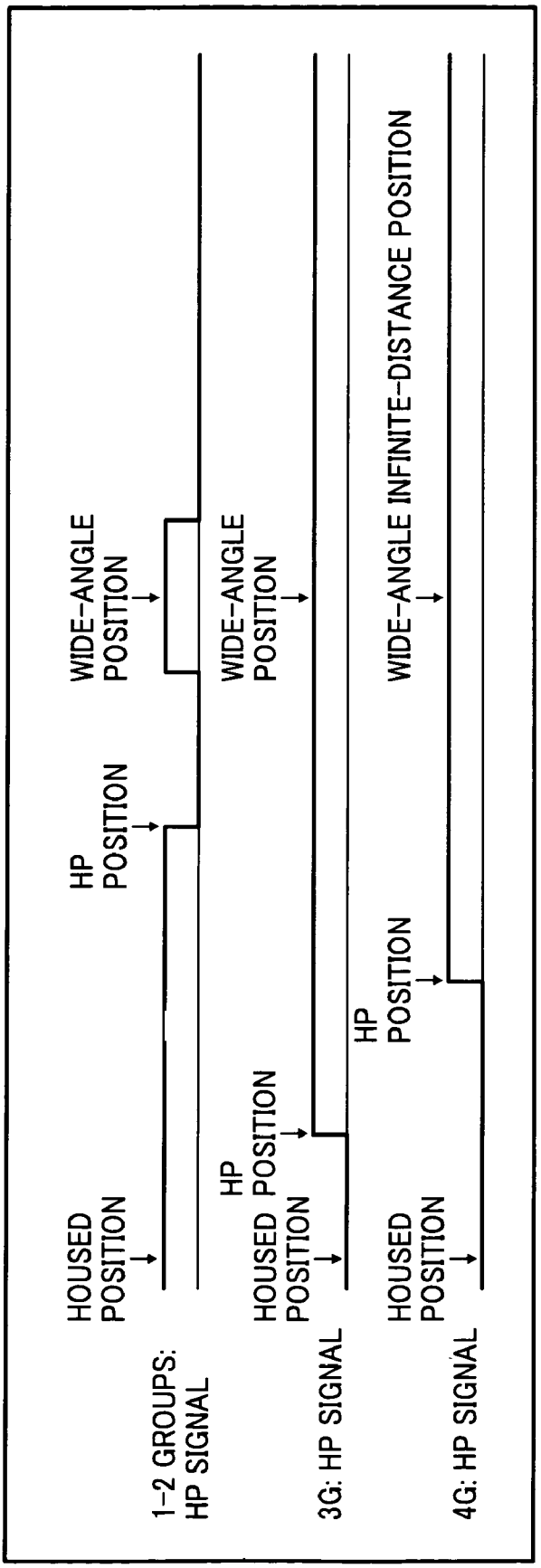

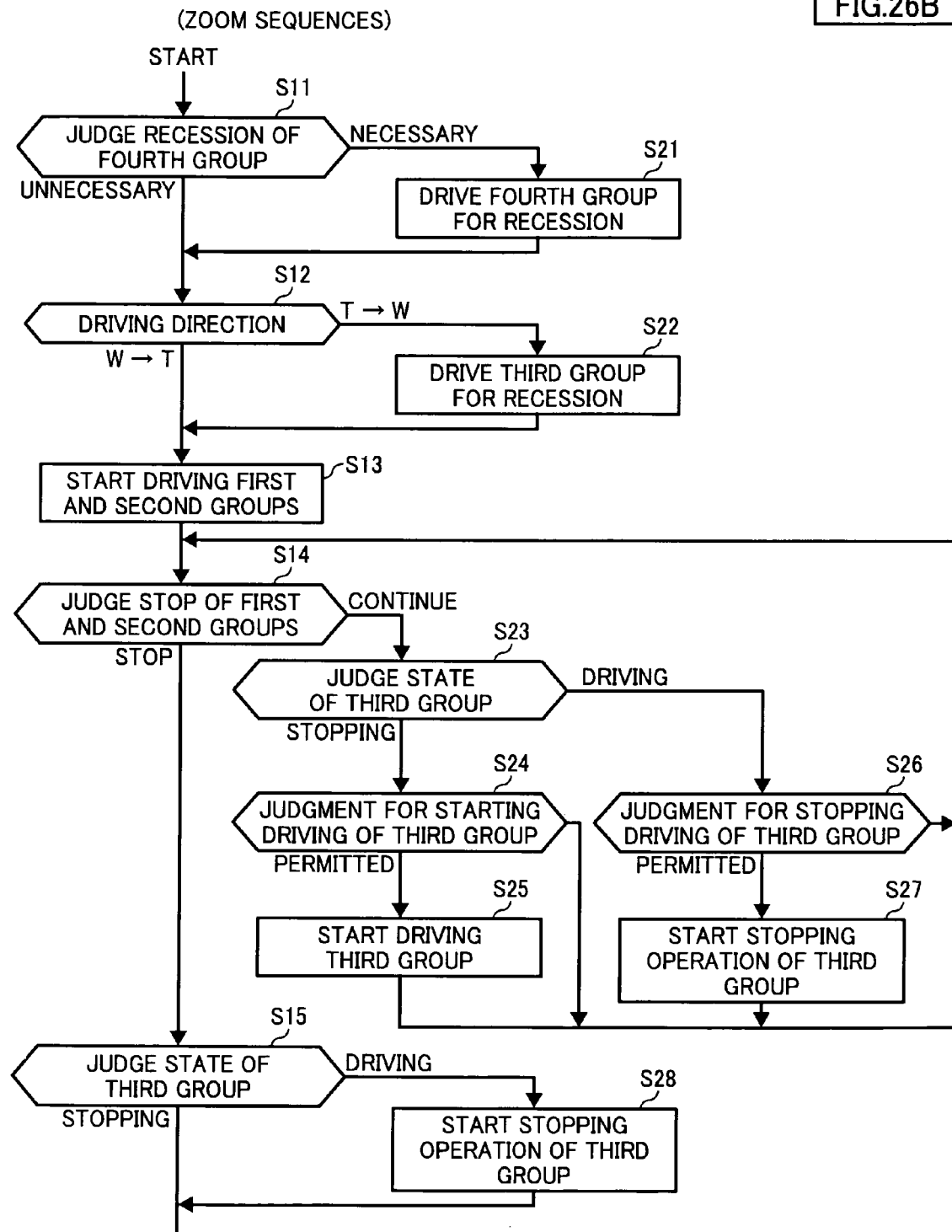
FIG. 26A (ZOOM SEQUENCES)

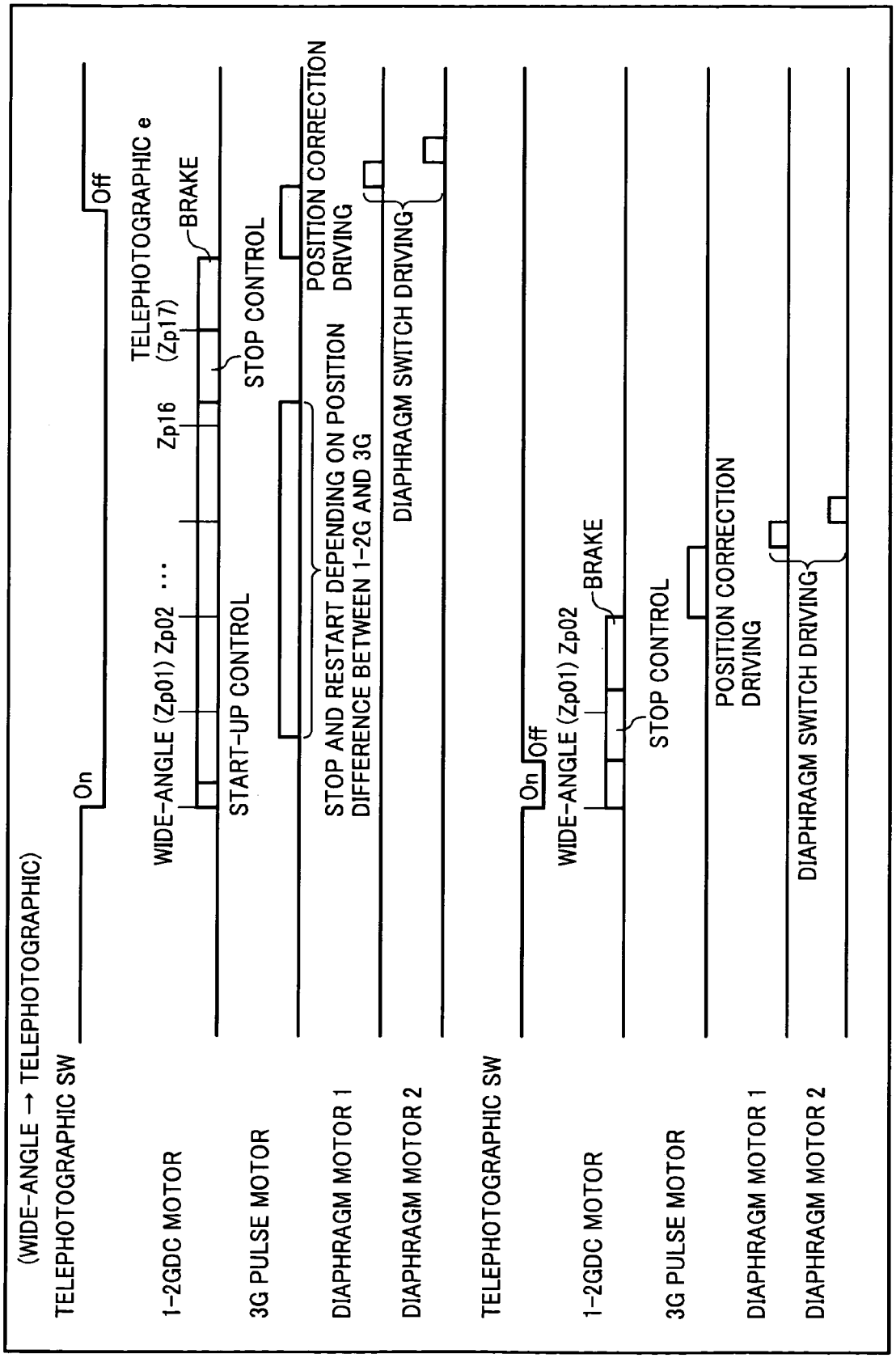

LENS BARREL, CAMERA, PORTABLE INFORMATION TERMINAL DEVICE, AND IMAGE INPUT DEVICE

PRIORITY CLAIM

The present application is based on and claims priority from Japanese Application Number 2006-271924, filed on Oct. 3, 2006, the disclosure of which is incorporated herein by reference in its entirety.

BACKGROUND OF THE INVENTION

1. Field of the Invention

This invention relates to a lens barrel to be used while collapsing a lens group in one aspect and while extending the lens group to predetermined positions in another aspect. More specifically, this invention relates to a lens barrel suitable for a zoom lens capable of changing a focal length by relatively moving multiple lens groups, and also relates to a camera, a portable information terminal device, and an image input device.

2. Description of the Related Art

In terms of an image-taking apparatus such as a digital camera, along with higher performance of image-taking lenses such as zoom lenses and progress in miniaturization required by users, there is a growing demand for an image-taking lens of a retractable type configured to collapse a movable lens barrel into a camera main body when no image is taken.

In addition, due to an increasing demand for a thin camera main body (an image-taking apparatus), it is deemed important to minimize dimensions of a movable lens barrel in a direction of an image-taking optical axis when the lens barrel is collapsed and housed.

To meet such a demand for a thin camera main body, Japanese Patent Application Laid-open Publication Nos. 2003-315861 and 2003-149723 disclose techniques for displacing at least part of lens groups away from an image-taking optical axis when collapsing and housing a movable lens barrel into a camera main body.

According to these techniques, some of the lens groups are displaced away from the image-taking optical axis when housing the movable lens barrel. Therefore, it is possible to minimize dimensions of the movable lens barrel in a direction of an image-taking optical axis, and thereby to achieve a thin camera main body (a main unit of an image-taking apparatus).

However, according to the techniques disclosed in Japanese Patent Application Laid-open Publication Nos. 2003-315861 and 2003-149723, a retracting position of the lens group away from the image-taking optical axis is virtually located within a maximum outer diameter of a fixed barrel of the camera main body. Therefore, these conventional techniques can reduce dimensions in the direction of the image-taking optical axis when the movable lens barrel is housed, but causes an increase in the outer diameter of the fixed barrel. Hence these techniques have inconvenience that the size of the fixed barrel becomes relatively large when the camera main body (the image-taking apparatus) is viewed from a front side (from an object's side).

Accordingly, there has been disclosed a lens barrel configured to change from a collapsed state, in which at least part of multiple lens groups is collapsed to be housed in a main body, to an image-taking state, in which at least part of the lens groups is moved toward an object. This technique provides the lens barrel including multiple lens holder frames each configured to hold each of the multiple lens groups, a movable lens barrel configured to hold the lens holder frames inside, and lens holder frame driving means for driving the lens holder frames through the movable lens barrel. Here, in the image-taking state, the lens holder frames are configured to locate all the lens groups on an image-taking optical axis. On the other hand, in the collapsed state, the lens holder frames are configured to allow at least one lens group to retract into a position away from the image-taking optical axis, and to retract outside a maximum outer diameter of the movable lens barrel of another lens group. For this reason, the lens barrel includes a retracting lens holder frame configured to hold and move the two lens groups.

In this lens barrel, a cam is formed on the retracting lens holder configured to hold the retracting lens group in order to move at least part of the lens groups into the image-taking optical axis, to allow part of the lens group to retract away from the image-taking optical axis, and to move the lens group along the image-taking optical axis at the time of image-taking. Here, the cam has a shape capable of moving the retracting lenses to an image-taking position, and to a housed position by use of a retracting lens holder frame driving pin.

However, if a drop impact or the like is applied to the camera main body (a main body of an image-taking apparatus) when the retracting lens holder frames are located in the retracting position, the retracting lens holder frames and the retracting lens holder frame driving pin may be disengaged from the cam and normal drive may be disabled thereafter. Hence there has been a risk of inconvenience that it is not possible to recover the normal state unless the camera is overhauled.

SUMMARY OF THE INVENTION

An object of the present invention is to provide a lens barrel capable of avoiding disengagement of a retracting lens holder frame and a retracting lens holder frame driving member from a cam, and also to provide a camera, a portable information terminal, and an image input device, all of which use this lens barrel.

To attain the object, according to a first aspect of this invention, there is provided a lens barrel configured to change from a collapsed state, in which at least part of multiple lens groups is collapsed to be housed in a main body, to an image-taking state, in which at least part of the lens groups is moved toward an object. Here, the lens barrel includes: a retracting lens formed of at least part of the lens groups, located on the same optical axis as an optical axis of the rest of the lens groups in an image-taking state, and configured to retract to a housed position outside an inner diameter of the lens barrel in a collapsed state; a retracting lens holder frame configured to hold and move the retracting lens; a retracting lens holder frame driving member configured to drive the retracting lens holder frame held inside the lens barrel; a cam portion being formed on the retracting lens holder frame, and having a cam shape so as to drive the retracting lens to an image-taking position and to the housed position by utilizing the retracting lens holder frame driving member; and a stopper provided on the retracting lens holder frame driving member, and configured to prevent the retracting lens holder frame driving member from exceeding a housing region in the cam shape and from moving outside the cam portion on the retracting lens holder frame.

According to a second aspect of this invention, there is provided the lens barrel in which the stopper controls the movement of the retracting lens holder frame driving member so that a stop position of the driving member is the housed position in the cam shape.

According to a third aspect of this invention, there is provided the lens barrel further including a position detecting device configured to detect a position of the retracting lens holder frame driving member. Here, the stopper controls the movement of the retracting lens holder frame driving member so that a stop position of the driving member is the housed position in the cam shape, on the basis of the detected position.

According to a fourth aspect of this invention, there is provided the lens barrel still further including a rotational direction control mechanism in a rotational direction of the retracting lens holder frame driving member. Here, the stopper controls the rotational direction of the retracting lens holder frame driving member so that a stop position of the driving member is the housed position in the cam shape.

According to a fifth aspect of this invention, there is provided a camera including a lens barrel configured to change from a collapsed state, in which at least part of multiple lens groups is collapsed to be housed in a main body, to an image-taking state, in which at least part of the lens groups is moved toward an object. Here, the camera includes: a retracting lens formed of at least part of the lens groups, located on the same optical axis as an optical axis of the rest of the lens groups in an image-taking state, and configured to retract to a housed position outside an inner diameter of the lens barrel in a collapsed state; a retracting lens holder frame configured to hold and move the retracting lens; a retracting lens holder frame driving member configured to drive the retracting lens holder frame held inside the lens barrel; a cam portion being formed on the retracting lens holder frame and having a cam shape so as to drive the retracting lens to an image-taking position and to the housed position by utilizing the retracting lens holder frame driving member; and a stopper provided on the retracting lens holder frame driving member, and configured to prevent the retracting lens holder frame driving member from exceeding a housing region in the cam shape and from moving outside the cam portion on the retracting lens holder frame.

According to a sixth aspect of this invention, there is provided a digital camera including a lens barrel configured to change from a collapsed state, in which at least part of multiple lens groups is collapsed to be housed in a main body, to an image-taking state, in which at least part of the lens groups is moved toward an object. Here, the digital camera includes: a retracting lens formed of at least part of the lens groups, located on the same optical axis as an optical axis of the rest of the lens groups in an image-taking state, and configured to retract to a housed position outside an inner diameter of the lens barrel in a collapsed state; a retracting lens holder frame configured to hold and move the retracting lens; a retracting lens holder frame driving member configured to drive the retracting lens holder frame held inside the lens barrel; a cam portion being formed on the retracting lens holder frame and having a cam shape so as to drive the retracting lens to an image-taking position and to the housed position by utilizing the retracting lens holder frame driving member; and a stopper provided on the retracting lens holder frame driving member, and configured to prevent the retracting lens holder frame driving member from exceeding a housing region in the cam shape and from moving outside the cam portion on the retracting lens holder frame.

According to a seventh aspect of this invention, there is provided a portable information terminal device including a lens barrel configured to change from a collapsed state, in which at least part of multiple lens groups is collapsed to be housed in a main body, to an image-taking state, in which at least part of the lens groups is moved toward an object. Here, the portable information terminal device includes: a retracting lens formed of at least part of the lens groups, located on the same optical axis as an optical axis of the rest of the lens groups in an image-taking state, and configured to retract to a housed position outside an inner diameter of the lens barrel in a collapsed state; a retracting lens holder frame configured to hold and move the retracting lens; a retracting lens holder frame driving member configured to drive the retracting lens holder frame held inside the lens barrel; a cam portion being formed on the retracting lens holder frame and having a cam shape so as to drive the retracting lens to an image-taking position and to the housed position by utilizing the retracting lens holder frame driving member; and a stopper provided on the retracting lens holder frame driving member, and configured to prevent the retracting lens holder frame driving member from exceeding a housing region in the cam shape and from moving outside the cam portion on the retracting lens holder frame.

According to an eighth aspect of this invention, there is provided an image input device including a lens barrel configured to change from a collapsed state, in which at least part of multiple lens groups is collapsed to be housed in a main body, to an image-taking state, in which at least part of the lens groups is moved toward an object. Here, the image input device includes: a retracting lens formed of at least part of the lens groups, located on the same optical axis as an optical axis of the rest of the lens groups in an image-taking state, and configured to retract to a housed position outside an inner diameter of the lens barrel in a collapsed state; a retracting lens holder frame configured to hold and move the retracting lens; a retracting lens holder frame driving member configured to drive the retracting lens holder frame held inside the lens barrel; a cam portion being formed on the retracting lens holder frame and having a cam shape so as to drive the retracting lens to an image-taking position and to the housed position by utilizing the retracting lens holder frame driving member; and a stopper provided on the retracting lens holder frame driving member, and configured to prevent the retracting lens holder frame driving member from exceeding a housing region in the cam shape and from moving outside the cam portion on the retracting lens holder frame.

BRIEF DESCRIPTION OF THE DRAWINGS

The above and other objects, features and advantages of the present invention will become more apparent from the following description taken in connection with the accompanying drawings.

FIG. 9A is a vertical cross-sectional view showing main portions of each of the lens groups of the lens barrel, the lens holder frames, and the lens barrel, in which an upper half portion above a lens optical axis line shows the image-taking state where each lens group is protruded to a telephotographic position, while a lower half portion below the line shows the collapsed and housed state of each lens group.

FIG. 9B is a vertical cross-sectional view showing main portions of each of the lens groups of the lens barrel, the lens holder frames, and the lens barrel, in which an upper half portion above a lens optical axis line shows the image-taking state where each lens group is protruded to a wide-angle position, while a lower half portion below the line shows the collapsed and housed state of each lens group.

FIG. 14A is a side view showing configurations of the third lens holder frame and a drive operation system thereof.

FIG. 21 is a block diagram schematically showing a configuration of a drive control system.

FIG. 23 is a timing chart showing sequences from the time of opening the barrier to the time of closing the barrier in the start-up sequences.

FIGS. 24A1 and 24A2 are a chart for explaining reset sequences.

FIG. 24B is a timing chart for explaining the reset sequences.

FIG. 27 is a timing chart showing zoom sequences at the time of zooming from the telephotographic position to the wide-angle position.

FIGS. 81A to 31C are explanatory diagrams for operations in the first embodiment to prevent an abutting portion of a third group female screw member from coming off from a cam when receiving drop impact or the like.

FIGS. 32A and 32B are explanatory diagrams for operation of a camera according to a second embodiment to prevent the abutting portion of the third group female screw member from coming off from the cam when receiving drop impact or the like.

DESCRIPTION OF THE PREFERRED EMBODIMENTS

Now, first and second embodiments of a lens barrel according to the present invention will be described below with reference to the accompanying drawings. It is to be noted that the following items disclosed in conjunction with the invention and the accompanying drawings are merely intended to constitute certain embodiments and will not limit the technical scope of the present invention.

FIG. 1 to FIG. 16B and FIGS. 20A and 20B show configurations of main portions as well as various operating states of an optical device including a lens barrel according to the present invention.

Figure 1:
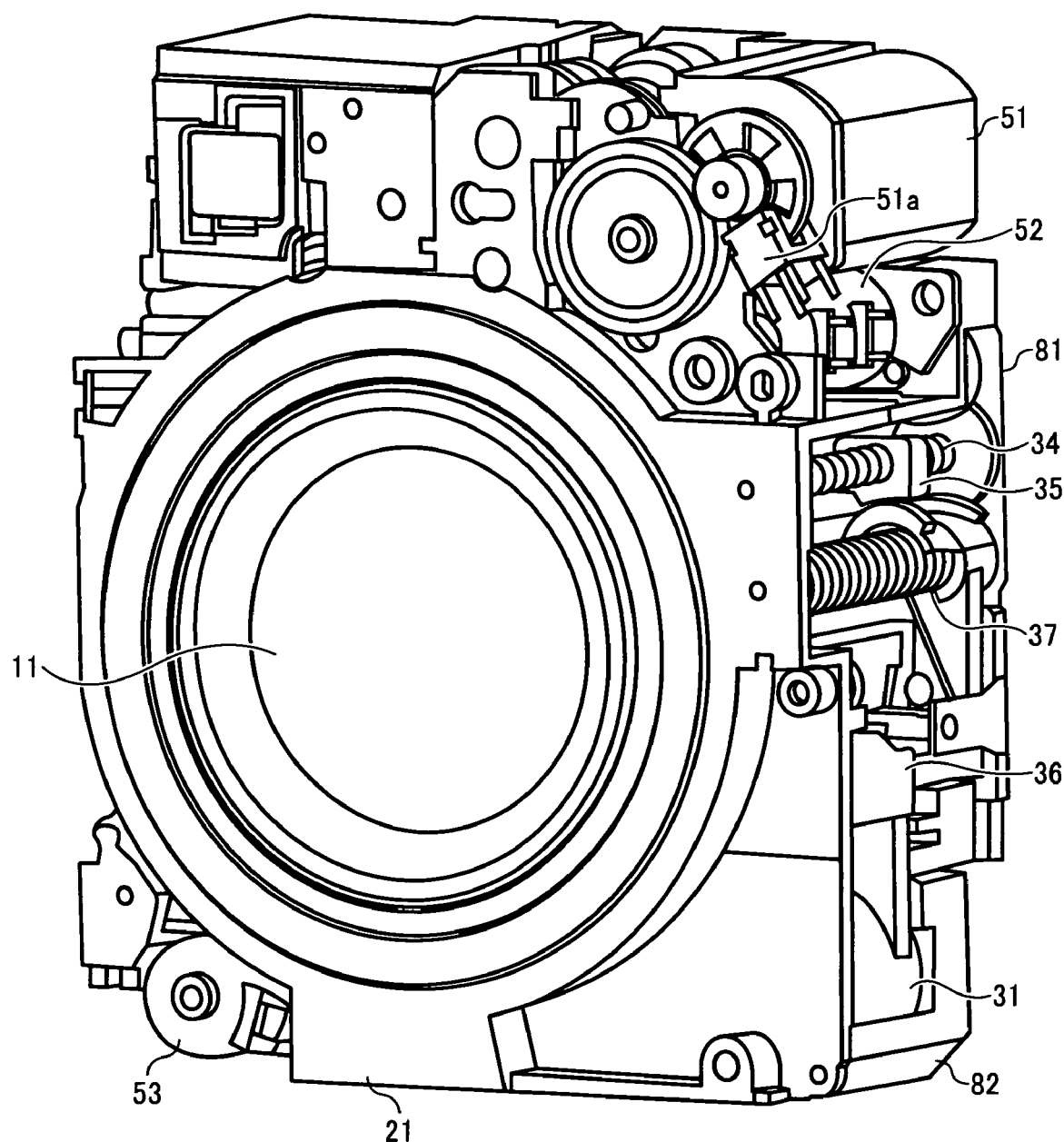
FIG. 1 is a perspective view showing a main configuration of a lens barrel portion in an optical device including a lens barrel according to the present invention in a collapsed and housed state of retracting lens groups, when viewed from an object's side.
Figure 2:
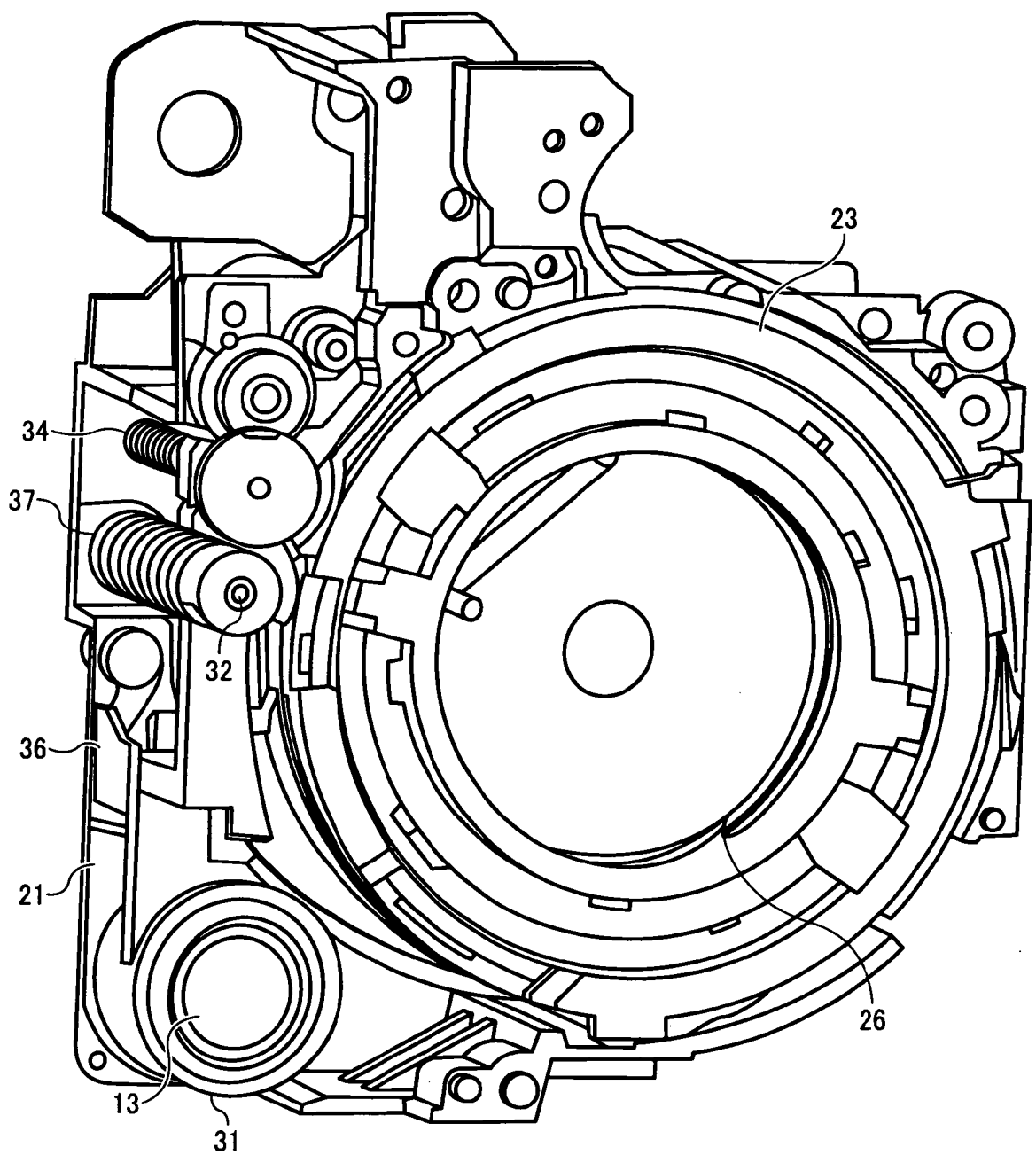
FIG. 2 is a perspective view showing the main configuration in the state shown in FIG. 1, when viewed from an image-forming surface side.
Figure 3:
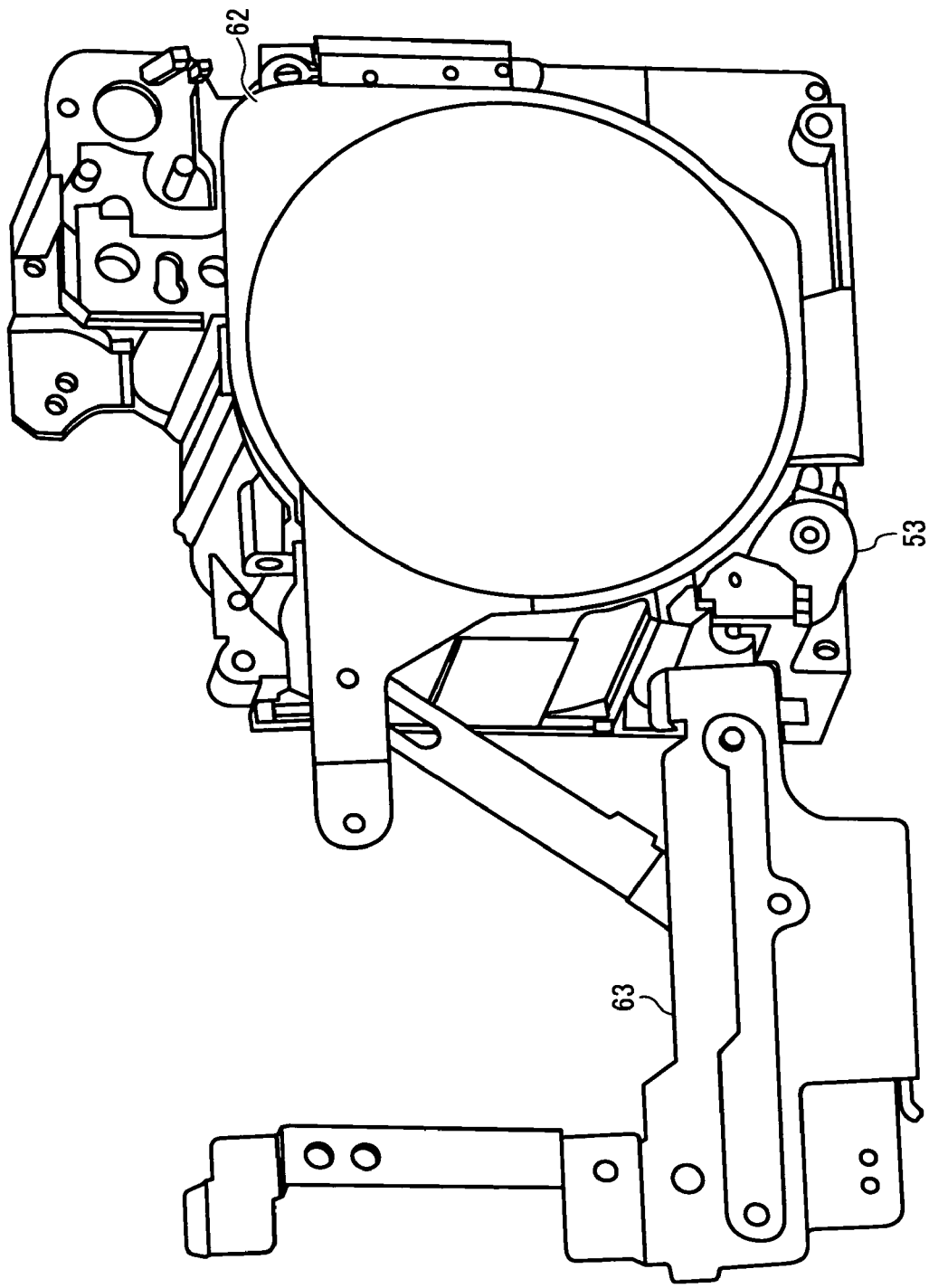
FIG. 3 is a schematic perspective view showing the configuration of the optical device including the lens barrel and the lens barrier in the collapsed and housed state with a lens barrier closed, when viewed from the object's side.
Figure 4:
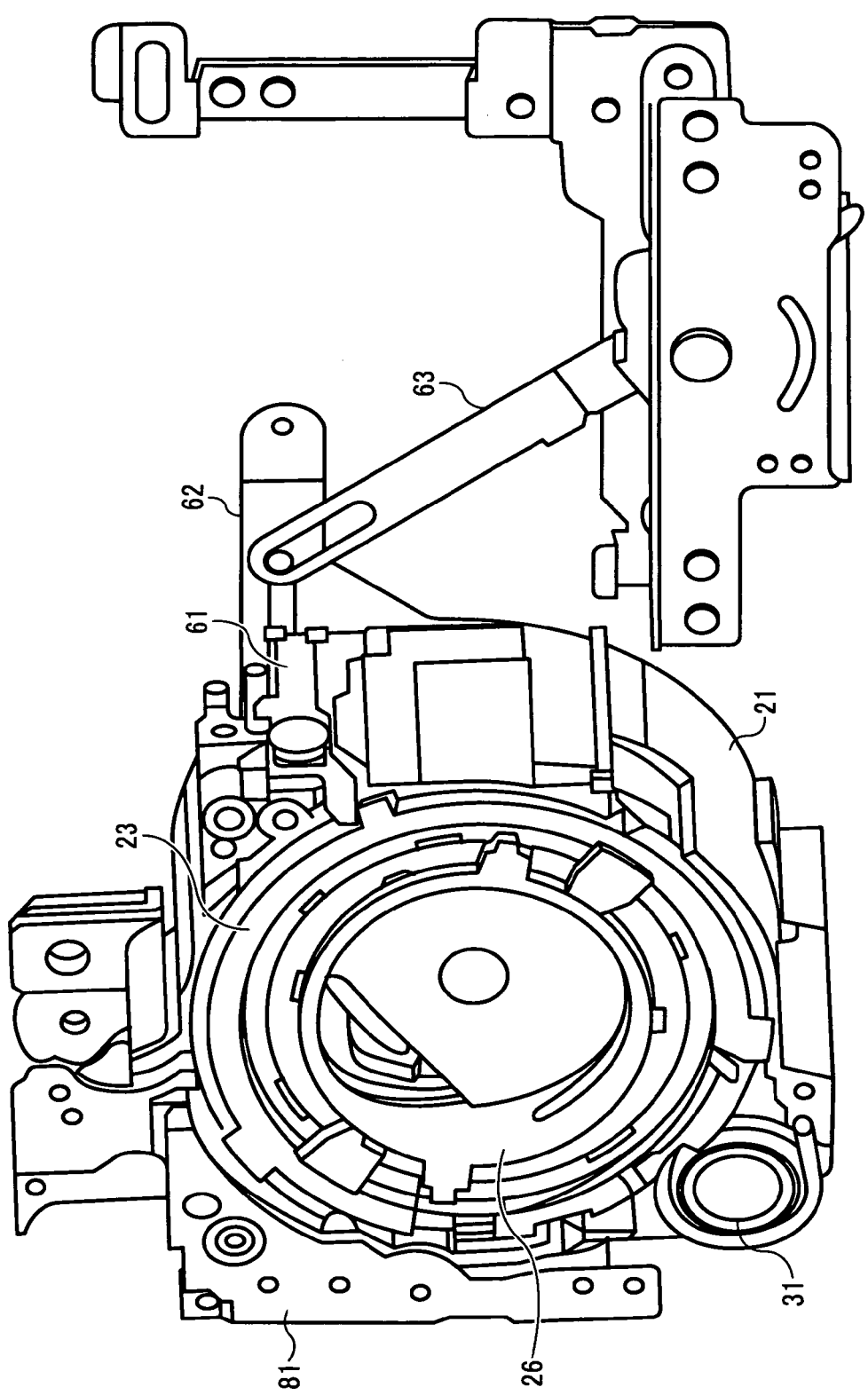
FIG. 4 is a schematic perspective view showing the main configuration in the state shown in FIG. 3, when viewed from the image-forming surface side.
Figure 5:
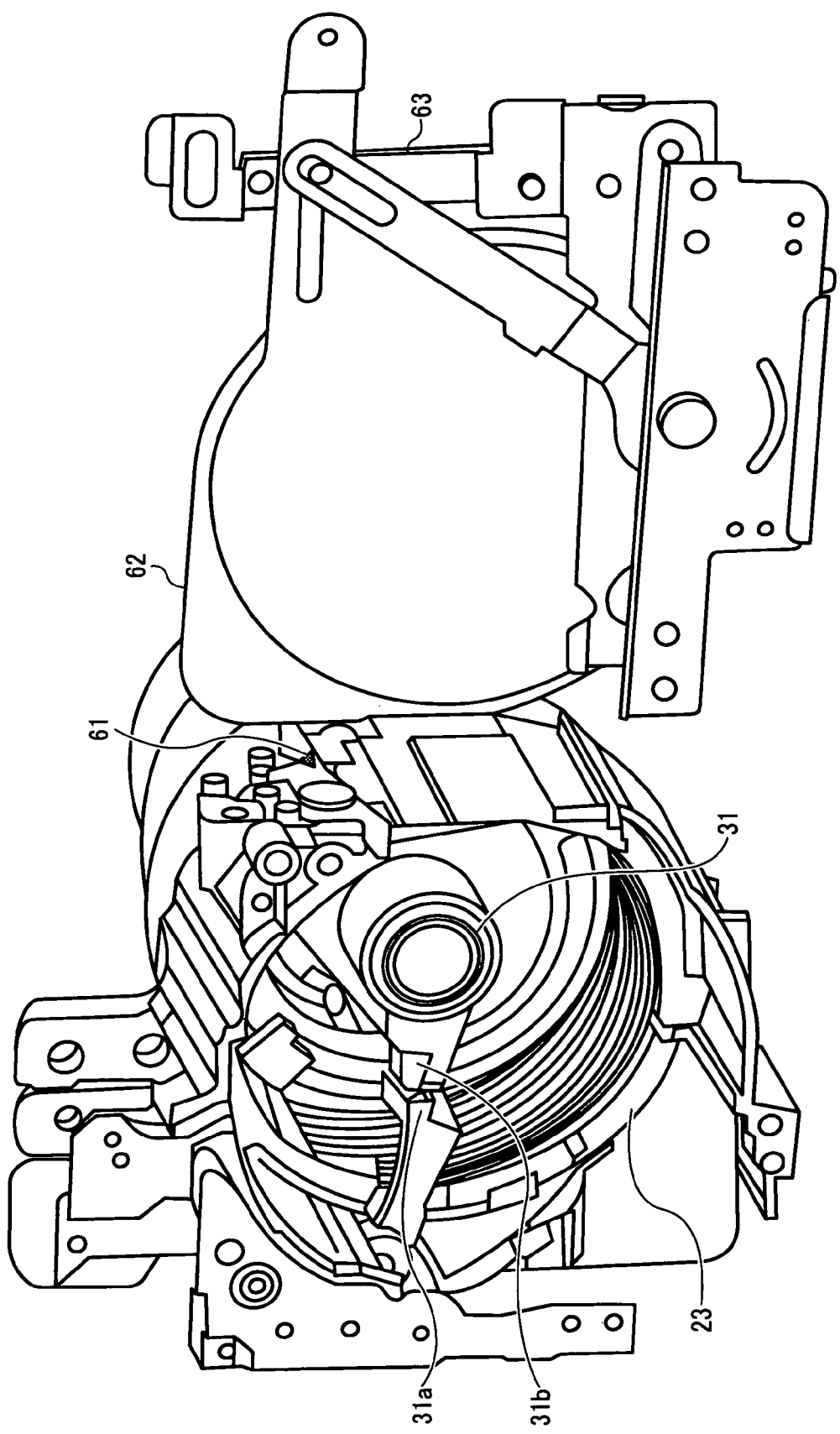
FIG. 5 is a schematic perspective view showing the main configuration of the lens barrel portion and a lens barrier portion in a state where the lens barrier, which is opened in an image-taking state with the lens groups protruded, is attempted to close, when viewed from the image-forming surface side.
Figure 6:
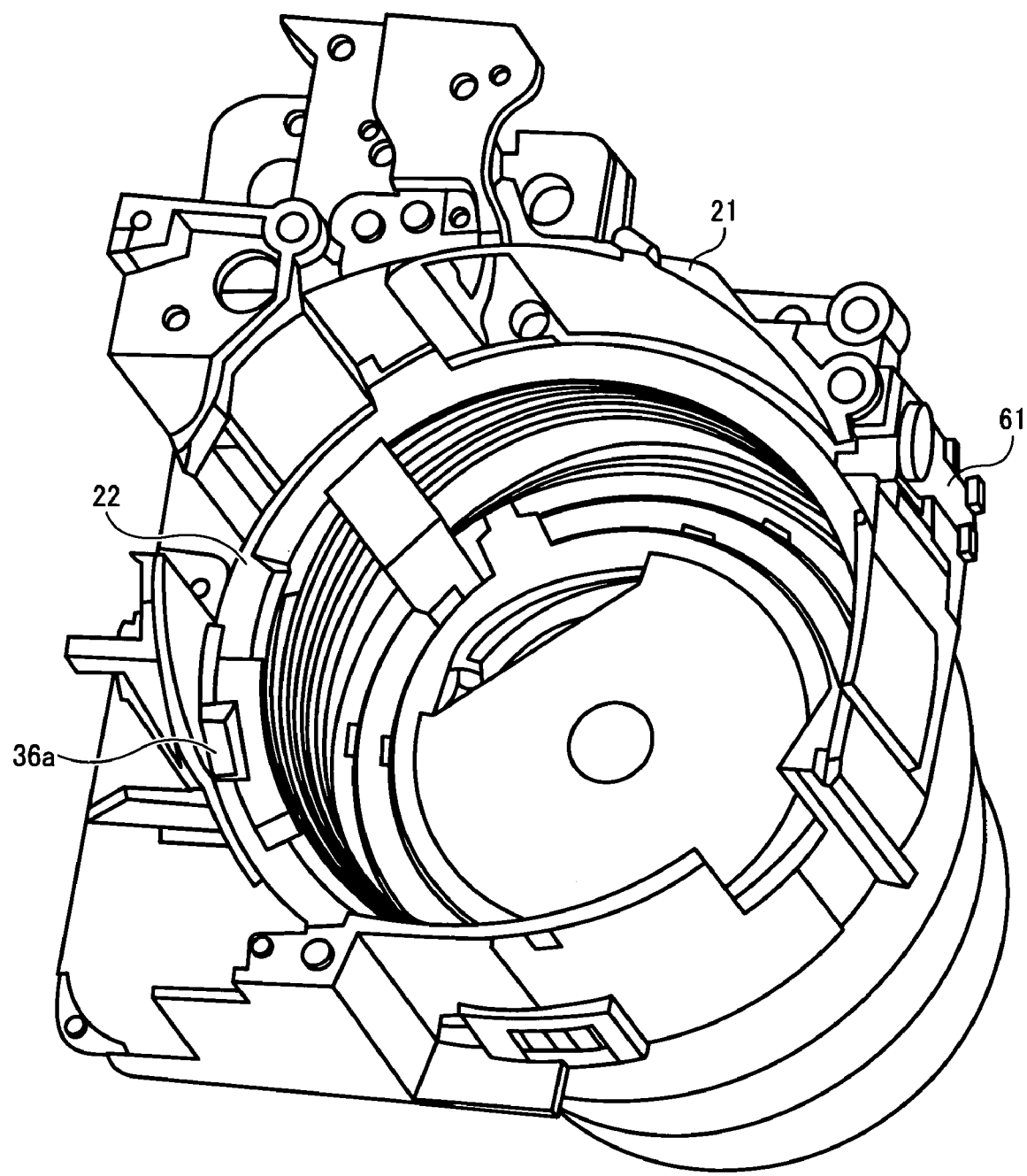
FIG. 6 is a perspective view showing the main configuration of the lens barrier portion in the image-taking state where the lens groups are protruded, when viewed from the image-forming surface side.
Figure 7:
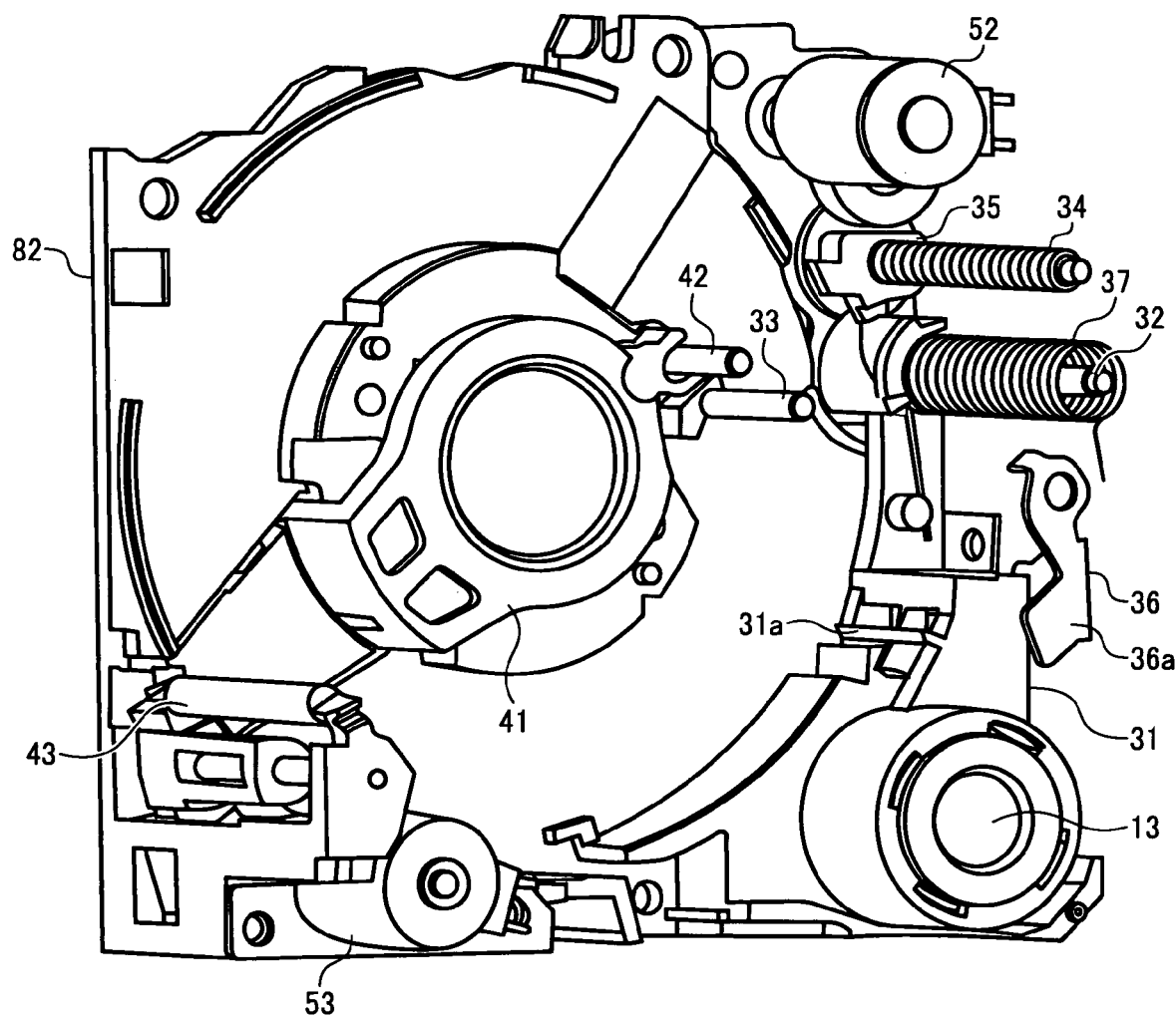
FIG. 7 is a perspective view showing layout configurations for the portion of a third lens holder frame, a collision prevention member, and a fourth lens holder frame. Here, the layout configurations are in the collapsed and housed state of the lens groups for explaining operations not only of the third lens holder frame configured to hold a third lens group, but also of the collision prevention member, when viewed from the object's side.
Figure 8:
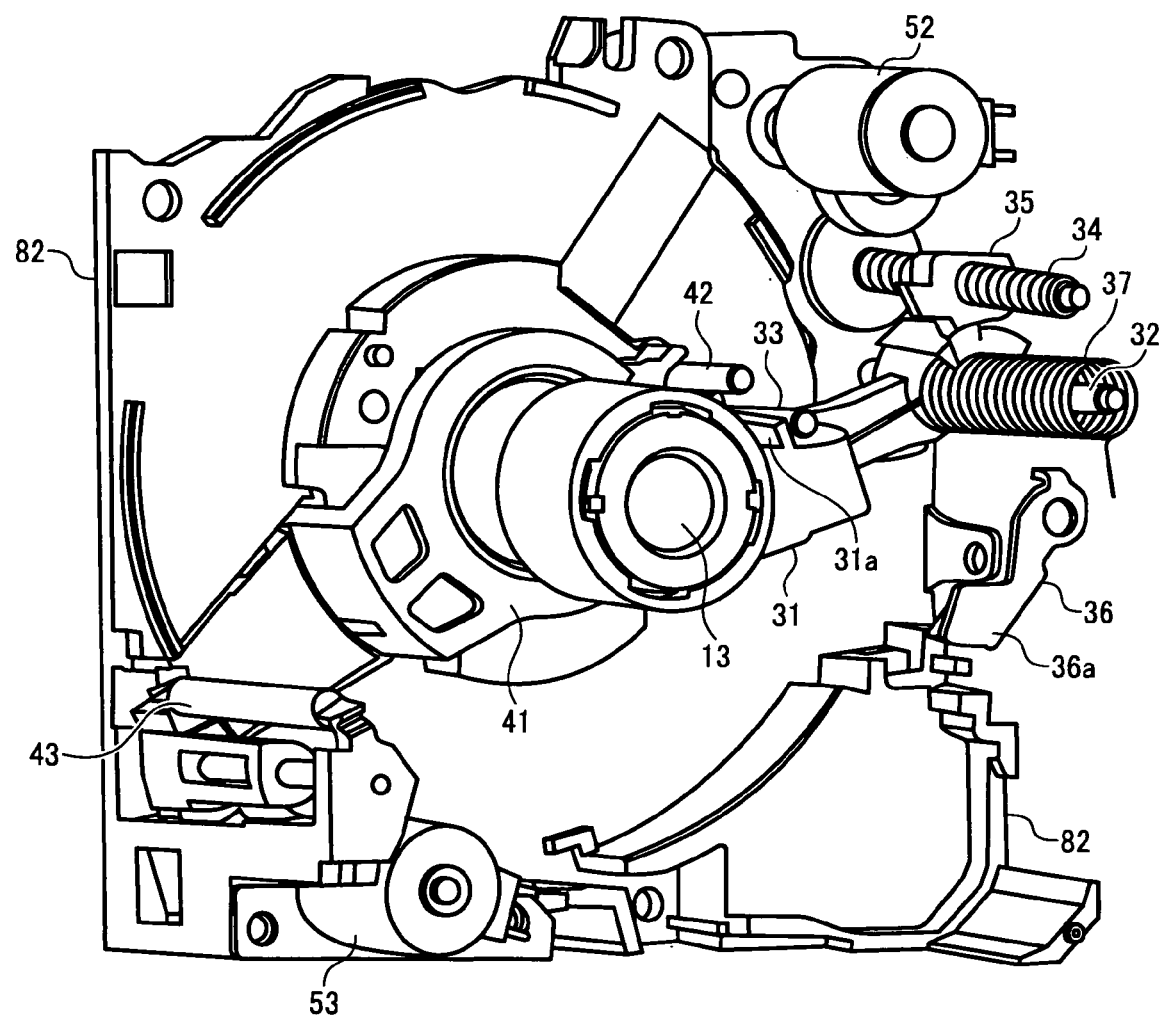
FIG. 8 is a perspective view showing layout configurations for the portion of the third lens holder frame, the collision prevention member, and the fourth lens holder frame. Here, the layout configurations are in the image-taking state where the lens groups are protruded for explaining the operations not only of the third lens holder frame configured to hold the third lens group, but also of the collision prevention member, when viewed from the object's side.

FIG. 1 is a perspective view of a configuration of main portions of a lens barrel portion in a collapsed and housed state of retracting lens groups, when viewed from an object's side. FIG. 2 is a perspective view of the main configuration in the state shown in FIG. 1, when viewed from an image-forming surface side. FIG. 3 is a perspective view showing the configuration of the optical device including the lens barrel and the lens barrier in the collapsed and housed state with a lens barrier closed, when viewed from the object's side. FIG. 4 is a perspective view of the main configuration in the state shown in FIG. 3, when viewed from the image-forming surface side. FIG. 5 is a perspective view showing the main configuration of the lens barrel portion and a lens barrier portion in a state where the lens barrier, which is opened in an image-taking state with the lens groups protruded, is attempted to close, when viewed from the image-forming surface side. FIG. 6 is a perspective view of the main configuration of the lens barrier portion in the image-taking state where the lens groups are protruded, when viewed from the image-forming surface side. FIG. 7 is a perspective view showing layout configurations for the portion of a third lens holder frame, a collision prevention member, and a fourth lens holder frame. Here, the layout configurations are in the collapsed and housed state of the lens groups for explaining operations not only of the third lens holder frame configured to hold a third lens group, but also of the collision prevention member, when viewed from the object's side. FIG. 8 is a perspective view showing layout configurations for the portion of the third lens holder frame, the collision prevention member, and the fourth lens holder frame. Here, the layout configurations are in the image-taking state where the lens groups are protruded for explaining the operations not only of the third lens holder frame configured to hold the third lens group, but also of the collision prevention member, when viewed from the object's side.

Figure 10:
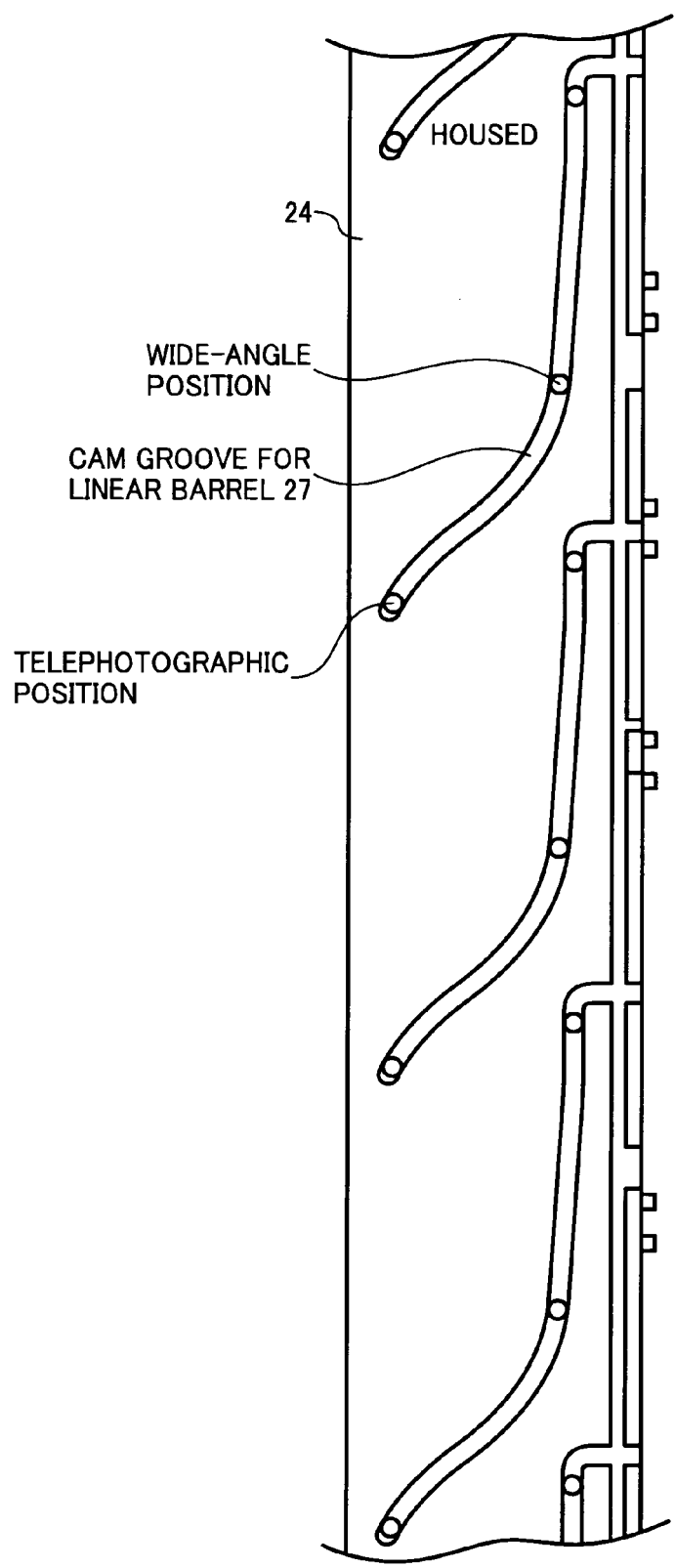
FIG. 10 is a schematic development showing shapes of cam grooves formed on a second rotating barrel by developing the second rotating barrel.
Figure 11:
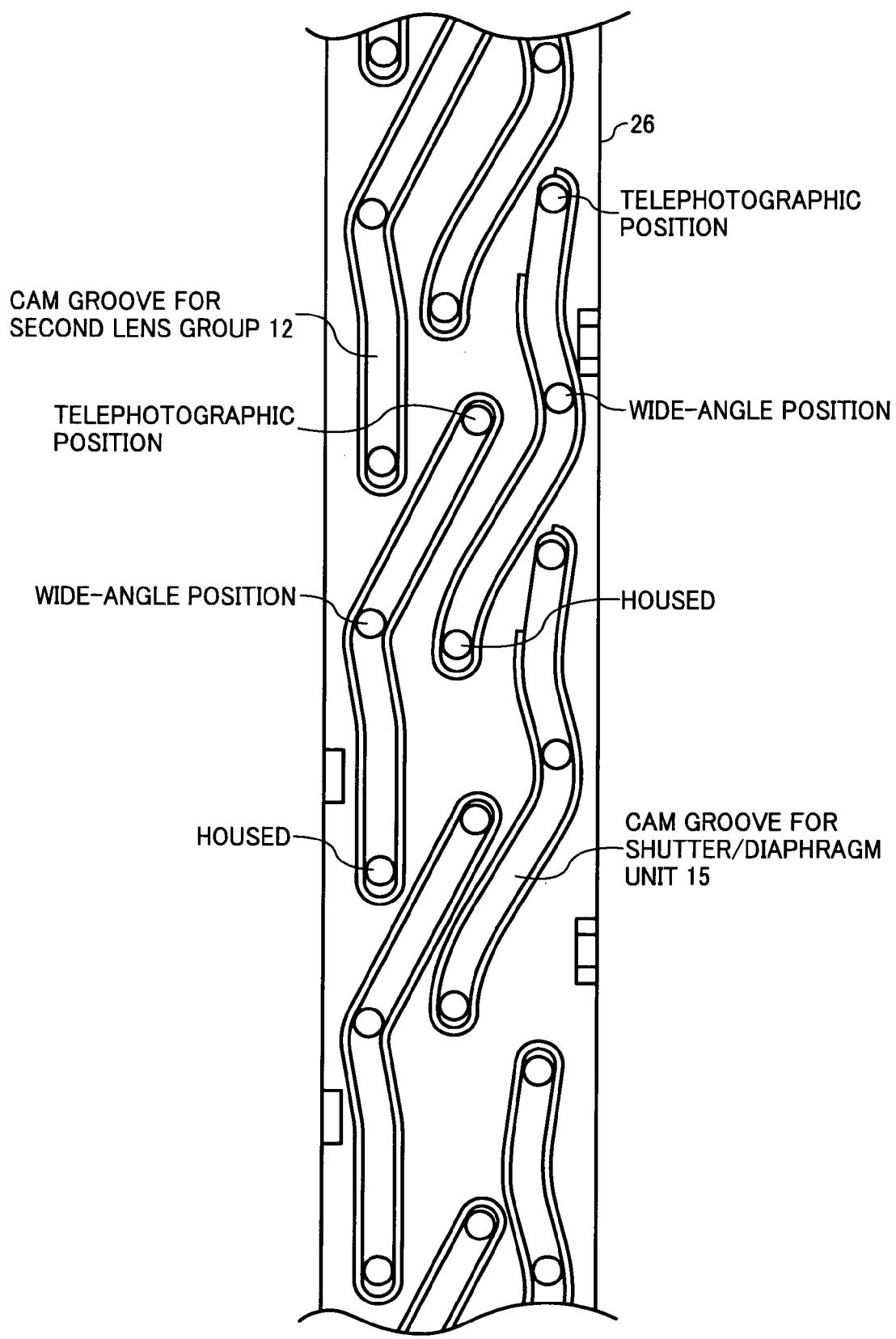
FIG. 11 is a schematic development showing shapes of cam grooves formed on a cam barrel by developing the cam barrel.
Figure 12:
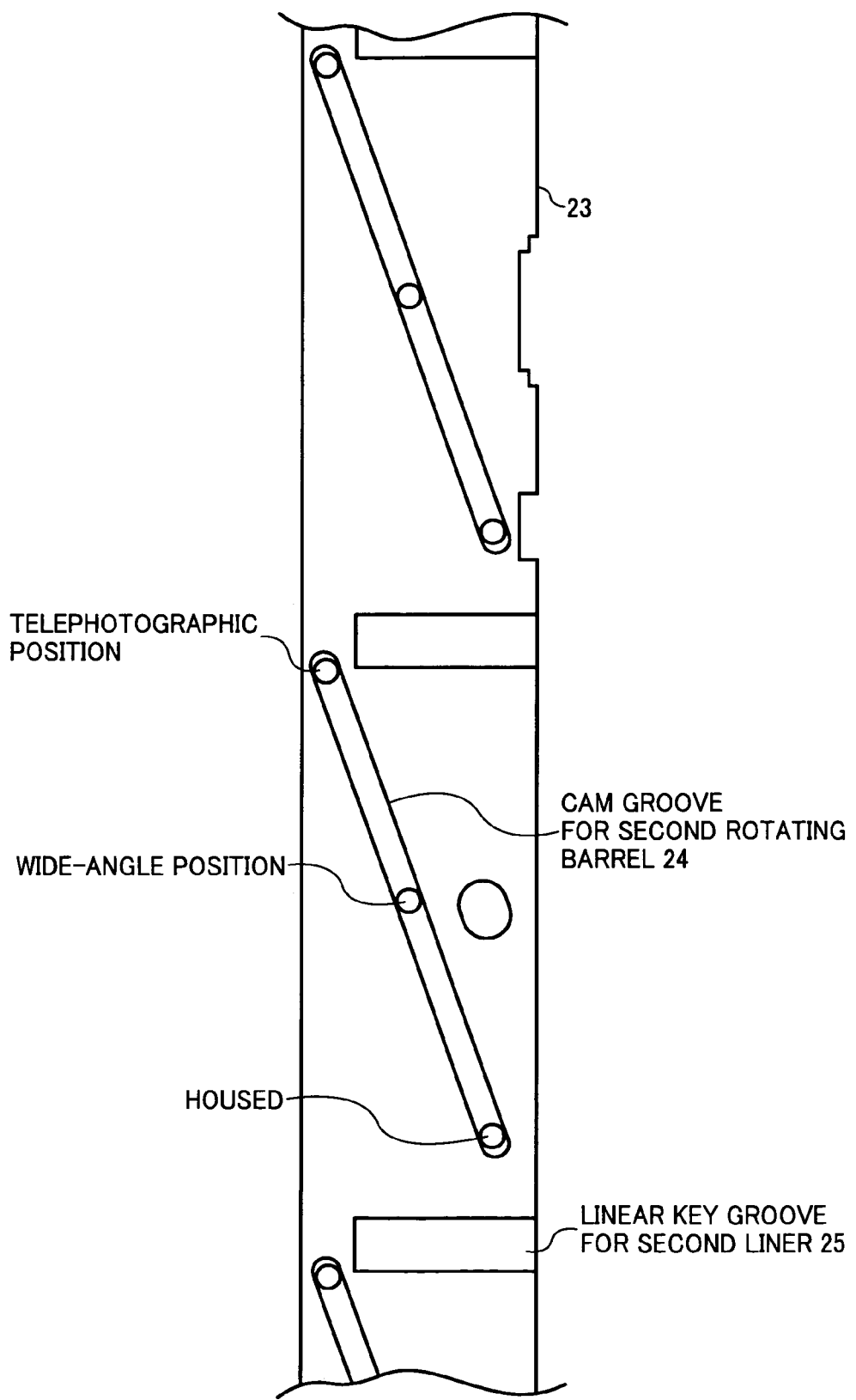
FIG. 12 is a schematic development showing shapes of cam grooves and key grooves formed on a first liner by developing the first liner while omitting helicoids.
Figure 13A:
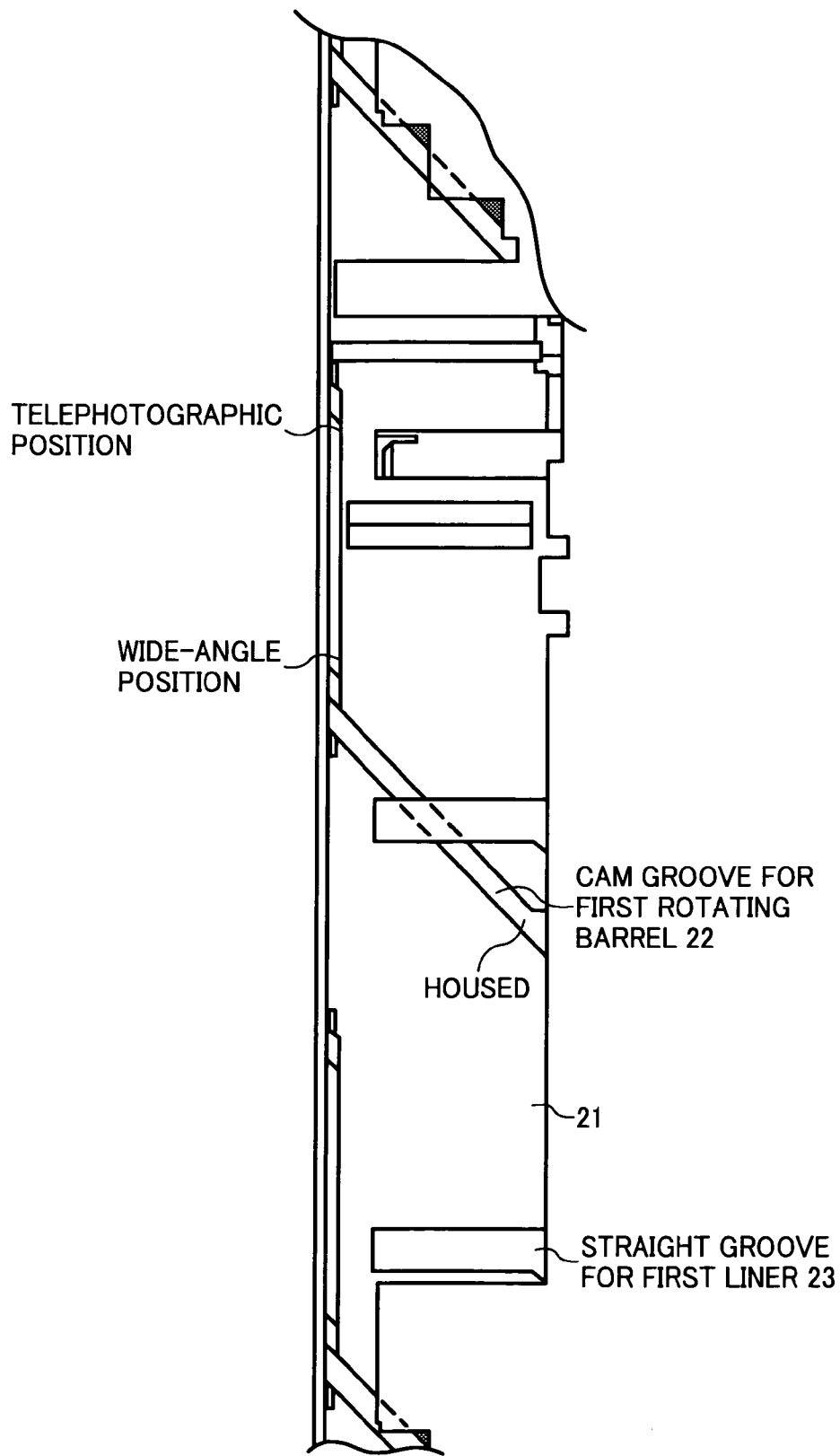
FIG. 13A is a schematic development showing shapes of cam grooves and key grooves formed on a fixed frame by developing the fixed frame while omitting helicoids.
Figure 13B:
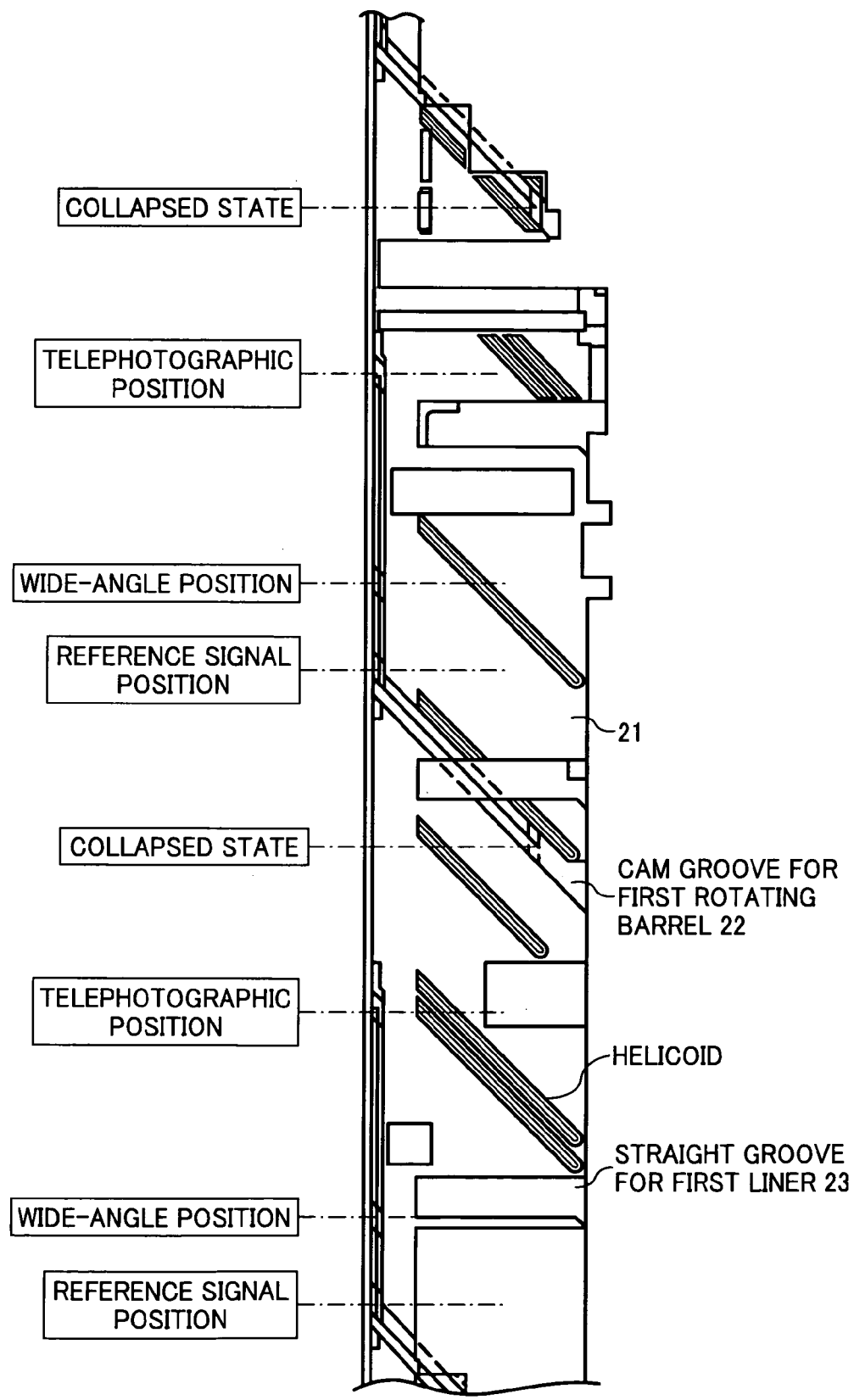
FIG. 13B is a schematic development showing the fixed frame of FIG. 13 with addition of helicoids.
Figure 13C:
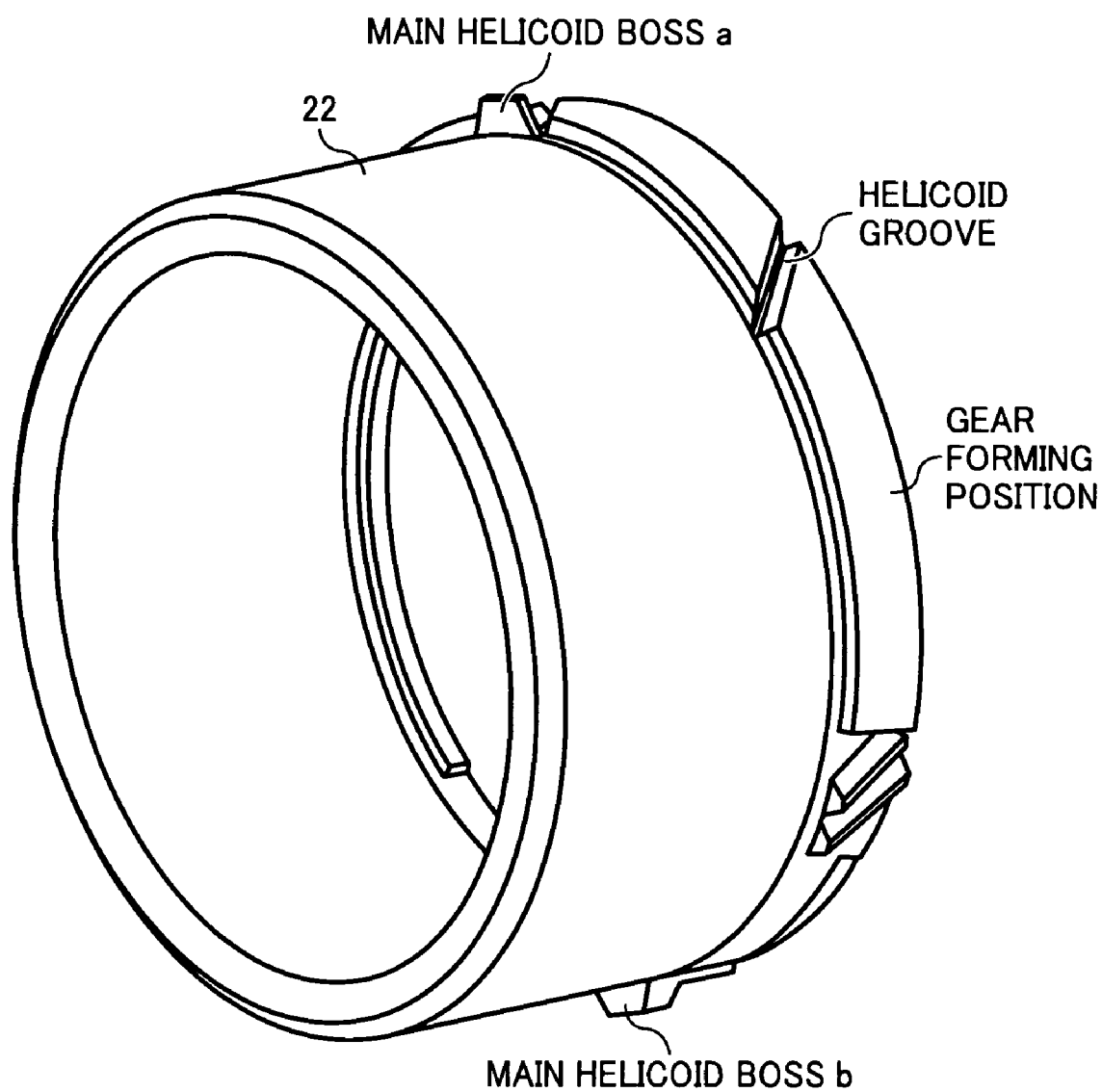
FIG. 13C is a perspective view showing external appearance of a first rotating barrel to be engaged with the helicoids.
Figure 14B:
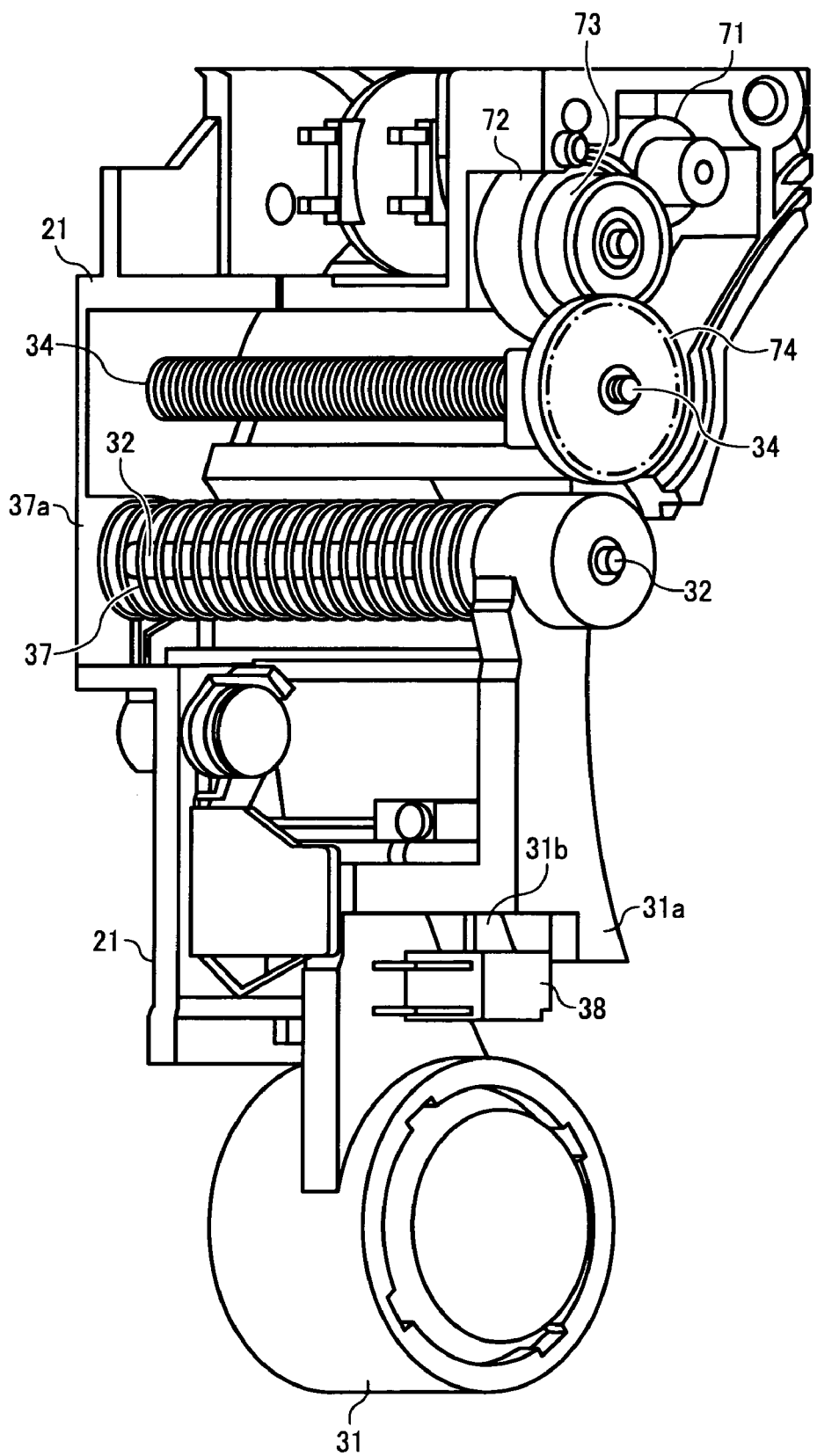
FIG. 14B is a perspective view of the configurations shown in FIG. 14A.
Figure 15:
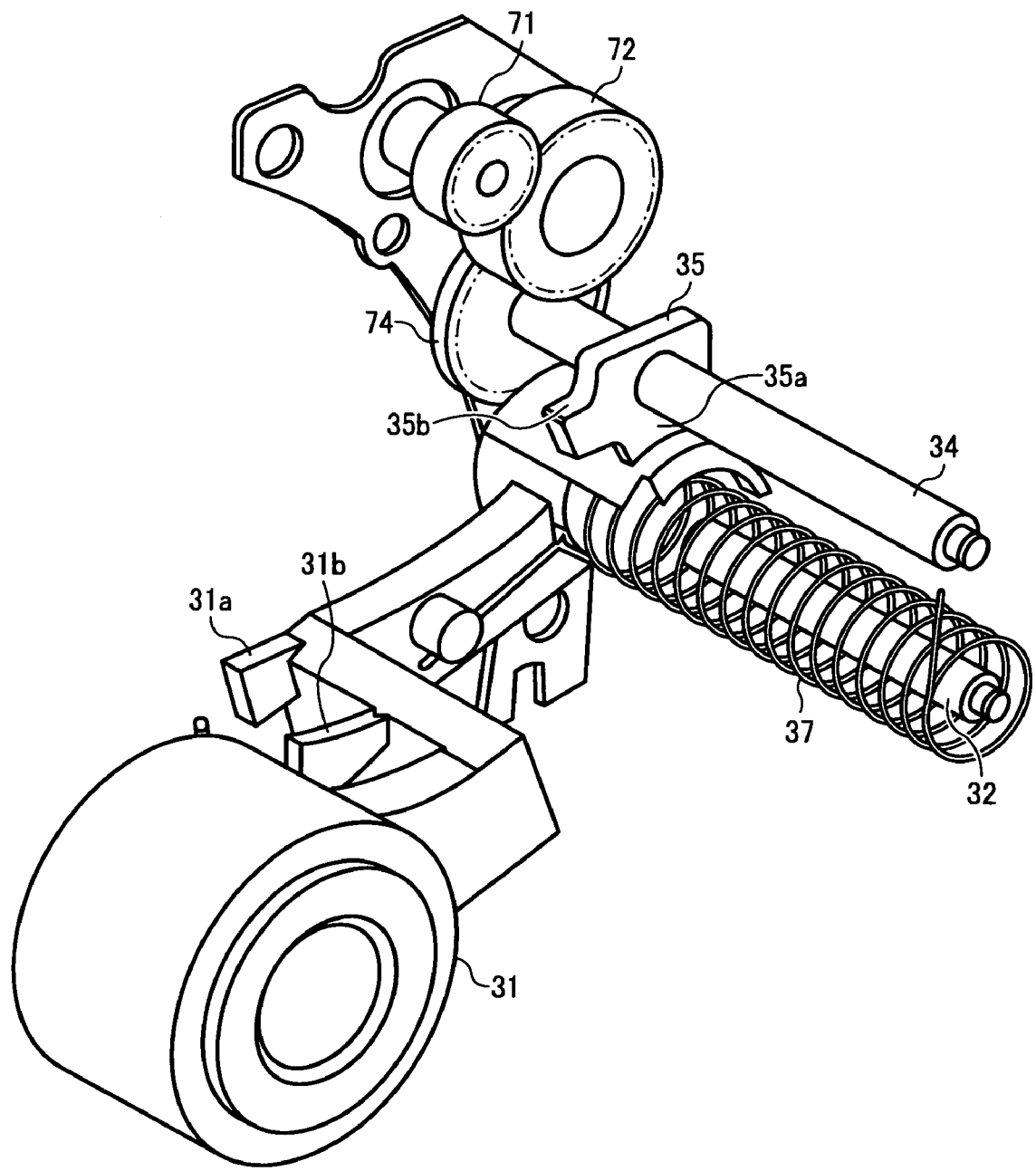
FIG. 15 is a perspective view schematically showing the configurations of the third lens holder frame and the drive operation system thereof.
Figure 16A:
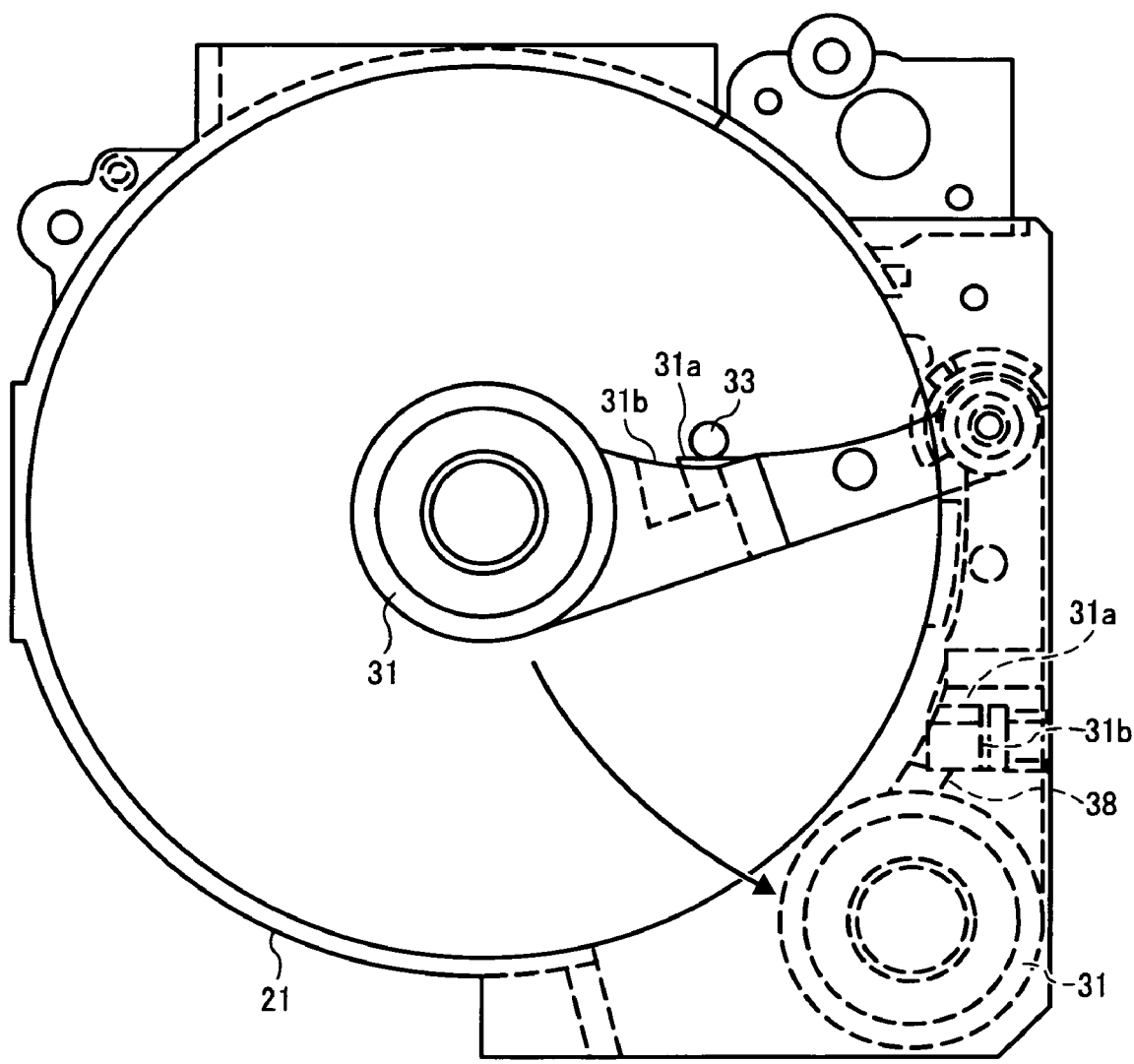
FIG. 16A is a front view showing the third lens holder frame portion for explaining the operations of the third lens holder frame, when viewed from the image-forming surface side.
Figure 16B:
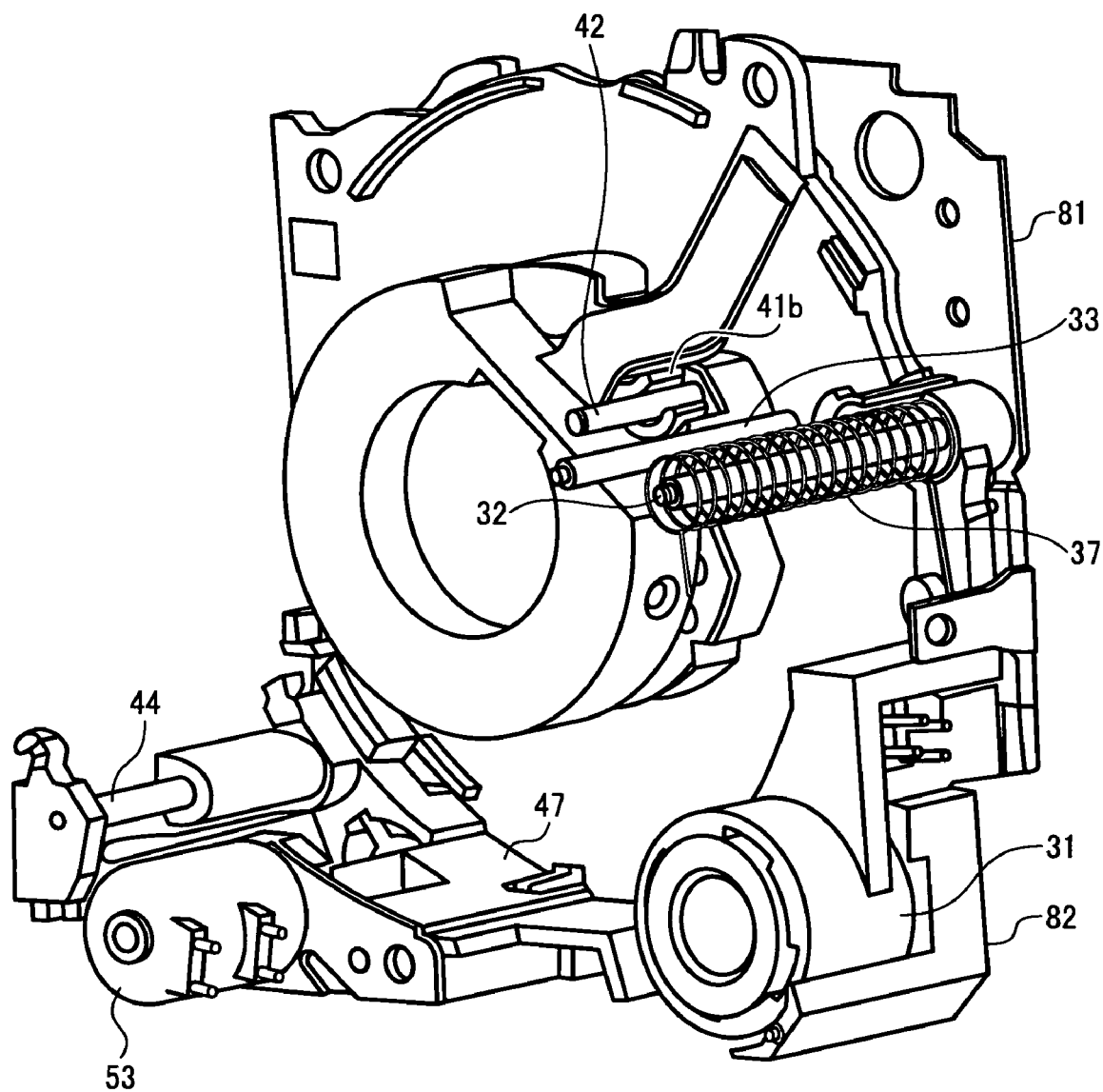
FIG. 16B is a perspective view principally showing a shutter portion.
Figure 20A:
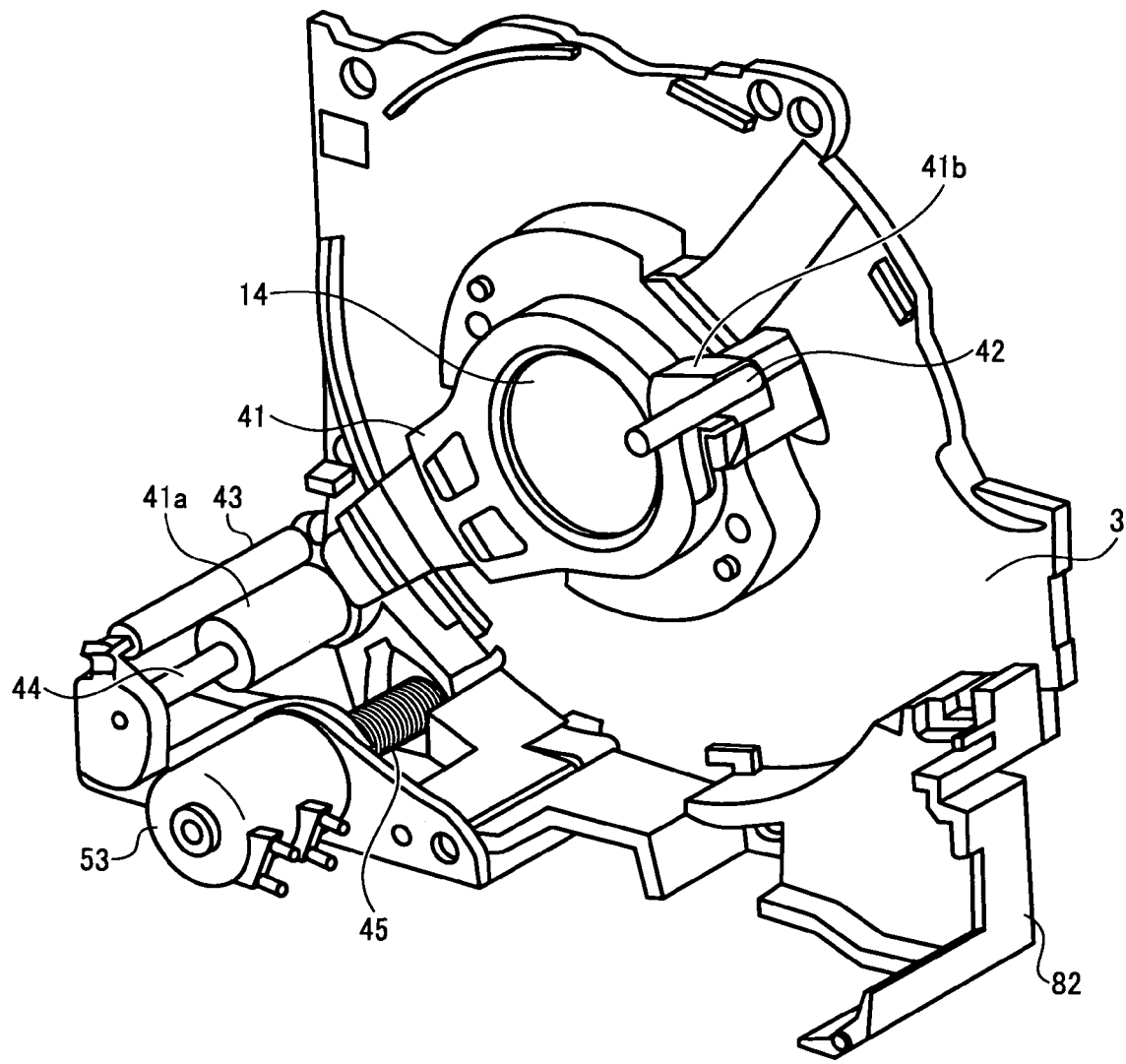
FIG. 20A is a perspective view schematically showing configurations of main portions of a fourth lens holder frame of the camera according to the first embodiment and of a drive operation system thereof.
Figure 20B:
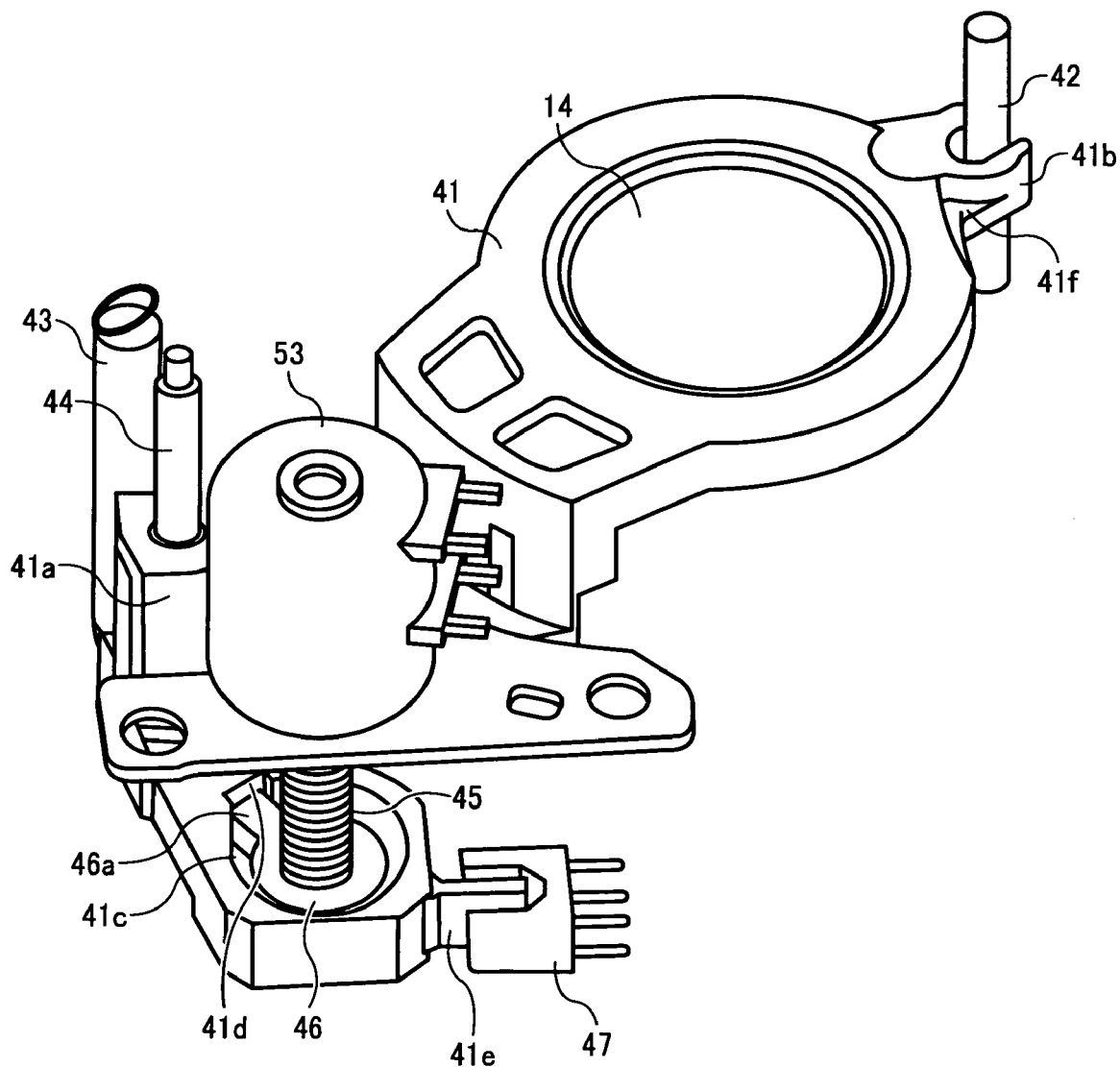
FIG. 20B is a perspective view showing the partially omitted configurations of the main portions of the fourth lens holder frame of the camera according to the first embodiment and of the drive operation system thereof, when viewed from a different angle.

FIGS. 9A and 9B are vertical cross-sectional views of main portions of the groups of lenses, the lens holder frames, and the lens barrel. FIG. 9A shows a state of a telephotographic position with the groups of lenses protruded as well as a state of a collapsed and housed position with the groups of lenses collapsed and housed. FIG. 9B shows a state of a wide-angle position with the groups of lenses protruded. FIG. 10 is a schematic development showing shapes of cam grooves formed on a second rotating barrel by developing the second rotating barrel. FIG. 11 is a schematic development showing shapes of cam grooves formed on a cam barrel by developing the cam barrel. FIG. 12 is a schematic development showing shapes of cam grooves and key grooves formed on a first liner by developing the first liner while omitting helicoids. FIG. 13A is a schematic development showing shapes of cam grooves and key grooves formed on a fixed frame by developing the fixed frame while omitting helicoids. FIG. 13B is a detailed view including the helicoids. FIG. 13C is a perspective view of a first rotating lens barrel to be engaged with the helicoids. FIG. 14A is a side view showing configurations of the third lens holder frame and a drive operation system thereof. FIG. 14B is a perspective view of FIG. 14A. FIG. 15 is a perspective view showing the configurations of the third lens holder frame and the drive system thereof. FIG. 16A is a front view showing the third lens holder frame portion for explaining the operations of the third lens holder frame, when viewed from the object's side. FIG. 16B is a perspective view of a shutter portion. FIG. 20A is a perspective view concretely showing configurations of main portions of a fourth lens holder frame and of a drive operation system thereof. FIG. 20B is a perspective view showing the partially omitted configurations thereof, when viewed from a different angle.

In FIG. 1 to FIG. 16B and FIGS. 20A and 20B, the optical device provided with the lens barrel includes a first lens group 11, a second lens group 12, a third lens group 13, a fourth lens group 14, a shutter/diaphragm unit 15, a solid-state image sensing device 16, a first lens holder frame 17, a cover glass 18, a low-pass filter 19, a fixed frame 21, a first rotating barrel 22, a first liner 23, a second rotating barrel 24, a second liner 26, a cam barrel 26, a linear barrel 27, a third lens holder frame 31, a third group main guide shaft 32, a third group sub-guide shaft 33, a third group lead screw 34, a third group female screw member 35, a collision prevention member 36, a compressed torsion spring 37, a third group photo interrupter 38 (FIG. 14B, FIG. 16A), a fourth lens holder frame 41, a fourth group sub-guide shaft 42, a fourth group spring 43 (FIG. 7, FIG. 8), a fourth group main guide shaft 44, a fourth group lead screw 45, a fourth group female screw member 46, a fourth group photo interrupter 47, a zoom motor 61 (FIG. 1), a third group motor 52, a fourth group motor 53, a barrier control member 61, a lens barrier 62, a barrier drive system 63, gears 71, 72, 73, and 74, a retainer plate 81, and a lens barrel base 82.

The image-taking state will be described with reference to FIGS. 9A and 9B. The first lens group 11, the second lens group 12, the third lens group 13, and the fourth lens group 14 are sequentially arranged from the object's side. Moreover, the shutter/diaphragm unit 15 is inserted into a space between the second lens group 12 and the third lens group 13, and the solid-state image sensing device 16 formed by use of a charge-coupled device (CCD) or the like is disposed on the image-forming surface side of the fourth lens group 14. These first to fourth lens groups 11 to 14 collectively constitute a focal-length variable zoom lens. The first lens group 11 includes one or more lenses and is fixed to and held by the linear barrel 27 with the first lens holder frame 17 configured to integrally hold the first lens group 11.

The second lens group 12 includes one or more lenses. A cam follower, which is formed on a second lens holder frame (not clearly illustrated) configured to integrally hold the second lens group 12, is inserted into a cam groove for the second lens group on the cam barrel 26 shown in FIG. 11, and is fitted to a straight groove 25a on the second liner 25. Accordingly, the second lens group 12 is supported by the cam barrel 26 and the second liner 25. The shutter/diaphragm unit 15 includes a shutter and an open diaphragm. A cam follower integrally formed on the shutter/diaphragm unit 15 is inserted into a cam groove for the shutter/diaphragm on the cam barrel 26 shown in FIG. 11 and is fitted to the straight groove 25a on the second liner 25. Accordingly, the shutter/diaphragm unit 15 is supported by the cam barrel 26 and the second liner 25.

As shown in FIG. 13A and FIG. 13B, straight grooves located along an axial direction and cam grooves are formed on an inner surface of a fixed barrel of the fixed frame 21. As shown in FIG. 13, helicoidally-shaped cam followers that are formed on an outer peripheral surface on a base end of the first rotating barrel 22 are fitted to the helicoidally-shaped cam grooves. Meanwhile, key portions formed in a protruding manner on the outer periphery on a base end of the first liner 23 are fitted to the straight grooves on the fixed barrel of the fixed frame 21. Guide grooves located along a plane orthogonal to an optical axis are formed on an inner surface of the first rotating barrel 22, and followers (or keys) that are linear guide members formed in a protruding manner on an outer peripheral surface in the vicinity of the base end of the first liner 23 are fitted to the guide grooves. Straight grooves located along the direction of the optical axis and helicoids are formed on an inner surface of the first liner 23. Moreover, escape grooves for inserting cama followers that are formed in a protruding manner on an outer peripheral surface in the vicinity of a base end of the second rotating barrel 24 are formed on the inner surface of the first liner 23.

Helicoids are formed on an outer peripheral surface on a base end of the second rotating barrel 24, and are screwed on the helicoids provided on the inner periphery of the first liner 23. Moreover, cam followers, which are provided in a protruding manner on the outer periphery in the vicinity of the base end of the second rotating barrel 24, are fitted to the straight grooves provided on the inner periphery of the first rotating barrel 22 through the liners (the straight grooves) of the first liner 23. Key portions, which are provided in a protruding manner on the outer periphery on a base end of the second liner 25, are fitted to straight grooves provided on the inner periphery of the first liner 23. Guide grooves located along a plane orthogonal to the optical axis are formed on an inner surface of the second rotating barrel 24, and followers (or keys) that are linear guide members formed in a protruding manner on the outer peripheral surface of the second liner 25 are fitted to the guide grooves. According to these configurations, the second liner 25 is able to move integrally with the second rotating barrel 24 in terms of movement in the direction of the optical axis. In the meantime, the second rotating barrel 24 is able to achieve rotational movement relative to the second liner 25.

The cam barrel 26 engaged with the inner periphery of the second liner is configured to be engaged with and fixed to the base end of the second rotating barrel 24 by use of faster protrusions provided in a protruding manner on the outer periphery at the base end, whereby the cam barrel 26 is configured to perform rotational movement integrally with the second rotating barrel 24. Guide grooves located along a plane orthogonal to the optical axis are formed on an inner surface of the second liner 25, and followers (or keys) that are linear guide members formed in a protruding manner on the outer peripheral surface (on a front side) of the cam barrel 26 are fitted to the guide grooves. According to these configurations, the cam barrel 26 is able to move integrally with the second liner 25 in terms of movement in the direction of the optical axis. In the meantime, the second rotating barrel 24 is able to achieve rotational movement relative to the second liner 25.

A base end's side of the linear barrel 27 is inserted into a space between the second rotating barrel 24 and the second liner 25. Cam followers are formed in a protruding manner on an outer peripheral surface in the vicinity of the base end of the linear barrel 27, and the cam followers are fitted to cam grooves formed on the inner peripheral surface of the second rotating barrel 24. Moreover, straight grooves are formed along an axial direction on an inner peripheral surface of the linear barrel 27, and the key portions on the outer peripheral surface of the second liner 25 are fitted to the straight grooves. Gears are formed on the outer periphery at the base end of the first rotating barrel 22 and a drive force of the zoom motor 51 is transferred through the gears as appropriate for rotation, whereby the first lens group 11, the second lens group 12, and the shutter/diaphragm unit 15 perform a zooming operation in a predetermined fashion.

Here, the cam grooves on the second rotating barrel 24 to be fitted to the cam followers on the linear barrel 27 are illustrated in FIG. 10. The cam grooves on the cam barrel 26 to be fitted to the cam followers on the lens holder frame for the second lens group 12, as well as the cam grooves on the second rotating barrel 26 to be fitted to the cam followers on the shutter/diaphragm unit 15, are illustrated in FIG. 11. The cam grooves on the first liner 23 to be fitted to the cam followers on the second rotating barrel 24, as well as the straight grooves on the first liner 23 to be fitted to the key portions on the second liner 25, are illustrated in FIG. 12. Moreover, the straight grooves on the fixed frame 21 to be fitted to the key portions on the first liner 23 of the fixed barrel portion, as well as the cam grooves on the fixed frame 21 to be fitted to the cam followers on the first rotating barrel 22, are illustrated in FIG. 13.

In other words, the rotating barrel located closest to the fixed barrel on the outermost periphery is generally screwed on the fixed barrel by use of the helicoids, and the helicoids move at a constant rate owing to the shapes thereof. For this reason, in the wide-angle position in the course of gradually moving from the position of the collapsed and housed state to the telephotographic position by way of the wide-angle position, the rotating barrels are generally extended halfway. On the contrary, according to the above-described configurations, the first rotating barrel 22 is fitted to the fixed barrel portion of the fixed frame 21 not simply by being screwed with the helicoids but by fitted to the helicoidally-shaped cam grooves. By driving from the collapsed and housed position to the wide-angle position, the first rotating barrel 22 is completely extended to the maximum extended position and the end on the object's side of the cam grooves are rendered parallel to an end surface of the fixed barrel portion thereafter. In the course of driving from the wide-angle position to the telephotographic position, the first rotating barrel 22 is rotated in a fixed position without moving the rotating barrel in the direction of the optical axis.

When moving from the position of the collapsed state to the wide-angle position, the first rotating barrel 22 is extended toward the object in the beginning. When reaching the maximum extended position, a zoom position reference signal is generated by a zoom position detector made of a photo reflector, a photo interrupter or a leaf switch, for example, which is disposed on the fixed frame 21. Therefore, if this zoom position reference signal is generated, then it is possible to consider that the first rotating barrel 22 reaches the maximum extended position. Accordingly, a retracting lens holder frame, which is the third lens holder frame 31 in this example, can start an approaching operation in the direction of the optical axis.

Therefore, a space for inserting the third lens holder frame 31 on the optical axis to be described later is secured in advance by completely extending the first rotating barrel 22 being the lens barrel located close to the fixed barrel portion as well as the first liner 23 at an early stage of an extending operation.

As will be described later, the zoom position reference signal is generated soon after the first rotating barrel 22 reaches the maximum extended position, and the third lens holder frame 31 starts the inserting operation soon after the space for insertion is secured. Accordingly, it is possible to minimize time for transition from the collapsed state when turning power on and the like to the wide-angle state.

The third lens group 13 is held by the third lens holder frame 31. The third lens holder frame 31 holds the third lens group 13 on one end thereof, and the other end is supported by a third group main guide shaft 32 disposed virtually parallel to the optical axis of the third lens group 13 so as to be rotatable and slidable along the third group main guide shaft 32. The third lens holder frame 31 is rotated pivotally around the third group main guide shaft 32 in a space between a position on the optical axis where the third lens group 13 is inserted into the optical axis in the image-taking state as shown in FIG. 8 and a housed position where the third lens group 13 is collapsed away from the fixed barrel portion of the fixed frame 21 in the collapsed and housed state as shown in FIG. 7. In the vicinity of the third lens group 13 on a rotating end's side of the third lens holder frame 31, the third lens holder frame 31 has a crank-shaped bent portion formed with the position, in a parallel direction to the main guide shaft, of the rotating end's side being different from the position of the-third-lens-group 13 supporting position's side in this case. A stopper 31a (FIG. 15) and a light shielding member 31b are provided in a protruding manner from the bent portion substantially toward the rotating end.

In light of an optical performance, a position of the third lens group 13 in a telephotographic mode is located in a position more extended toward the object in order to increase a focal length on the telephotographic side. However, a movable amount of the third lens holder frame 31 is determined by limitation of in the length in the direction of the optical axis of the lens barrel in the collapsed state. By defining a position of the third lens holder frame 31 to hold the lenses closest to the object, it is possible to maximize the focal length on the telephotographic side. However, when the position of the stopper 31a in the direction of the optical axis is defined substantially in the same position as the third lens group 13, the length of the third group sub-guide shaft 33 is increased whereby the size of the lens barrel in the collapsed state is increased. Accordingly, it is necessary to dispose the stopper 31a as closely to a focusing position as possible. Therefore, the third lens holder frame 31 is formed into the crank-shaped bent portion. Here, the third lens holder frame 31 may be formed of two components. In that case, one of the components is supposed to be a member including the crank-shaped bent portion while the other is supposed to be a member for holding the third lens group 13. These two components are fixed to each other so as to move virtually integrally.

As shown in FIG. 14A and FIG. 14B, in the state where the third lens holder frame 31 is located in the retracting position, the female screw member 85 screwed on the third group lead screw 34 is located closest to the imaging surface. Moreover, in this state, the compressed torsion spring 37 is charged to a maximum level to apply a moment in a clockwise direction viewed from a front face of the lens barrel (a direction to approach the optical axis) constantly to the third lens holder frame 31. On a cylindrical outer peripheral surface at a portion supported by the main guide shaft 32 of the third lens holder frame 31, a cam portion 31e in a sloped cam shape is formed on an inner surface on a base end's side of a stepped portion 31c as shown in FIG. 14A. When the third group motor 52 is rotated clockwise in FIG. 14B from this state, the lead screw 34 is rotated clockwise via a gear mechanism formed of the gears 71 to 74, whereby the female screw member 35 moves toward the object along the direction of the optical axis. In this case, the third lens holder frame 31 is rotated clockwise by the moment force from the compressed torsion spring 37, and the cam portion 31e thereof contacts and is fitted to a contact portion 35a of the female screw member 36. Thereafter, as the female screw member 35 moves to the closest position to the object, the light shielding member 31b of the third lens holder frame 31 moves away from the photo interrupter 38 functioning as a position detecting device for the third group. Accordingly, reference signals ranging from L (a low level) to H (a high level) are generated by the photo interrupter 38. The position of the third lens group 13 is controlled by pulse counts based on the reference signals from the photo interrupter 38.

The third lens holder frame 31 is further rotated clockwise when the female screw member 35 moves from this state to the position B in FIG. 14A, and the stopper 31a abuts on the third group sub-guide shaft 33 as shown in FIG. 8 and FIG. 16A, thereby defining the position of the third lens holder frame 31 on the optical axis. In this way, the approaching operation in the direction of the optical axis is completed. Here, the light shielding member 31b is configured to shield light against the photo interrupter 38 shown in FIG. 16A, and thus to detect and check the third lens holder frame 31 being in the housed position. Meanwhile, when the female screw member 35 moves to the position B in FIG. 14A, the contact portion 35a of the female screw member 35 contacts and is fitted to a front-end fitting portion 31d of the stepped portion 31c of the third lens holder frame 31. Specifically, the stepped portion 31c of the third lens holder frame 31 includes the cam portion 31e formed into the sloped cam shape on the base end's side, and the front-end fitting portion 31d on a front end's side forming a plane which is substantially perpendicular to the third group main guide shaft 32, thereby forming a recess relative to the peripheral surface of the barrel. The third lens holder frame 31 is always biased in the rotating direction from the housed position toward the position on the optical axis by the compressed torsion spring 37 disposed around the third group main guide shaft 32, and is also always biased on the third group main guide shaft 32 in the direction from the object's side to the retainer plate 81 on the image-forming surface side.

Here, as shown in FIG. 14B, a step 37a is formed at a portion to be pressed by the compressed torsion spring 37 of the fixed frame 21 so as to define a recess in the vicinity of a region where the compressed torsion spring 37 abuts on as shown in the drawing, thereby controlling the position of the compressed torsion spring 37 in this portion. Specifically, a central position of the compressed torsion spring 37 is controlled so as not to be deviated largely from the center of the third group main guide shaft 32.

Next, when the female screw member 35 moves to the wide-angle position (a position W in FIG. 14A), the contact position 35a of the female screw member 36 presses the front-end fitting portion 31d. Accordingly, the third lens holder frame 31 can move to the wide-angle position on the object's side along the direction of the optical axis.

Meanwhile, when the female screw member 35 is located in a space between the position B in FIG. 14A and the telephotographic position (a position T in FIG. 14A), the female screw member 35 is always pressed toward the image-forming surface side along the direction of the optical axis by the compression torsion spring 37. Accordingly, all clearances formed among the third group lead screw 34, the female screw member 35, the retainer plate 81, and the like are gathered to the image-forming surface side. In this way, the third lens holder frame 31 can secure positional accuracy in the direction of the optical axis.

In addition to the contact portion 35a configured to be screwed on the third group lead screw 34 disposed substantially in parallel to the optical axis and to contact either the front-end fitting portion 31d or the cam portion 31e inside the stepped portion 31c of the above-described third lens holder frame 31, the female screw member 35 includes a rotation stopper protrusion 35b formed so as to be engageable with and slidable on a guide groove that is formed parallel to the direction of the optical axis on the fixed barrel portion of the fixed frame 21 (FIG. 15), which functions as a rotation stopper for avoiding rotation of the female screw member 35 along with rotation of the third group lead screw 34. Specifically, the female screw member 35 has the rotation stopper protrusion 35b that is engaged with the guide groove of the fixed frame 21 to avoid rotation. Accordingly, the female screw member moves back and forth along the optical axis by rotation of the third group lead screw 34.

As shown in detail in FIG. 14A, when the female screw member 35 moves closer to the image-forming surface side (the left side in the drawing) than the position B in FIG. 14A, the female screw member 35 contacts and is fitted to the cam portion 31e of the stepped portion 31c of the third lens holder frame 31. As the third lens holder frame 31 contacts the retainer plate 81 by the biasing force in the direction of the optical axis attributable to the compressed torsion spring 37 and the third lens holder frame 31 is rotated counterclockwise against the biasing force in the clockwise direction by the compression torsion spring 37, it is possible to perform a retracting operation.

On the other hand, during a period when the female screw member 35 moves from the telephotographic position T to the recession start position B via the wide-angle position W by inverse rotation (rotation in the counterclockwise direction) of the third group lead screw 34, a fitting-contacting surface of the contact portion 35a of the female screw member 35 contacts the front-end fitting portion 31d at the stepped portion 31c of the third lens holder frame 31. Accordingly, the third lens holder frame 31 gradually moves from the object's side to the image-forming surface side, while maintaining the position on the optical axis controlled by the third group sub-guide shaft 33, by the biasing force to the position on the optical axis and by the biasing force to the image-forming surface side applied from the compression torsion spring 37. When the female screw member 35 reaches the recession start position B, a base end surface 31f of the third lens holder frame 31 contacts the retainer plate 81, while the female screw member 35 is detached from the front-end fitting portion 31d and contacts the cam portion 31e of the stepped portion 31c.

During a period when the female screw member 35 moves from the recession start position B to the housed position S, the contact portion 35a of the female screw member 35 slidably contacts the cam portion 31e of the stepped portion 31c of the third lens holder frame 31 to rotate the third lens holder frame 31 against the rotative biasing force by the compressed torsion spring 37. Accordingly, the third lens holder frame 31 is turned from the position on the optical axis to the housed position. The housed position S of the third lens holder frame 31 is a position moved toward the image-forming surface side in an amount equivalent to a predetermined number of pulse counts from the generation of housing reference signals ranging from H to L by the photo interrupter 38. After the third lens holder frame 31 moves to the housed position S, the movement of the first lens group 11, the second lens group 12, and the shutter/diaphragm unit 15 to the collapsed and housed position is permitted.

In this example, the fourth lens holder frame 41 firstly moves to a housed position before the third lens holder frame 31 moves to a housed position during a housing operation. A first housed position of the fourth lens holder frame 41 is a position moved toward the image-forming surface side in an amount equivalent to a predetermined number of pulse counts from the generation of housing reference signals ranging from H to L by a fourth group reference detector (not shown). After completion of the housing operation of the fourth group lens holder frame 41, the housing operation of the third lens holder frame 31 is permitted.

Specifically, the housing operation of the third lens holder frame 31 is completed by moving the third lens holder frame 31 toward the image-forming surface side in an amount equivalent to a predetermined number of pulse counts from the generation of the housing reference signals ranging from H to L by the photo interrupter 38 (FIG. 16A). The first rotating barrel 22 may be withdrawn, or components located inside the first rotating barrel 22 and the first liner 23, i.e. components located in front of base end surfaces thereof may be withdrawn from positions immediately before the contact with the third lens holder frame after completing this housing operation. In this way, it is possible to withdraw the first rotating barrel 22 and other components safely without interference with the third lens holder frame 31 by carrying out the withdrawal after completion of the above-described housing operation of the third lens holder frame 31. In the case of the zoom motor 61 formed by use of a conventional direct-current (DC) motor, the positions of the first rotating barrel 22 and others can be set up, based on an encoder-shaped pinion gear directly fixed to an output shaft of the zoom motor 51, and based on drive pulse counts generated by a zoom count detector which is made of a photo interrupter 51a, for example, and which is disposed in the vicinity thereof. Here, the DC motor is used as a drive source for moving the first rotating barrel 22, and the detection of a drive position is achieved by use of the encoder and the detector formed of the photo interrupter. However, it is apparently possible to achieve a similar function by replacing all these constituents with a pulse motor.

It should be noted, as particularly shown in FIG. 2 and FIG. 7, that the collision prevention member 36 is rotatably supported by the fixed frame 21 in the vicinity of the third group main guide shaft 32, and is always biased in a rotating direction so as to protrude a locking protrusion 36a in the vicinity of a rotating end toward an image-taking optical axis position by use of a spring or the like. When the third lens holder frame 31 is located in the housed position, the collision prevention member 36 is pushed by the third lens holder frame 31 having a turning force equal to or above the biasing force thereof, whereby the collision prevention member 36 is biased outside the third lens holder frame 31 (see particularly in FIG. 2 and FIG. 7). When the third lens holder frame 31 is turned and moves to the position on the optical axis, the collision prevention member 36 is disengaged with the third lens holder frame 31 and is turned in the direction to protrude the locking protrusion 36a toward the image-taking optical axis by the biasing force, whereby the locking protrusion 36a is protruded from the inner surface of the fixed barrel of the fixed frame 21. At this time, all of the first rotating barrel 22, the first liner 23, the second rotating barrel 24, the second liner 25, the cam barrel 26, and the linear barrel 27 are located closer to the object than a protruding position of the locking protrusion 36a. Accordingly, the locking protrusion 36a protrudes inside the outer peripheral edge of the base end of each of the first rotating barrel 22 and the first liner 23 (see particularly FIG. 5, FIG. 6, and FIG. 8).

In this way, the collision prevention member will firstly contact the first rotating barrel even if the first rotating barrel is forcibly rotated by hand to move the barrel toward the housed position. Accordingly, it is impossible to move the base end of the first rotating barrel 22 close to the image-forming surface side beyond the position of the collision prevention member 36 in the direction of the optical axis. In this way, it is possible to avoid contact with the third lens holder frame 31. Therefore, it is possible to achieve prevention of destruction or damage of the third lens holder frame 31 by a strong outside force. Note that the first rotating barrel 22 can move to the housed position only after the third lens holder frame 31 completes movement to the housed position normally.

Therefore, if a large pressure is applied to a tip end of the lens barrel by falling or the like in the image-taking state where the lens barrel is protruded, the locking protrusion 36*a* of the collision prevention member 36 is fitted to the first rotating barrel 22 and the first liner 23 and blocks recession of the first rotating barrel 22, the first liner 23, (as well as the second rotating barrel 24, the second liner 25, the cam barrel 26, and the linear barrel 27) toward the third lens group 13, thereby preventing damages on the third lens holder frame 31, the third lens group 13, and the like.

The third group lead screw 34 is rotated both forward and backward by the third group motor 52. Rotation of the third group motor 52 is transmitted to the third group lead screw 34 sequentially through the gear 71, the gear 72, the gear 73, and the gear 74.

Next, configurations for driving the fourth lens group 14 will be described. Besides FIG. 7 and FIG. 8, the configurations will be described mainly with reference to FIG. 20A and FIG. 20B which are perspective views showing a fourth group drive system.

In this case, the fourth lens group 14 used as a focusing lens to focus an image is held by the fourth lens holder frame 41 as shown in FIG. 20A, FIG. 20B, and so forth. The fourth lens holder frame 41 includes: a sleeve portion 41*a* fitted to the fourth group main guide shaft 44 that is fixed to the lens barrel base 82 and disposed parallel to the optical axis; and a rotation stopper 41*b* fitted to a sub-guide shaft 42, which is disposed parallel to the optical axis and fixed to the lens barrel base 82, and configured to control rotation of the fourth lens holder frame 41. By applying this configuration, the fourth lens holder frame 41 can freely move along the fourth group main guide shaft 44, i.e. along the direction of the optical axis. Here, the fourth group motor 53 made of a stepping motor is provided as a drive source for moving the fourth lens holder frame 41, and the fourth group lead screw 45 is formed on an output shaft of this fourth group motor 53. The fourth group female screw member 46 with a female screw formed thereon is screwed on this fourth group lead screw 45.

The fourth lens holder frame 41 has a space for inserting the fourth group female screw member 46. This space is formed to include a fitting portion 41*c* to be fitted to the fourth group female screw member 46 on a plane on the imaging surface's side perpendicular to the optical axis, and the fourth lens holder frame 41 always contacts and is fitted to the fourth group female screw member 46 by biasing this fourth lens holder frame 41 to the object's side by use of the fourth group spring 43. The fourth group female screw member 46 includes a protrusion 46*a* that protrudes in a radial direction, and this protrusion 46*a* is fitted to a hole 41*d* formed on one side of the space for inserting the fourth group female screw member 46 of the fourth lens holder frame 41, thereby exerting a function to stop rotation of the fourth group female screw member 46.

In this way, when the fourth group motor 53 being a stepping motor is rotated, the fourth group lead screw 45 is rotated, whereby the fourth group female screw member 46 moves back and forth in the direction of the fourth group lead screw 45, that is, along the direction of the optical axis. Since the fourth lens holder frame 41 is fitted to this fourth group female screw member 46, the fourth lens holder frame 41 moves along the optical axis so as to follow the movement of this fourth group female screw member 46. At this time, the fourth group lead screw 45 is formed on the output shaft of the fourth group motor 58. Alternatively, it is also possible to transmit rotation so as to rotate the fourth group lead screw 45, by forming the fourth group motor 53 and the fourth group lead screw 45 separately, and then by connecting these constituents by use of a gear and the like.

A light shielding member 41*e* for shielding light on an optical path of the fourth group photo interrupter 47 provided on the lens barrel base 82 is formed on the fourth lens holder frame 41, and it is possible to shield or transmit the optical path of the fourth group photo interrupter 47 by moving the fourth group lens holder frame 41 to a predetermined position. In this case, the moment of change, from the light shielding state to the light transmitting state by the movement of the fourth lens holder frame 41, is recognized as the reference position. Electric current in a pulse waveform is applied to the fourth group motor 53. The fourth group motor 53 is thus rotated by an amount equivalent to an arbitrary number of applied pulses. In this way, it is possible to move the fourth lens holder frame 41 from the reference position to a desired position.

Here, a concave portion 41*f*, for avoiding interference by escaping in the direction of the optical axis from the light shielding member 31*b* for the photo interrupter of the third lens holder frame 31, is formed on an outer periphery of the fourth lend holder frame 41. It is thereby possible to increase an amount of movement of the fourth lens holder frame 41, and to expand a focusable image-taking distance range. Moreover, the fitting structure between the fourth lens holder frame 41 and the fourth group female screw member 46 has allowance in the direction of the optical axis as described previously. Here, the fourth lens holder frame 41 can control the position in the direction of the optical axis accurately by constantly biasing the fourth lens holder frame 41 toward the object by use of the fourth group spring 43.

The housed positions of the first rotating barrel 22, the first liner 23, the first lens group 11, the second lens group 12, and the shutter/diaphragm unit 15 are controlled based on the zoom position reference signal generated by the zoom position detector, which is formed of the photo reflector and the like, and which is disposed on the fixed frame 21. Specifically, after occurrence of a change in a zoom position housing reference signal from H to L, it is possible to complete the housing operation by moving the constituents toward the imaging surface in an amount equivalent to a predetermined number of counts generated, with the pinion gear functioning as the encoder and with the zoom count detector disposed in the vicinity thereof. At the time of housing, the fourth lens holder frame is located in the first housing position as described previously. When the first rotating barrel 22 moves to the housing position, the first rotating barrel 22 or the base end surface of the first linter 23 contacts and presses the fourth lens holder frame 41 so as to move the fourth lens holder frame 41 finally to a second housing position. By this operation, even when there is fluctuation in a fitting position in the direction of the optical axis of the fourth group photo interrupter 47, it is possible to move the fourth lens holder frame 41 accurately to the housing position without requiring complicated adjustment and the like. Such an action can be achieved because the length of the fitting space in the direction of the optical axis of the provided on the fourth lens holder frame 41 is greater than the thickness of the fourth group female screw member 46.

The zoom motor 51 for moving the first lens group 11, the second lens group 12, and the shutter/diaphragm unit 15 is formed by use of a DC motor in this case. On the other hand, the third group motor 52 for driving the third lens group 13 as well as the fourth group motor 53 for driving the fourth lens group 14 are generally formed by use of pulse motors. These motors are driven in concert with one another by way of software so as to achieve an appropriate zooming operation mainly by use of the first to third lens groups 11 to 13 as well as an appropriate focusing operation mainly by use of the fourth lens group 14, for example.

Now, drive control of the respective lens groups constituting this lens barrel will be descried in detail with reference to FIG. 21 to FIG. 28.

Figure 22:
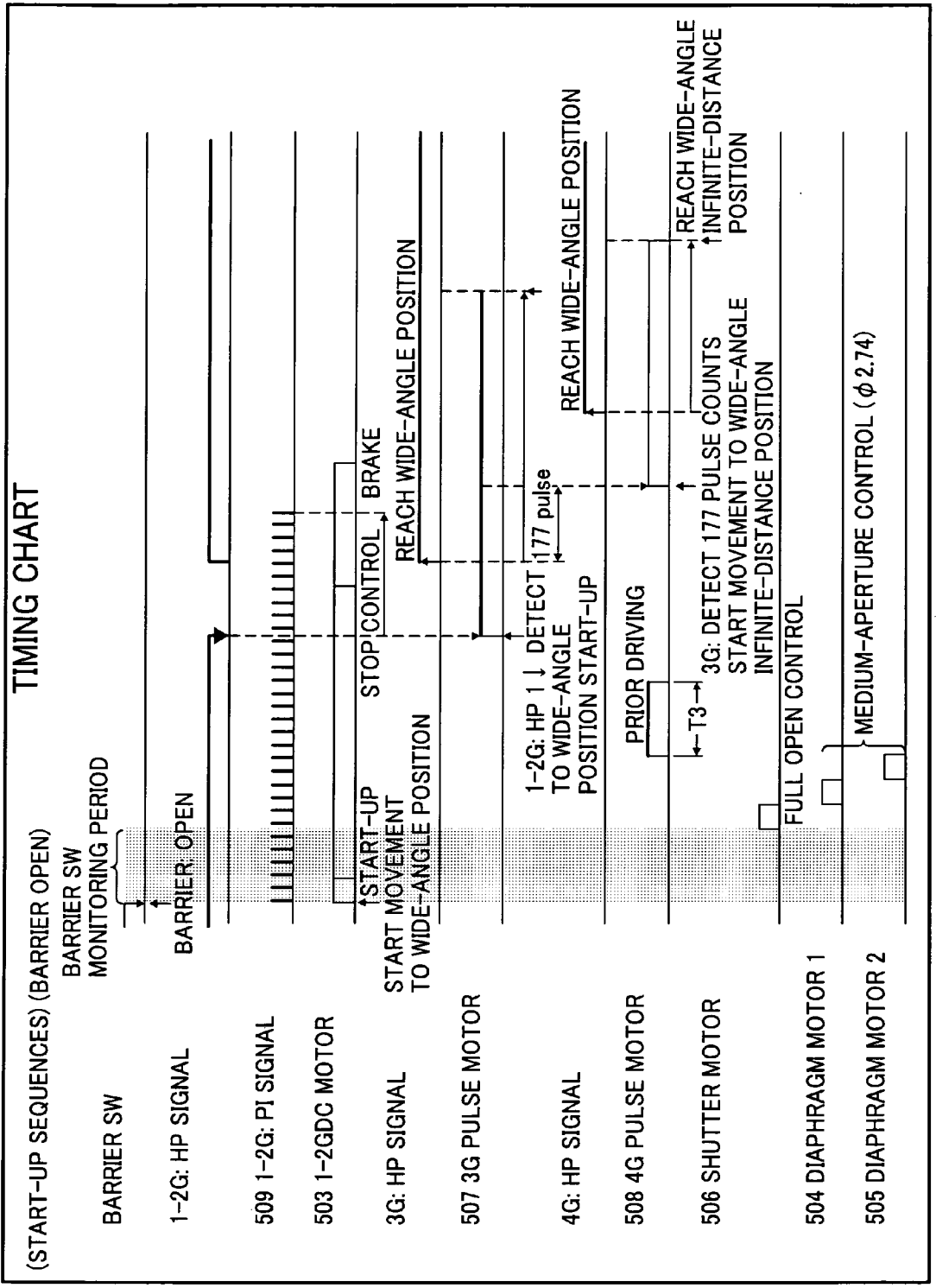
FIG. 22 is a timing chart showing sequences at the time of opening a barrier in start-up sequences.
Figure 25:
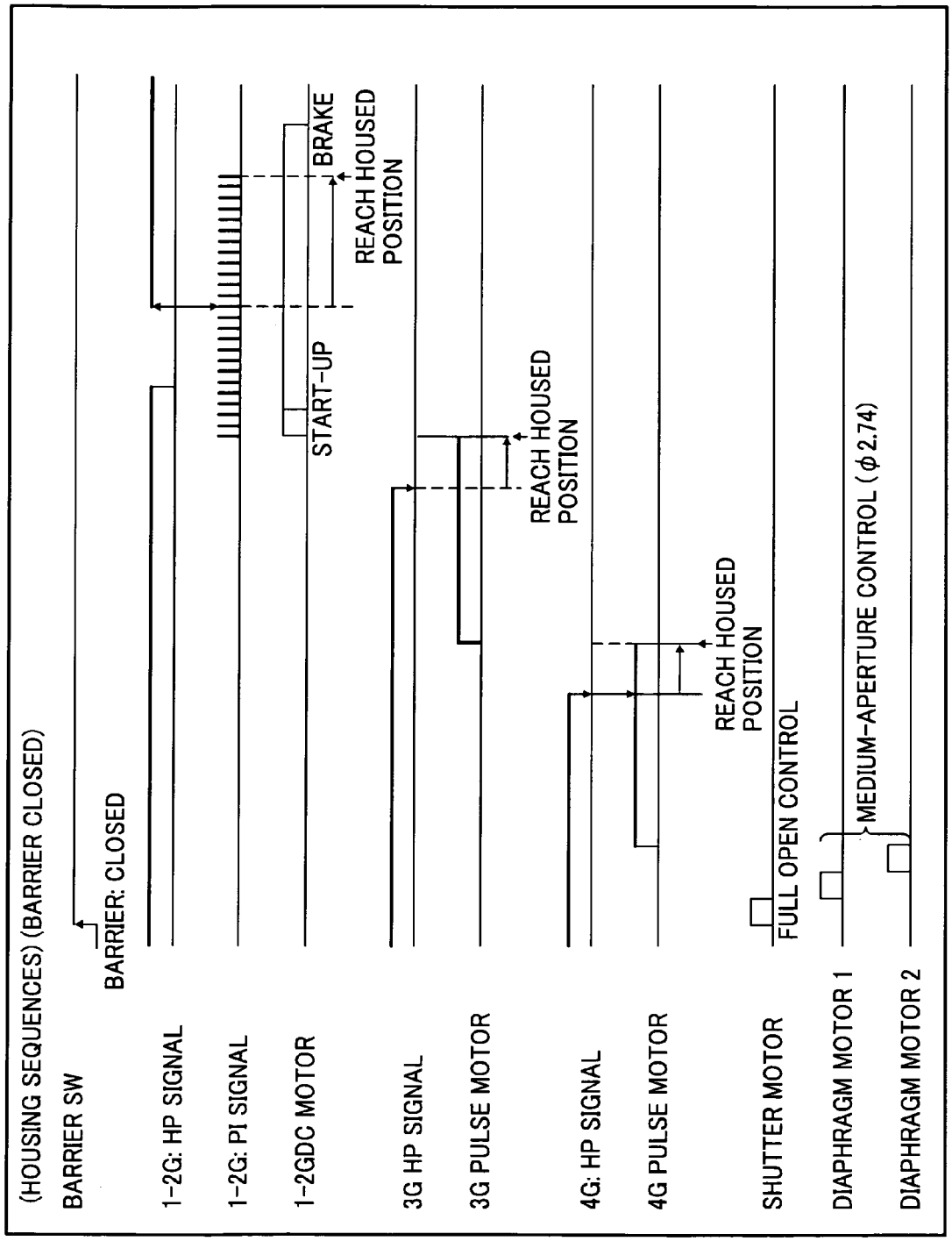
FIG. 25 is a timing chart showing housing sequences at the time of closing the barrier.
Figure 26B:
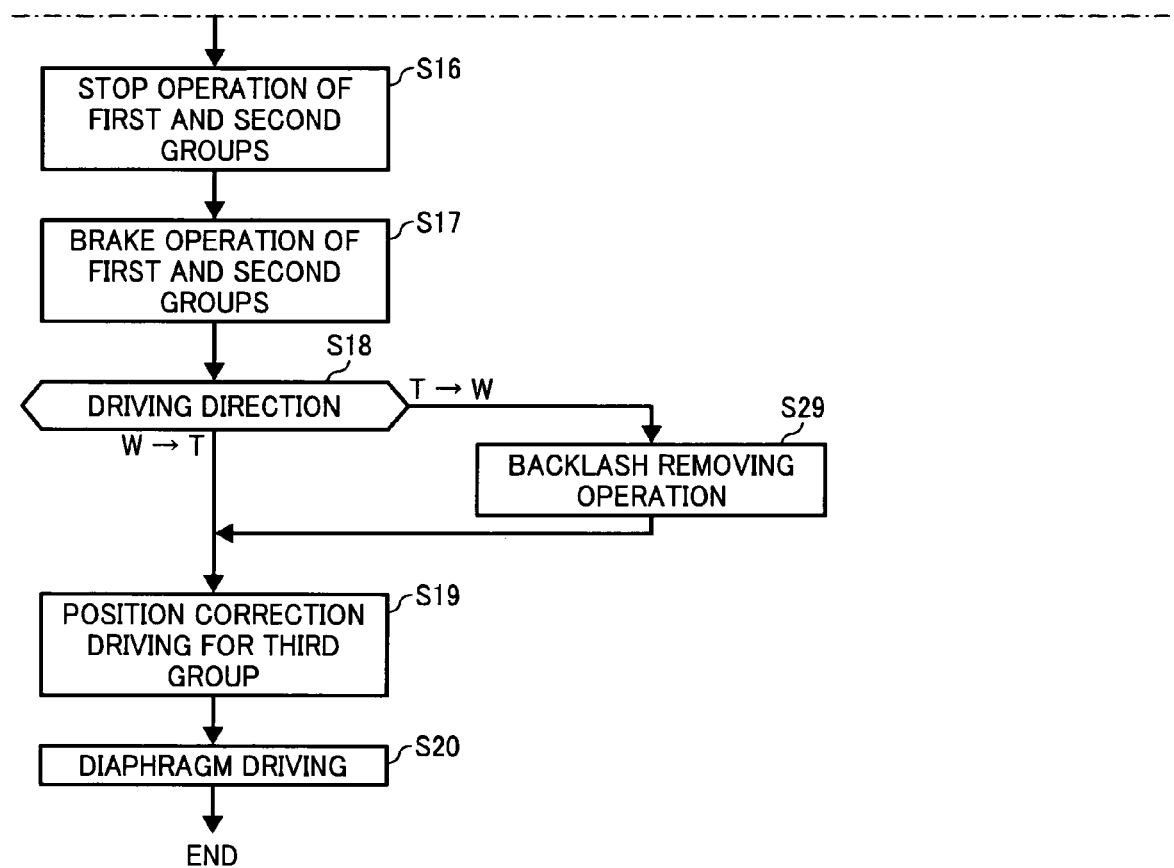
FIG. 26 is a flowchart showing zoom sequences.
Figure 28:
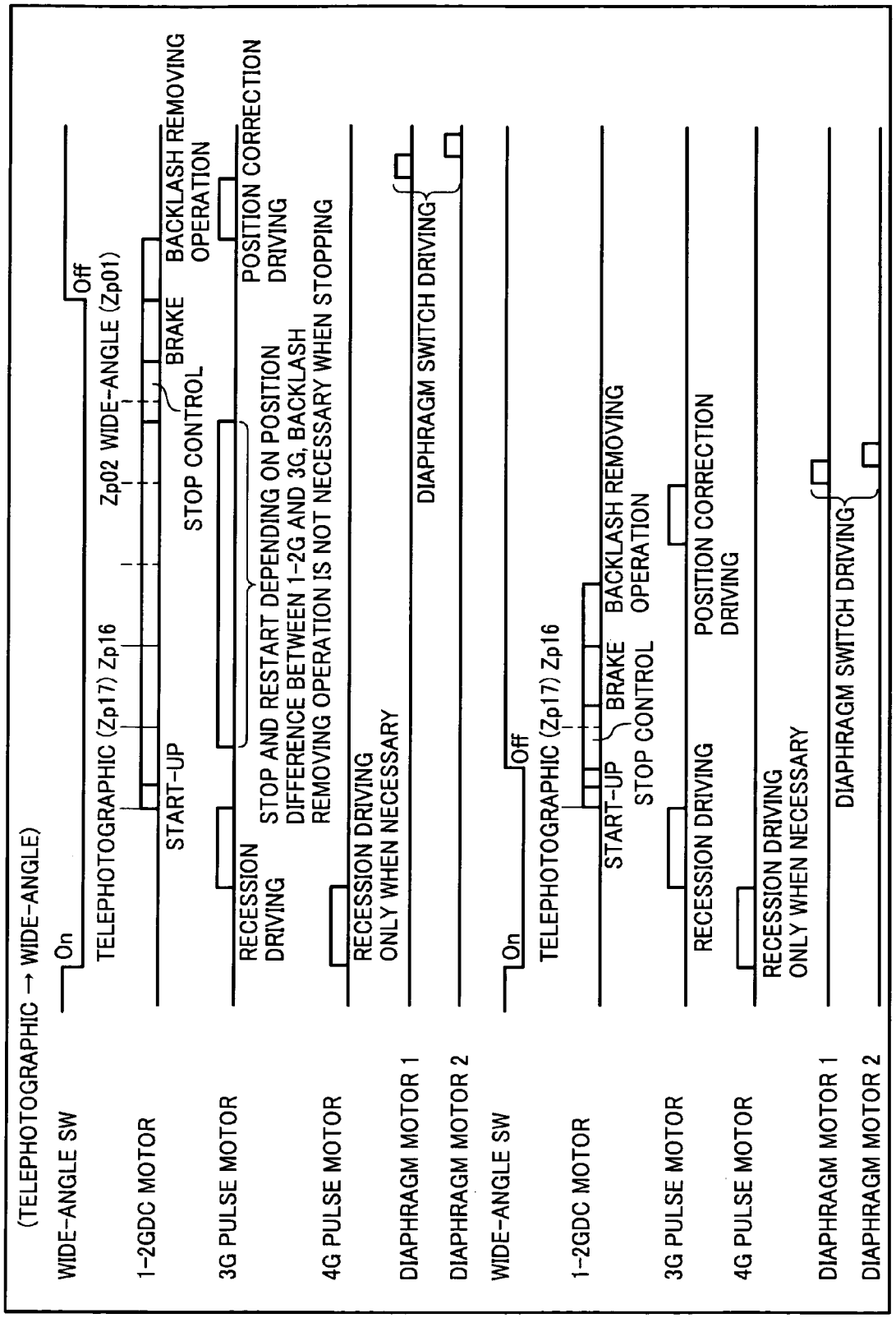
FIG. 28 is a timing chart showing zoom sequences at the time of zooming from the wide-angle position to the telephotographic position.

FIG. 21 is a block diagram schematically showing a configuration of a drive control system. FIG. 22 is a timing chart showing sequences at the time of opening a barrier in start-up sequences. FIG. 23 is a timing chart showing sequences from the time of opening the barrier to the time of closing the barrier in the start-up sequences. FIGS. 24A1 and 24A2 are a chart and FIG. 24B is a timing chart for explaining reset sequences. FIG. 25 is a timing chart showing housing sequences at the time of closing the barrier. FIG. 26 is a flowchart showing zoom sequences. FIG. 27 is a timing chart showing zoom sequences at the time of zooming from the telephotographic position to the wide-angle position. FIG. 28 is a timing chart showing zoom sequences at the time of zooming from the wide-angle position to the telephotographic position.

The drive control system in FIG. 21 includes a central processing unit 501, a motor driver 502, a first-and-second group DC motor 503, a first diaphragm motor 504, a second diaphragm motor 505, a shutter motor 506, a third group pulse motor 507, a fourth group pulse motor 508, a first-and-second group photo interrupter 509, a first-and-second group photo reflector 510, a third group photo interrupter 511, a fourth group photo interrupter 512, a first-and-second group photo interrupter drive circuit 513, a first-and-second group photo reflector drive circuit 514, a third group photo interrupter drive circuit 515, and a fourth group photo interrupter drive circuit 516.

The central processing unit 501 provides the motor driver 502 with commands for initial setting of the motor driver 502, selection of the drive motor, setting of a drive voltage, a driving direction, and so forth. In accordance with the commands from the central processing unit 501, the motor driver 502 controls a motor system including the first-and-second group DC motor 503, the first diaphragm motor 504, the second diaphragm motor 505, the shutter motor 506, the third group pulse motor 507, the fourth group pulse motor 508, and so forth. The first-and-second group DC motor 503 drives the first lens group 11 and the second lens group 12. In a normal case, the first lens group 11 and the second lens group 12 are driven independently of each other through cam mechanisms that react to a drive force of the first-and-second group DC motor 503. The first diaphragm motor 504 and the second diaphragm motor 505 drive a diaphragm in the shutter/diaphragm unit 15. The shutter motor 506 drives a shutter in the shutter/diaphragm unit 15. The third group pulse motor 507 drives the third lens group 13. The fourth group pulse motor 508 drives the fourth lens group 14.

In addition, the central processing unit 501 supplies driving power to the first-and-second group photo interrupter 509, the first-and-second group photo reflector 510, the third group photo interrupter 511, and the fourth group photo interrupter 512 functioning as position detecting devices through the first-and-second group photo interrupter drive circuit 513, the first-and-second group photo reflector drive circuit 514, the third group photo interrupter drive circuit 515, and the fourth group photo interrupter drive circuit 516. At the same time, the central processing unit 501 also acquires position information signals detected by the first-and-second group photo interrupter 509, the first-and-second group photo reflector 510, the third group photo interrupter 6511, and the fourth group photo interrupter 512. The first-and-second group photo interrupter drive circuit 513, the first-and-second group photo reflector drive circuit 514, the third group photo interrupter drive circuit 515, and the fourth group photo interrupter drive circuit 516 further have functions to control respective light projection currents and respective output signal levels to the first-and-second group photo reflector 510, the third group photo interrupter 511, and the fourth group photo interrupter 512 appropriately. The motor driver 502 executes the commands upon receipt of the commands from the central processing unit 501, thereby setting a designated voltage and performs drive control in response to drive command timing for the motor selected from the first-and-second group DC motor 503, the first diaphragm motor 504, the second diaphragm motor 505, the shutter motor 506, the third group pulse motor 507, the fourth group pulse motor 508.

A driving sequence in the start-up sequences to be performed by the above-described drive control system at the time of opening the barrier will be described with reference to FIG. 22.

A barrier switch signal (barrier SW) changes from H to L by opening the lens barrier 62, and initial setting of the lens barrel is started. Here, concerning the lens barrier 62, the barrier switch may be activated by mechanically opening the lens barrier 62 with an operating lever or the like. Alternatively, the barrier may be opened by activating the barrier switch. The initial setting process is intended to perform initialization of the motor driver 502 for driving the motor system and initialization of the first-and-second group photo interrupter 509, the first-and-second group photo reflector 510, the third group photo interrupter 511, and the fourth group photo interrupter 512, all of which are the position detecting devices for detecting the positions through the first-and-second group photo interrupter drive circuit 513, the first-and-second group photo reflector drive circuit 514, the third group photo interrupter drive circuit 515, and the fourth group photo interrupter drive circuit 516.

The first-and-second group DC motor 503 is driven in the direction to the wide-angle position in the case when a detection result by the first-and-second group photo interrupter 509 for detecting the positions of the first and second groups turns out to be the housed positions, when a detection result by the third group photo interrupter 511 for detecting the position of the third group turns out to be the housed position, and when a detection result by the fourth group photo interrupter 512 for detecting the position of the fourth group turns out to be the housed position. A drive amount by the first-and-second group DC motor 503 is detected by use of the first-and-second group photo interrupter 509 for detecting amounts of movement of the first and second groups. The amounts of movement are detected by counting edges of pulse-shaped signals (PI signals) by the first-and-second group photo interrupter 509.

In a start-up period immediately after commencing the start-up of the first-and-second group DC motor 503, the drive voltage is set lower than a constant voltage in order to prevent an inrush current attributable to the DC motor. After completion of the start-up period, the drive current is raised to the constant voltage.

A barrier switch (barrier SW) monitoring period is set up immediately after commencing the start-up of the first-and-second group DC motor 503, and the state of the barrier switch signal is monitored by the central processing unit 501. During this period, the shutter motor 506 for driving the shutter performs full-open control when the barrier switch signal shows an open state, and the shutter is thereby set to a fully open state. Next, medium-aperture control is performed by the first and second diaphragm motors 504 and 505 to set up a medium-aperture state.

Next, prior driving of the fourth lens group 14 is performed by the fourth group pulse motor 508. A total time period from a start of driving the first and second lens group to completion of finally driving the fourth lens group 14 is reduced by performing this prior driving of the fourth lens group 14. Meanwhile, a torque at the time of driving is increased by setting a pulse rate when driving the fourth group pulse motor in the course of the prior driving slower than normal driving. In this way, it is possible to avoid mechanism portions from being caught, for example.

Here, a drive amount by the fourth group pulse motor 508 at the time of the prior driving is set to an amount not to cause interference between the fourth lens group 14 and the third lens group 13.

When the prior driving of the fourth lens group 14 is completed, the first and second lens groups 11 and 12 wait for detection of the reference positions by the first-and-second group photo reflector 510. Points where the respective reference position signals (HP signals) from the first-and-second group photo reflector 510 change from H to L become the respective reference positions (HP positions) of the first and second lens groups 11 and 12. When the reference positions (HP positions) of the first and second lens groups 11 and 12 are detected, the position information of the first and second lens groups 11 and 12 is reset. The amounts of movement of the first and second lens groups are controlled by counting the pulse-shaped signals (PI signals) from the first-and-second group photo interrupter 509, which are equivalent to the amounts of movement from the respective reference positions to the wide-angle positions (Wide). Although the wide-angle positions are preset, it is possible to modify the wide-angle positions by storing the wide-angle positions in a non-volatile memory such as an electrically erasable programmable read-only memory (EEPROM) and to rewrite the wide-angle positions later.

A prescribed pulse period before reaching the wide-angle is defined as a stop control period. Here, an overrun when reaching the wide-angle position is reduced by lowering the drive voltage in response to the remaining number of pulses to the wide-angle position. When reaching the wide-angle position by counting the PI signals from the first-and-second group photo interrupter 509, brake control is performed in order to stop driving of the first and second lens groups 11 and 12. The overrun amount during this braking period is also counted and final positions of the first and second lens groups 11 and 12 are thus determined.

Meanwhile, upon detection of the reference position (HP position) of the first and second lens groups 11 and 12, driving of the third group pulse motor 507 in the wide-angle direction is started and the third lens group 13 is controlled in parallel to first and second lens groups 11 and 12. A driving time period for the third lens group 13 is reduced by setting a pulse rate, when driving the third group pulse motor, higher (faster) than the normal driving.

Then, the third lens group 13 waits for detection of the reference position by the third group photo interrupter 511. A point where the reference position signal (HP signal) from the third group photo interrupter 511 changes from H to L becomes the reference position (HP position) of the third lens group 13. When the reference position (HP position) of the third lens group 13 is detected, the position information of the third lens group 13 is reset. The third group pulse motor 507 performs pulse driving equivalent to the amount of movement from the reference position to the wide-angle position. Although the wide-angle position is preset, it is possible to modify the wide-angle position by storing the wide-angle position in a non-volatile memory such as an EEPROM and to rewrite the wide-angle position later.

Moreover, a final stop position of the third lens group 13 becomes a position considering the overrun of the first and second lens groups 11 and 12. Specifically, each of the stop positions of the first and second lens groups 11 and 12 is equal to the wide-angle position+an amount of overrun. Accordingly, the stop position of the third lens group 13 also becomes equal to the wide-angle position+a in consideration of the overrun of the first and second lens groups 11 and 12. This value a is obtained by linear operation applying the number of pulses for a zoom position interval of the first and second lens groups 11 and 12, the amount of overrun, and the number of pulses for the zoom position interval of the third lens group 13, for example. The zoom position interval is equivalent to an interval obtained by dividing a wide angle-to-telephotographic interval (W-T interval) by 16.

While the driving of the first and second groups of the lenses 11 and 12 is completed, the reference position (HP position) of the third lens group 13 is detected, and then the third lens group 13 is driven for a distance equivalent to a prescribed number of pulses or longer. Then, driving of the fourth group pulse motor 508 to a direction of a wide-angle infinite-distance position is started. When the driving of the first and second lens groups 11 and 12 is not completed or when the third lens group 13 is not driven for the distance equivalent to the prescribed number of pulses or longer away from the reference position, the fourth group pulse motor 508 stands by until the driving of the first and second lens groups 11 and 12 is completed and the third lens group 13 is driven for the distance equivalent to the prescribed number of pulses or longer away from the reference position. If the fourth group pulse motor 508 is driven before the driving of the first and second lens groups 11 and 12 is completed, the three motors will be driven at the same time and current consumption will be thereby increased. Accordingly, in this example, only the third lens group 13 and the fourth lens group 14 are allowed to be driven at the same time. Meanwhile, the interference occurs between the third lens group 13 and the fourth lens group 14 if the fourth lens group 14 is driven before the third lens group 13 reaches the position equivalent to the prescribed number of pulses or longer away from the reference position. Therefore, the driving of the fourth lens group 14 is supposed to be started after a lapse of the prescribed number of pulses.

The fourth lens group 14 was for detection of the reference position by the fourth group photo interrupter 512. Moreover, the current consumption is reduced by setting the drive voltage to be applied when driving the fourth group pulse motor is set lower than the normal driving. A point where the reference position signal (HP signal) from the fourth group photo reflector 512 changes from L to H becomes the reference position (HP position) of the fourth lens group 14. When the reference position (HP position) of the fourth lens group 14 is detected, the position information of the fourth lens group 14 is reset. By using this position as reference, the amount of movement of the fourth lens group 14 to a wide-angle infinite-distance position is achieved by means of pulse driving with the fourth group pulse motor 508. Although the wide-angle position is preset, it is possible to modify the wide-angle position by storing the wide-angle position in a non-volatile memory such as an EEPROM and to rewrite the wide-angle position later.

As described above and shown in the timing chart in FIG. 22, in this example, the maximum number of motors driven at the same time is set at two. Accordingly, the current consumption is suppressed and the optimum driving is achieved. As a result, the start-up period is reduced.

Next, a case when the barrier switch signal changes into a closed state in the barrier switch monitoring period immediately after commencing the start-up of the first-and-second group DC motor 503 will be described with reference to FIG. 23. The driving of the first-and-second group DC motor 503 is stopped when the barrier switch signal changes from the open state to the closed state in this period. Thereafter, the first-and-second group DC motor 503 is driven in the housing direction equivalent to either the amount of movement or the prescribed number of pulses. In this case, the drive voltage is set to a low voltage so as to avoid occurrence of destruction or damage even if an active portion hits a housing end. This control can prevent interference with the barrier.

Meanwhile, reset sequence driving is performed in any of the following cases where the detection result by the first-and-second group photo reflector 510 is not equivalent to the housed position (reference (HP) signal=L), where the detection result by the third group photo reflector 511 is not equivalent to the housed position (reference (HP) signal=H), or where the detection result by the fourth group photo reflector 512 is not equivalent to the housed position (reference (HP) signal=H). Such reset sequences will be described with reference to FIGS. 24A1 and 24A2. FIGS. 24A1 and 24A2 show a schematic chart showing flows of the reset sequences in various conditions and FIG. 24B is a timing chart of the reset sequences.

(When first-and-second HP signal=H, third group HP signal=L, and fourth group HP signal=L)

First, as a resetting operation of the first-and-second lens groups 11 and 12, the reference positions (HP positions) of the first and second lens groups 11 and 12 are detected, and the first and second lens groups 11 and 12 are moved to the wide-angle positions (first and second groups: Reset). Next, as a housing operation of the fourth lens group 14, the reference position (HP position) of the fourth lens group 14 is detected, and the fourth lens group 14 is moved to the housed position (fourth group: Housed). Next, as a resetting operation of the third lens group 13, the reference position (HP position) of the third lens group 13 is detected, and the third lens group 13 is moved to the wide-angle position (third group: Reset). Lastly, as a resetting operation of the fourth lens group 14, the reference position (HP position) of the fourth lens group 14 is detected, and the fourth lens group 14 is moved to the wide-angle infinite-distance position (fourth group: Reset).

(When first-and-second HP signal=H, third group HP signal=, and fourth group HP signal=H)

First, as a retracting operation of the first-and-second lens groups 11 and 12, the first and second lens groups 11 and 12 are driven in the telephotographic (Tele) direction and performs driving for prescribed pulses after detection of a falling edge of the reference signal (first and second groups: Retract). Next, as a housing operation of the fourth lens group 14, the reference position (HP position) of the fourth lens group 14 is detected, and the fourth lens group 14 is moved to the housed position (fourth group: Housed). Next, as a resetting operation of the first-and-second lens groups 11 and 12, the reference position (HP position) of the first and second lens groups 11 and 12 is detected, and the first and second lens groups 11 and 12 are moved to the wide-angle positions (first and second groups: Reset). Next, as a resetting operation of the third lens group 13, the reference position (HP position) of the third lens group 13 is detected, and the third lens group 13 is moved to the wide-angle position (third group: Reset). Lastly, as a resetting operation of the fourth lens group 14, the reference position (HP position) of the fourth lens group 14 is detected, and the fourth lens group 14 is moved to the wide-angle infinite-distance position (fourth group: Reset).

(When first-and-second HP signal=H, third group HP signal=H, and fourth group HP signal=L or when first-and-second HP signal=H, third group HP signal=H, and fourth group HP signal=H)

First, as a retracting operation of the first-and-second lens groups 11 and 12, the first and second lens groups 11 and 12 are driven in the telephotographic direction and performs driving for prescribed pulses after detection of a falling edge of the reference signal (first and second groups: Retract). Next, as a housing operation of the fourth lens group 14, the reference position (HP position) of the fourth lens group 14 is detected, and the fourth lens group 14 is moved to the housed position (fourth group: Housed). When the reference position (HP position) of the fourth lens group 14 is detected successfully, as a housing operation of the third lens group 13, the reference position (HP position) of the third lens group 13 is detected and the third lens group 13 is moved to the housed position (third group: Housed). When the reference position (HP position) of the fourth lens group 14 is not detected successfully, it is assumed to be attributable to the interference with the third lens group 13. Accordingly, the housing operation of the third lens group 13 is carried out in advance (third group: Housed). When the housing operation of the third lens group 13 is completed, a housing operation of the fourth lens group 14 is carried out subsequently (fourth group: Housed). When the HP position is not detectable in the course of the housing operation of the third lens group 13, it is assumed to be attributable to the interference with the fourth lens group 14. Accordingly, as a retracting operation of the third lens group 13, the third lens group 13 is driven in the telephotographic direction for prescribed pulses (third group: Retract). Thereafter, a housing operation of the fourth lens group 14 (fourth group: Housed) and a housing operation of the third lens group 13 (third group: Housed) are carried out. Next, as a resetting operation of the first-and-second lens groups 11 and 12, the reference positions (HP positions) of the first and second lens groups 11 and 12 are detected, and the first and second lens groups 11 and 12 are moved to the wide-angle positions (first and second groups: Reset). Next, as a resetting operation of the third lens group 13, the reference position (HP position) of the third lens group 13 is detected, and the third lens group 13 is moved to the wide-angle position (third group: Reset). Lastly, as a resetting operation of the fourth lens group 14, the reference position (HP position) of the fourth lens group 14 is detected, and the fourth lens group 14 is moved to the wide-angle infinite-distance position (fourth group: Reset).

(When first-and-second HP signal=L, third group HP signal=L, and fourth group HP signal=L or when first-and-second HP signal=L, third group HP signal=L, and fourth group HP signal=H)

First, as a housing operation of the fourth lens group 14, the reference position (HP position) of the fourth lens group 14 is detected, and the fourth lens group 14 is moved to the housed position (fourth group: Housed). Next, as a housing operation of the third lens groups 13, the reference position (HP position) of the third lens group 13 is detected, and the third lens group 13 is moved to the housed position (third group: Housed). Then, as a resetting operation of the first-and-second lens groups 11 and 12, the reference positions (HP positions) of the first and second lens groups 11 and 12 are detected, and the first and second lens groups 11 and 12 are moved to the wide-angle positions (first and second groups:

Reset). Next, as a resetting operation of the third lens group 13, the reference position (HP position) of the third lens group 13 is detected, and the third lens group 13 is moved to the wide-angle position (third group: Reset). Lastly, as a resetting operation of the fourth lens group 14, the reference position (HP position) of the fourth lens group 14 is detected, and the fourth lens group 14 is moved to the wide-angle infinite-distance position (fourth group: Reset).

(When first-and-second HP signal=L, third group HP signal=H, and fourth group HP signal=L or when first-and-second HP signal L, third group HP signal=H, and fourth group HP signal=H)

First, as a housing operation of the fourth lens group 14, the reference position (HP position) of the fourth lens group 14 is detected, and the fourth lens group 14 is moved to the housed position (fourth group: Housed). When the reference position (HP position) of the fourth lens group 14 is detected successfully, as a housing operation of the third lens group 13, the reference position (HP position) of the third lens group 13 is detected and the third lens group 13 is moved to the housed position (third group: Housed).

When the reference position (HP position) of the fourth lens group 14 is not detected successfully, it is assumed to be attributable to the interference with the third lens group 13. Accordingly, the housing operation of the third lens group 13 is carried out in advance (third group: Housed). When the housing operation of the third lens group 13 is completed, a housing operation of the fourth lens group 14 is carried out subsequently (fourth group: Housed).

When the HP position is not detectable in the course of the housing operation of the third lens group 13, it is assumed to be attributable to the interference with the fourth lens group 14. Accordingly, as a retracting operation of the third lens group 13, the third lens group 13 is driven in the telephotographic direction for prescribed pulses (third group: Retract). Thereafter, a housing operation of the fourth lens group 14 (fourth group: Housed) and a housing operation of the third lens group 13 (third group: Housed) are carried out.

Next, as a resetting operation of the first-and-second lens groups 11 and 12, the reference positions (HP positions) of the first and second lens groups 11 and 12 are detected and the first and second lens groups 11 and 12 are moved to the wide-angle positions (first and second groups: Reset). Next, as a resetting operation of the third lens group 13, the reference position (HP position) of the third lens group 13 is detected and the third lens group 13 is moved to the wide-angle position (third group: Reset). Lastly, as a resetting operation of the fourth lens group 14, the reference position (HP position) of the fourth lens group 14 is detected and the fourth lens group 14 is moved to the wide-angle infinite-distance position (fourth group: Reset).

The barrier switch signal changes from L to H by closing the lens barrier 62, and a housing operation is started. As described previously, concerning the lens barrier 62, the barrier switch may be operated by mechanically closing the lens barrier 62 with the operating lever or the like. Alternatively, the lens barrier 62 may be closed by operating the barrier switch.

The shutter motor 506 performs full-closed control, and the shutter in the shutter/diaphragm unit 15 is thereby set to a fully closed state. Next, medium-aperture control is performed by the first and second diaphragm motors 504 and 505, and the diaphragm in the shutter/diaphragm unit 15 is thereby set to a medium-aperture state. The fourth group pulse motor 508 starts driving in the direction to the housed position and waits for detection of the reference position by the fourth group photo interrupter 512.

Pulse driving is performed in an amount of movement to the housed position, from a point where the reference position signal (HP signal) from the fourth group photo interrupter 512 changes from H to L, to the housed position. Although the amount of movement to the housed position is preset, it is possible to modify the amount of movement to the housed position by storing the amount of movement to the housed position in a non-volatile memory such as an EEPROM, and to rewrite the amount of movement to the housed position later.

Next, housing driving of the third lens group 13 is performed by the third group pulse motor 507. The third group pulse motor 507 starts driving in the direction to the housed position and waits for detection of the reference position by the third group photo interrupter 511.

Pulse driving is performed in an amount of movement to the housed position, from a point where the reference position signal (HP signal) from the third group photo interrupter 511 changes from H to L, to the housed position. Although the amount of movement to the housed position is preset, it is possible to modify the amount of movement to the housed position by storing the amount of movement to the housed position in a non-volatile memory such as an EEPROM, and to rewrite the amount of movement to the housed position later.

Moreover, a driving pulse rate of the third group pulse motor 507 from the reference position to the housed position is set slower than a driving pulse rate to the reference position. Smooth pulse driving is achieved by modifying the pulse rate as described above in response to a region requiring more torque.

Next, housing driving of the first and second lens groups 11 and 12 is performed by the first-and-second group DC motor 503. The first-and-second group DC motor 503 starts driving in the direction to the housed position and waits for detection of the reference position by the first-and-second group photo reflector 610. Now, assume that the first and second lens group 11 and 12 is moved to the housed position from respective points where the reference position signals (HP signals) from the first-and-second group photo interrupter 509 change from L to H. In this case, the amount of movement to the housed position is controlled by counting the pulse-shaped signals (PI signals) from the first-and-second group photo interrupter 509. Although the amounts of movement to the housed position are preset, it is possible to modify the amounts of movement to the housed position by storing the amounts of movement to the housed position in a non-volatile memory such as an EEPROM, and to rewrite the amounts of movement to the housed position later.

At the time of housing driving of the first and second lens groups 11 and 12, the PI signals from the first-and-second group photo interrupter 509 are counted without decreasing the voltage before stopping. When reaching the housing position, brake control is performed to stop driving the first and second lens groups 11 and 12. This operation is carried out in order to reduce a stop on the way caused by decreasing the voltage, Next, sequences in a magnification change operation will be described with reference to a flowchart shown in FIG. 26.

When a magnification change process is started by operating a zoom lever or a zoom button, for example, a judgment is firstly made as to whether or not it is necessary to cause the fourth lens group 14 to retract (Step S1). This judgment in Step S11 will be defined such that a retracting process is required when the magnification change is attempted from the telephotographic position to the wide-range position and when the fourth lens group 14 is located in a nearer side than a predetermined position. Next, a driving direction of the magnification change is determined (Step S12). In the case of the magnification change is from the wide-angle position to the telephotographic position, driving of the first and second lens groups 11 and 12 is started by operating the first-and-second group DC motor 503 (Step S13).

Next, a judgment is made as to whether or not it is appropriate to stop the first and second lens groups 11 and 12 (Step S14). This judgment in Step S14 will be defined such that it is appropriate to stop the first and second lens groups 11 and 12 in any of the following cases: where a zoom drive switch, which is configured to be operated by magnification change operation with the zoom lever, the zoom button or the like, is turned off; where the first and second lens groups 11 and 12 reach a position which is located in front of the telephotographic position by a predetermined amount, in the case of driving from the wide-angle position to the telephotographic position; and where the first and second lens groups 11 and 12 reach a position which is located in front of the wide-angle position by a predetermined amount, in the case of driving from the telephotographic position to the wide-angle position.

When stopping the first and second lens groups 11 and 12, a judgment is made as to whether or not the third lens group 13 is in operation (Step S15), then a stopping operation of the first and second lens groups 11 and 12 is executed when the third lens group 13 is not in operation (Step S16), and then a braking operation of the first and second lens groups 11 and 12 is executed (Step S17). Next, the driving direction of the magnification change is determined (Step S18). In the case of the magnification change from the wide-angle position to the telephotographic position, the third lens group 13 is subjected to position correction driving (Step S19), then diaphragm driving is executed (Step S20), and then the process is terminated (goes back to an operation standby state).

When a judgment is made in Step S11 that it is necessary to cause the fourth lens group 14 to retract, a retracting operation of the fourth lens group 14 is executed (Step S21) and then the process goes to Step S12. When the judgment is made in Step S12 that the driving direction of the magnification change is in the direction from the telephotographic position to the wide-angle position, a retracting operation of the third lens group 13 is executed (Step S22) and then the process goes to Step S14.

When a judgment is made in Step S14 that it is appropriate to continue to drive the first and second lens groups 11 and 12 without stopping, a judgment is made as to whether or not the third lens group 13 is in operation (Step S23), and then a judgment is made as to whether or not it is appropriate to start driving the third lens group 13 when the third lens group 13 is not in operation (Step S24). In Step S24, driving of the third lens group 13 will be permitted in any of the following three cases. First, the first and second lens groups 11 and 12 are driven in a prescribed driving amount or longer after starting the driving of the first and second lens groups 11 and 12. Second, assume that the driving of the third lens group 13 is to be restarted making the third lens group 13 be in operation while driving from the wide angle to the telephotography. When the first and second lens groups 11 and 12 pass respective predetermined zoom points, the distance from the third lens group 13 to the first and second lens groups 11 and 12 is equal to or longer than a predetermined length. Third, assume that the driving of the third lens group 13 is to be restarted making the third lens group 13 be in operation while driving from the telephotography to the wide angle. When the first and second lens groups 11 and 12 pass respective predetermined zoom points, the distance from the third lens group 13 to the first and second lens groups 11 and 12 is equal to or shorter than a predetermined length. the third lens group 13 at the time of driving from the telephotographic position to the wide-angle position is in operation due to the restart of driving, and the position of the third lens group 13 is located nearer than the position of the first and second lens groups 11 and 12 by the predetermined amount when passing the predetermined zoom point. When the driving of the third lens group 18 is permitted in Step S24, the driving of the third lens group 13 is started (Step S25) and then the process returns to Step S14. When the driving of the third lens group 13 is not permitted in Step S24, the process returns directly to Step S14.

When a judgment is made in Step S23 that the third lens group 13 is in operation, a judgment is made as to whether or not it is appropriate to stop the driving of the third lens group 13 (Step S26). This judgment in Step S64 will be defined such that a shutdown of the driving of the third lens group 13 will be permitted in any of the following cases: where the position of the third lens group 13 at the time of driving from the wide-angle position to the telephotographic position is located closer to the position of the first and second lens groups 11 and 12 by the predetermined amount, and where the third lens group 13 at the time of driving from the telephotographic position to the wide-angle position is away from the position of the first and second lens groups 11 and 12 by the predetermined amount. When the shutdown of the driving of the third lens group 13 is permitted in Step S26, a stopping operation of the third lens group 13 is started (Step S27) and then the process returns to Step S14. When the shutdown of the driving of the third lens group 13 is not permitted in Step S26, the process returns directly to Step S14.

When a judgment is made in Step S15 that the third lens group 13 is in operation, a stopping operation of the third lens group 13 is started (Step S28) and then the process goes to Step S16. When a judgment is made in Step S18 that the driving direction of the magnification change is determined as the magnification change from the telephotographic position to the wide-angle position, a backlash removing operation is executed (Step S29) and then the process goes to Step S19.

Next, the magnification change operation in accordance with this flowchart will be described more concretely for each direction of the magnification change operation.

First, the magnification change operation from the wide-angle position to the telephotographic position will be described with reference to a timing chart shown in FIG. 27.

A telephotographic switch signal changes from H to L by pressing a telephotographic button out of zooming buttons, thereby a magnification change sequence to the telephotographic position is started. First, the recession judgment of the fourth lens group 14 is carried out (Step S11). As described previously, upon the recession judgment of the fourth lens group 14, recession driving of the fourth lens group 14 is carried out only when the following conditions are satisfied at the same time (AND conditions).

The magnification change driving is directed from the telephotographic position to the wide-angle position; and
The fourth lens group 14 is located closer (to the extended side) than a predetermined position (a recession threshold).

However, these conditions are not satisfied at the time of the driving from the wide-angle position to the telephotographic position. Accordingly, the recession driving of the fourth lens group 14 is not carried out in this case.

Next, the judgment is made as to whether or not it is appropriate to subject the third lens group 13 to recession driving depending on the driving direction (Step S12). In the case of the magnification change driving from the wide-angle position to the telephotographic position, the recession driving of the third lens group 13 is not necessary. Then, the first-and-second group DC motor 503 starts driving the first and second lens groups 11 and 12 (Step S13). During the start-up period immediately after commencing the start-up of the first-and-second DC motor 503, the drive voltage is set lower than the constant voltage in order to prevent an inrush current attributable to the DC motor. The drive voltage is raised to the constant voltage after completion of this start-up period. Meanwhile, the drive voltage in the space between the wide-angle position and the telephotographic position is set lower than the drive voltage in the space between the housed position and the wide-angle position. This is because the space between the housed position and the wide-angle position requires a high speed and is therefore set to a high voltage. Meanwhile, the space between the wide-angle position and the telephotographic position is set to an appropriate voltage level so as to achieve a stop in a desired position by operating the zoom button. The control of the amount of movement by driving the first and second lens groups 11 and 12 is performed by counting the pulse-shaped signals (PI signals) from the first-and-second photo interrupter 509. Moreover, 17 zoom points are set up for the purpose of control reference by dividing the space between the wide-angle position and the telephotographic position by 16, for example.

Next, the judgment is made as to whether or not it is appropriate to stop the first and second lens groups 11 and 12 (Step S14). Upon the judgment to stop the driving of the first and second lens groups 11 and 12, the stopping operation is carried out when any of the following conditions is satisfied (OR condition):

The telephotographic zoom drive switch to be operated by the magnification change operation with the zoom lever, the zoom button or the like is turned off, i.e. the signal changes from L to H; or The first and second lens groups 11 and 12 reach the position in front of the telephotographic position by the predetermined amount in the case of driving from the wide-angle position to the telephotographic position.

When continuing the driving of the first and second lens groups 11 and 12, the judgment is made as to whether the driving of the third lens group 13 is to be started or stopped depending on the condition of the third lens group 13 (whether the third lens group 13 is driven or stopped) (Step S23). When the third lens group 13 is stopped, the judgment of the start to drive the third lens group 13 is carried out (Step S24), and the driving of the third lens group 13 is started when permitted.

Upon the judgment to start the driving of the third lens group 13 in Step S24, the driving of the third lens group 13 is started when any of the following conditions is satisfied:

The first and second lens groups 11 and 12 are driven in the prescribed driving amount or longer after starting the driving of the first and second lens groups 11 and 12; or The third lens group 13 at the time of driving from the wide-angle position to the telephotographic position is in operation due to the restart of driving and the position of the third lens group 13 is located away from the position of the first and second lens groups 11 and 12 by the predetermined amount or longer when passing the predetermined zoom point.

Meanwhile, when the third group is in operation, the judgment is made as to whether or not it is appropriate to stop the driving of the third lens group 13 (Step S26). The driving of the third lens group 13 is stopped when permitted.

Upon the judgment as to whether or not it is appropriate to stop the driving of the third lens group 13, the driving of the third lens group 13 is stopped when the following condition is satisfied:

The position of the third lens group 13 at the time of driving from the wide-angle position to the telephotographic position is located closer to the position of the first and second lens groups 11 and 12 by the predetermined amount.

Specifically, the driving of the third lens group 18 is started when the first and second lens groups 11 and 12 are started and the driving amount of the first and second lens groups 11 and 12 reaches the prescribed pulses or more. The driving of the third lens group 13 is stopped when the position of the third lens group 13 approaches the first and second lens groups 11 and 12 closer to the predetermined amount in the course of the driving at the same time. Thereafter, the driving of the third lens group 13 is restarted when the first and second lens groups 11 and 12 retract from the third lens group 13 by a distance equal to or longer than the predetermined amount. The driving operation and the stopping operation of the third lens group 13 will be repeated in response to positional relations between the first and second lens groups 11 and 12 and the third lens group 18. In this way, it is possible to achieve the magnification change driving while maintaining distances between the groups. Moreover, it is possible to avoid an influence of an inrush current of the first-and-second group DC motor 603 by starting the driving of the third lens group 13 after passage of the driving in an amount equal to or more than the prescribed amount at the time of the start-up. This operation will contribute to reduction in the current consumption.

When the telephotographic switch signal changes from L to H before starting the initial driving of the third lens group 13, the stop control of the first and second lens groups 11 and 12 is performed without driving the third lens group 13 at the same time. When the judgment is made that it is appropriate to stop the first and second lens groups 11 and 12, the stopping operation of the third lens group 13 is started if the third lens group 13 is already in operation. Thereafter, the stopping operation of the first and second lens groups 11 and 12 is started. The stopping operation is defined as a low-speed control period and the drive voltage is decreased in response to the remaining number of pulses to a target position. In this way, the amount of overrun is reduced when reaching the target position. While counting the PI signals from the first-and-second photo interrupter 509, the brake control is executed to stop driving the first and second lens groups 11 and 12 when reaching the target position. The amount of overrun during this braking period is also counted, and the final positions of the first and second lens groups 11 and 12 are thus determined.

Driving for correction of the position of the third lens group 13 takes place after the first and second lens groups 11 and 12 are stopped. This operation is intended to calculate the stop position of the third lens group 13 corresponding to the final stop positions of the first and second lens groups 11 and 12, and to drive the third lens group 13 to that position. A target stop position of the third lens group 13 corresponding to the stop positions of the first and second lens groups 11 and 12 is obtained by interpolating operation using the position information of the first and second lens groups 11 and 12 in terms of the respective zoom points and the position information of the third lens group 13 in terms of the respective zoom points. Thereafter, diaphragm driving is executed in order to set the diaphragm to have an aperture stop corresponding to the stopped zoom position (Step S20).

Next, the magnification change operation from the telephotographic position to the wide-angle position will be described with reference to a timing chart shown in FIG. 28.

A wide-angle switch signal changes from H to L by pressing a wide-angle button out of the zooming buttons, whereby a magnification change sequence to the wide-angle position is started. First, the recession judgment of the fourth lens group 14 is carried out. As described previously, upon the recession judgment of the fourth lens group 14, recession driving of the fourth lens group 14 is carried out only when the following conditions are satisfied at the same time (AND conditions).

The magnification change driving is directed from the telephotographic position to the wide-angle position; and The fourth lens group 14 is located closer (to the extended side) than a predetermined position (the recession threshold).

At the time of the driving from the telephotographic position to the wide-angle position, the recession driving of the fourth lens group 14 is carried out when the fourth lens group 14 is located closer than the predetermined position. Concerning an amount of recession, the fourth lens group 14 is allowed to retract to a region capable of avoiding the interference of the fourth lens group 14 at the time of the magnification change driving of the third lens group 13.

Next, the third lens group 13 is subjected to the recession driving. In order to prevent the interference with the first and second lens groups 11 and 12 attributable to the start to drive the first and second lens groups 11 and 12, the third lens group 13 is driven in advance in the prescribed amount. Then, the driving of the first and second lens groups 11 and 12 is started by use of the first-and-second group DC motor 503.

During the start-up period immediately after commencing the start-up of the first-and-second DC motor 503, the drive voltage is set lower than the constant voltage in order to prevent an inrush current attributable to the DC motor. The drive voltage is raised to the constant voltage after completion of this start-up period. The control of the amount of movement by driving the first and second lens groups 11 and 12 is performed by counting the pulse-shaped signals (PT signals) from the first-and-second photo interrupter 509. As described previously, 17 zoom points are set up for the purpose of the control reference by dividing the space between the wide-angle position and the telephotographic position by 16, for example.

As described previously, upon the judgment to stop the driving of the first and second lens groups 11 and 12, the stopping operation is carried out when any of the following conditions is satisfied:

The wide-angle zoom drive switch to be operated by the magnification change operation with the zoom lever, the zoom button or the like is turned off, i.e. the signal changes from L to H; or The first and second lens groups 11 and 12 reach the position in front of the wide-angle position by the predetermined amount in the case of driving from the telephotographic position to the wide-angle position.

When continuing the driving of the first and second lens groups 11 and 12, the judgment is made as to whether the driving of the third lens group 13 is to be started or stopped depending on the condition of the third lens group 13 (whether the third lens group 13 is driven or stopped). When the third lens group 13 is stopped, the judgment of the start to drive the third lens group 13 is carried out, and the driving of the third lens group 13 is started when permitted.

Upon the judgment to start the driving of the third lens group 13, the driving of the third lens group 13 is started when any of the following conditions is satisfied:

The first and second lens groups 11 and 12 are driven in the prescribed driving amount or longer after starting the driving of the first and second lens groups 11 and 12; or The third lens group 13 at the time of driving from the telephotographic position to the wide-angle position is in operation due to the restart of driving and the position of the third lens group 13 is located nearer the position of the first and second lens groups 11 and 12 by the predetermined amount when passing the predetermined zoom point.

Meanwhile, when the third lens group 13 is in operation, the judgment is made as to whether or not it is appropriate to stop the driving of the third lens group 13. The driving of the third lens group 13 is stopped when permitted.

Upon the judgment as to whether or not it is appropriate to stop the driving of the third lens group 13, the driving of the third lens group 13 is stopped when the following condition is satisfied:

The position of the third lens group 13 at the time of driving from the telephotographic position to the wide-angle position is located away from the position of the first and second lens groups 11 and 12 by the predetermined amount or longer.

Specifically, the driving of the third lens group 13 is started when the first and second lens groups 11 and 12 are started and the driving amount of the first and second lens groups 11 and 12 reaches the prescribed pulses or more. The driving of the third lens group 13 is stopped when the position of the third lens group 13 retracts away from the first and second lens groups 11 and 12 in the predetermined amount or longer in the course of the driving at the same time. Thereafter, the driving of the third lens group 13 is restarted when the first and second lens groups 11 and 12 approaches the third lens group 13 by a distance equal to or shorter than the distance equivalent to the prescribed number of pulses. The driving operation and the stopping operation of the third lens group 13 will be repeated in response to the positional relations between the first and second lens groups 11 and 12 and the third lens group 13. In this way, it is possible to achieve the magnification change driving while maintaining the distances between the groups. Moreover, it is possible to avoid the influence of an inrush current of the first-and-second group DC motor 503 by starting the driving of the third lens group 13 after passage of the driving in the amount equal to or more than the prescribed amount at the time of the start-up. This operation will contribute to reduction in the current consumption.

Meanwhile, when driving the third lens group 13 at the time of driving the first and second lens groups 11 and 12, it is normally necessary to execute the backlash removing control in the course of the driving in the wide-angle direction in order to remove backlash at the time of stopping. However, the backlash removing control is prohibited during the magnification change so as to achieve intermittent control of the third lens group 13.

When the wide-angle SW signal changes from L to H before starting the initial driving of the third lens group 13, the stop control of the first and second lens groups 11 and 12 is performed without driving the third lens group 13 at the same time. When the judgment is made that it is appropriate to stop the first and second lens groups 11 and 12, the stopping operation of the third lens group 13 is started if the third lens group 13 is already in operation. Thereafter, the stopping operation of the first and second lens groups 11 and 12 is started.

The stopping operation is defined as the low-speed control period and the drive voltage is decreased in response to the remaining number of pulses to the target position. In this way, the amount of overrun is reduced when reaching the target position. While counting the PI signals from the first-and-second photo interrupter 509, the brake control is executed to stop driving the first and second lens groups 11 and 12 when reaching the target position. The amount of overrun during this braking period is also counted, and the final positions of the first and second lens groups 11 and 12 are thus determined.

Moreover, during the operation from the telephotographic direction to the wide-angle direction, the backlash removing operation is executed to remove the backlash.

The driving for correction of the position of the third lens group 13 takes place after stopping the first and second lens groups 11 and 12. This operation is intended to calculate the stop position of the third lens group 13 corresponding to the final stop positions of the first and second lens groups 11 and 12, and to drive the third lens group 13 to that position. The target stop position of the third lens group 13 corresponding to the stop positions of the first and second lens groups 11 and 12 is obtained by interpolating operation using the position information of the first and second lens groups 11 and 12 in terms of the respective zoom points and the position information of the third lens group 13 in terms of the respective zoom points. In the case of the driving in the wide-angle direction, the backlash removing operation for removing the back lash is executed at the time of stopping. Thereafter, the diaphragm driving is executed in order to establish the diaphragm position corresponding to the stopped zoom position.

In this example, in the magnification change operation from the wide-angle position to the telephotographic position, the drive voltage applied to the first-and-second group DC motor 503 at the time of the operation in the wide-angle direction is set higher than the drive voltage applied to the first-and-second group DC motor 503 at the time of the operation in the telephotographic direction. Moreover, in terms of the third group pulse motor 507, the pulse rate at the time of the operation in the wide-angle direction is set faster than the pulse rate at the time of the operation in the telephotographic direction. Meanwhile, in order to maintain the spaces between the first and second lens groups 11 and 12 and the third group, the intermittent control of the third lens group 13 is achieved by use of the positional relations between the first and second lens groups 11 and 12 and the third lens group 13. Therefore, at the time of the driving in the telephotographic direction, a drive speed of the third lens group 13 is set equal to or faster than a drive speed of the first and second lens groups 11 and 12. Similarly, at the time of the driving in the wide-angle direction, the drive speed of the third lens group 13 is set equal to or faster than the drive speed of the first and second lens groups 11 and 12. In this way, the third lens group 13 is driven at the time of the operation in the telephotographic direction so as not to depart from the first and second lens groups 11 and 12, and the third lens group 13 is driven at the time of the operation in the wide-angle direction so as not to be caught up by the first and second lens groups 11 and 12.

As shown in FIGS. 9A and 9B, the solid-state image sensing device 16 such as a charge-coupled device (CCD) is disposed behind the fourth lens group 14 or on the far side from the object. An object image is focused on an input surface of the solid-state image sensing device 16. The input surface of the solid-state image sensing device 16 includes various optical filters, cover glasses, and other optical elements when appropriate.

The lens barrier shown in FIG. 3 to FIG. 6 is configured to cover the object's side of the first lens group 11 in the housed state and to protect the lens group against taint damages and scratches. The lens barrier 62 is driven back and forth in the direction orthogonal to the image-taking optical axis by the barrier drive system 63. FIG. 3 and FIG. 4 show a state of closing the lens barrier, and FIG. 5 shows a state of opening the lens barrier 62 almost completely. The barrier drive system 63 drives the lens barrier 62 in a space between a closed position (FIG. 3 and FIG. 4) and an open position (a position located more distant from the imago-taking optical axis than the position shown in FIG. 5) by an operation of a barrier operating portion (see a barrier operating portion 301 shown in FIG. 17A). This barrier drive system 63 has a function to bias the lens barrier 62 toward a closing direction in the closed position and toward an opening direction in the open position.

Therefore, when the lens barrier 62 in the closed state is operated in the opening direction, the lens barrier 62 moves semi-automatically to the open state after the lens barrier 62 overpasses a predetermined position. On the contrary, in an attempt to close the lens barrier 62 in the open state, the lens barrier 62 transits to the closed state semi-automatically after the lens barrier 62 overpasses a predetermined position (which is not necessarily the same position as the predetermined position in the opening operation; it is rather favorable to provide a certain kind of a hysteresis characteristic in light of achieving a smooth operation).

The barrier control member 61 is provided on a side of the fixed frame 21, to which side the lens barrier 62 is moved when opened. The barrier control member 61 is slidable in the direction along the image-taking optical axis, and is biased toward the object by use of a spring or the like as appropriate. In the housed state, a fitting portion of the barrier control member 61 formed into a bent shape is fitted to the first rotating barrel 22 and the base end surface of the first liner 23 and is biased toward the imaging surface against the biasing force. Here, the barrier control member 61 does not contact the lens barrier 62. In the image-taking state, the fitting portion of the lens barrier 62 is disengaged and is biased toward the object by the biasing force, whereby a harrier blocking portion on a tip end protrudes to a track of the lens barrier.

In an attempt to transition from this state to the housed state, the lens barrier 62 may hit the lens barrel if the lens barrel 62 is abruptly operated. However, the barrier blocking portion on the tip end of the barrier control member 61 comes across the track of the lens barrier 62 and invasion of the lens barrier 62 into the lens barrel portion is thereby blocked. When the respective lens groups are housed and the housed state is established, the first rotating barrel 22 and the base end surface of the first liner 23 are fitted to the fitting portion of the barrier control member 61 formed into the bent shape, thereby biasing the barrier control member 61 toward the imaging surface against the biasing force. Accordingly, the lens barrier 62 is able to move toward a front face portion of the lens barrel and the lens barrier 62 is set properly in the closed position. In this way, it is possible to prevent the interference between the lens barrier 62 and the lens tube portions of the lens groups efficiently.

In the above-described embodiment, the third lens group 13 is configured to retract outside the optical axis. According to the configurations of the present invention, it is possible to reduce a lens barrel projection size efficiently at the time of recession by defining the lens group having the smallest outer diameter as the retracting lens group to retract outside the optical axis. Meanwhile, by configuring the retracting lens group not to be detached very much from the imaging surface at the time of extension, it is possible to reduce a length of drive mechanisms for the retracting lens group (at least one of a length of a main shaft and a length of a lead screw). It is also possible to reduce a thickness of the lens barrel, i.e. to reduce a dimension in the direction of the optical axis. By selecting the lens group which is located behind the shutter having the diaphragm function at the same time and is located closest thereto as the retracting lens group, it is possible to define the lens group having the smallest outer diameter and not being detached from the imaging surface as the retracting lens group. Accordingly, it is easier to achieve recession without considering the interference with the shutter that occludes the plane perpendicular to the optical axis of the lens tube or bypassing the position of the shutter.

In this case, the lens groups include four lens groups, namely, the first lens group having positive magnifying power, the second lens group having negative magnifying power, the third lens group having positive magnifying power, and the fourth lens group having positive magnifying power. The magnification change is achieved by changing at least any of an interval between the first lens group and the second lens group, an interval between the second lens group and the third lens group, and an interval between the third lens group and the fourth lens group. Moreover, focusing is achieved by moving the fourth lens group so as to align the position of an image with the imaging surface. The shutter also having the diaphragm function is located in front of the third lens group. By incorporating four lens groups while defining the third lens group as the retracting lens group, it is possible to define the lens group which is not detached very much from the imaging surface and has the smallest outer diameter as the retracting lens group. Accordingly, it is possible to achieve the lens barrel having a small lens barrel projection size and a thin profile. Moreover, by defining the third lens group out of the four lens groups configured to achieve 4 power magnification or higher as the retracting lens group, it is possible to provide the lens barrel capable of achieving high power magnification while reducing the size of the lens barrel (the projection size and the thickness). Alternatively, the lens groups may include three lens groups, namely, the first lens group having positive magnifying power, the second lens group having negative magnifying power, and the third lens group having positive magnifying power. Each lens group may include at least one lens. The lens group stated herein means at least one or more lenses configured to move integrally. Therefore, it is also possible to construct each of the lens groups by use of a single lens.

Next, an example of constructing a camera (digital camera) by applying an optical device that includes the above-described lens barrel to an image-taking optical system will be described with reference to FIG. 17A to FIG. 19.

Figure 17A:
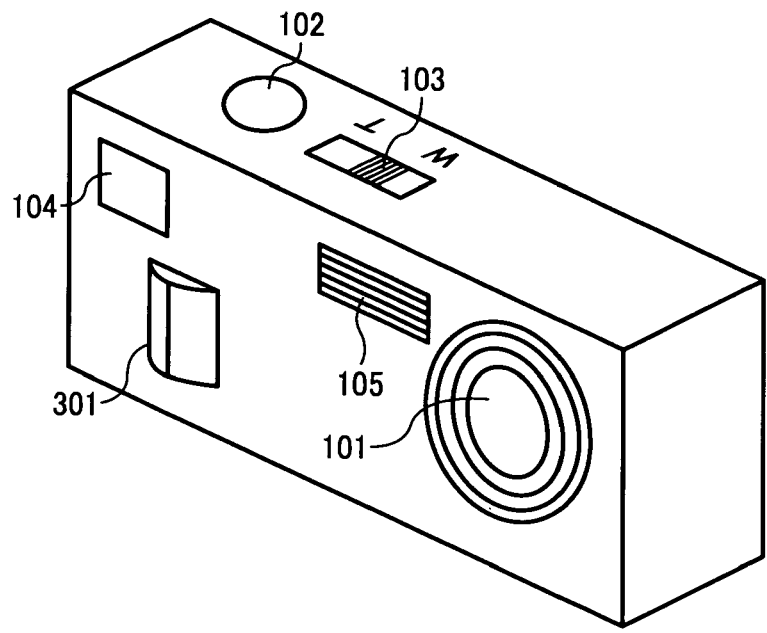
FIG. 17A is a perspective view schematically showing an external appearance configuration in a state where an image-taking lens of a camera according to a first embodiment of the present invention is collapsed and housed inside a body of the camera, when viewed from the object's side.
Figure 18:
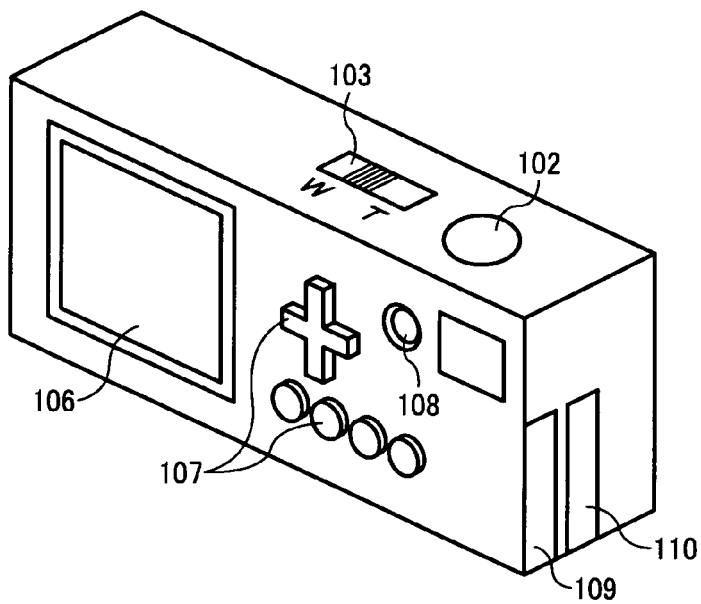
FIG. 18 is a perspective view schematically showing an external appearance configuration of the camera in FIG. 17A, when viewed from a photographer's side.
Figure 19:
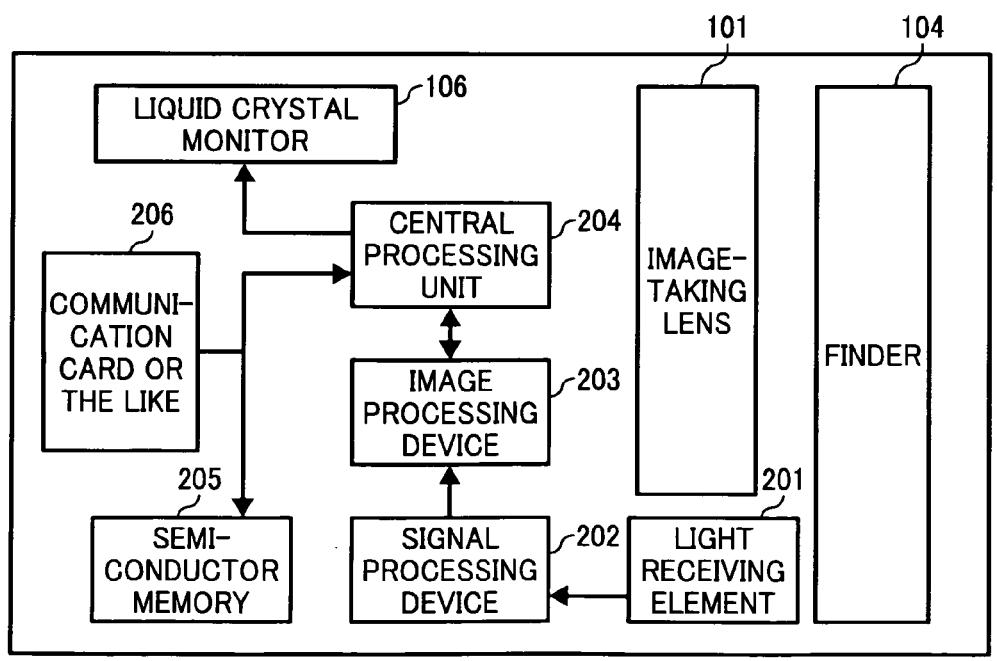
FIG. 19 is a block diagram schematically showing functional configurations of the camera according to the first embodiment.

FIGS. 17A and 173 are perspective views showing external appearance of a digital camera, which is viewed from a front side, i.e. the object's side, FIG. 18 is a perspective view showing the external appearance of the digital camera, which is viewed from a back side, i.e. a photographer's side. FIG. 19 is a block diagram showing functional configurations of the digital camera. Although the digital camera (an example of the camera) is described herein, products that combine camera functions with portable information terminal devices including personal data assistants (PDA), cellular telephones, for example, and products that combine camera functions with image input devices have been released to the market in recent years.

Many of those portable information terminal devices or image input devices may have different external appearance but in fact include virtually the same functions and configurations as those of cameras and digital cameras. Accordingly, the optical device including the lens barrel of the present invention is also applicable to such a portable information terminal device or an image input device.

As shown in FIG. 17A to FIG. 18, the camera includes an image-taking lens 101, a shutter button 102, a zoom lever 103, a finder 104, a flash lamp 105, a liquid crystal monitor 106, operating buttons 107, a power switch 108, a memory card slot 109, a communication card slot 110, a barrier operating portion 301, and the like. Moreover, as shown in FIG. 19, the camera also includes a light receiving element 201, a signal processing device 202, an image processing device 203, a central processing unit (CPU) 204, a semiconductor memory 205, a communication card 206, and so forth. In addition, although it is not clearly illustrated in the drawings, these constituents receive electric supply from a battery as a driving power source and are thereby operated.

The camera includes the image-taking lens 101 and the light receiving element 201 which functions as an area sensor for the CCD (charge-coupled device) imaging shooting element or the like. An image of an object targeted for image-taking, i.e. a photographic subject, to be formed by the image-taking lens 101 functioning as an image-taking optical system is captured by the light receiving element 201. The image-taking lens 101 applies the optical device including the lens barrel according to the present invention which has been described above in the embodiment. To be more precise, the optical device is formed by use of the lenses and the like which are the optical elements constituting the lens barrel. The lens barrel includes a mechanism configured to hold the respective lenses and the like so as to be able to move and operate the lens groups independently. Normally, the image-taking lens 101 to be included in the camera is incorporated in the form of this optical device.

An output from the light receiving element 201 is processed by the signal processing device 202 which is controlled by the central processing unit 204 and is thereby converted into digital image information. The image information digitalized by the signal processing device 202 is subjected to a given imaging process by the image processing device 203 which is also controlled by the central processing unit 204, and is then stored in the semiconductor memory 205 such as a non-volatile memory. In this case, the semiconductor memory 205 may be a memory card inserted into the memory card slot 109 or may be a semiconductor memory incorporated in a camera body. The liquid crystal monitor 206 is able to display an image subject to shooting and to display images stored in the semiconductor memory 205. Moreover, it is possible to transmit the images stored in the semiconductor memory 205 to the outside with the communication card or the like 206 which is inserted into the communication card slot 110. Here, the central processing unit 501 shown in FIG. 21, which is configured to perform the above-described driving control of the respective lenses, may be included in the central processing unit 204. Alternatively, it is possible to form the central processing unit 501 by use of another microprocessor linked with the central processing unit 204.

Figure 17B:
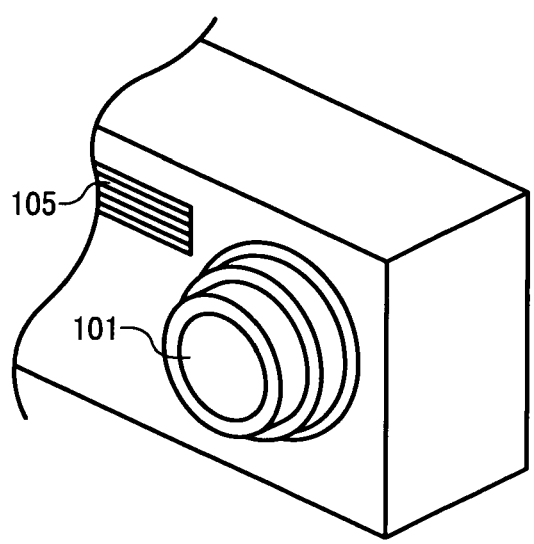
FIG. 17B is a perspective view schematically showing an external appearance configuration in a state where the image-taking lens of the camera according to the first embodiment of the present invention sticks out of the body of the camera, when viewed from the object's side.

The image-taking lens 101 is set to the collapsed state as shown in FIG. 17A when carrying the camera. Here, the image-taking lens 101 is buried in the camera body and the lens barrier 62 is closed. The power is turned on when a user operates the barrier operating portion 301 to open the lens barrier 62. Then, the lens barrel is extended as shown in FIG. 17B and is protruded from the camera body, thereby establishing the image-taking state. At this time, inside the lens barrel of the image-taking lens 101, the optical systems of the respective groups constituting the zoom lens are disposed in the wide-angle positions, for example. The layouts of the optical systems of the respective groups are modified by operating the zoom lever 103. In this way, it is possible to perform an operation to change the magnification to a telephotographic end.

Here, it is preferable to form an optical system of the finder 104 to change the magnification in liaison with a change in a field angle of the image-taking lens 101.

In many cases, a focusing operation is achieved by pressing the shutter button 102 halfway. The focusing operation using the zoom lens according to the present invention can be executed mainly by moving the fourth lens group 14. An image is shot by fully pressing the shutter button 102, and the above-described processes are carried out thereafter.

When the image stored in the semiconductor memory 206 is displayed on the liquid crystal monitor 106 or transmitted to the outside with the communication card 206 and the like, the operating buttons 107 are operated as prescribed. The semiconductor card 205, the communication card 206, and the like are used by inserting dedicated or universal slots including the memory card slot 109 and the communication card slot 110, for example.

Here, when the image-taking lens 101 is in the collapsed state, the third lens group 13 retracts from the optical axis and is housed in parallel to the first lens group 11 and the second lens group 12. Accordingly, it is possible to further reduce the thickness of the camera.

A finder mechanism is usually located on an upper side of the lens barrel portions to facilitate camera operations. Moreover, when the lens barrel includes a zoom magnification change mechanism, the finder mechanism also requires a zoom magnification change mechanism. Accordingly, it is desirable to dispose driving sources (the DC motor, the pulse motors, and the like) for achieving a zoom magnification change operation and a transmission mechanism (such as a gear link mechanism) for transmitting the driving forces thereof very close to the finder mechanism. For example, when the finder mechanism is disposed on an upper left side of the lens barrel, the driving source for magnification change and the transmission mechanism may be disposed on an upper right side of the lens barrel so as to make effective use of a limited space. Next, at the time of recession of the retracting lens holder frame to the remaining space, the retracting lens holder frame is naturally allowed to retract to a space below the lens barrel (either a lower right side or a lower left side of the lens barrel). In this embodiment, a space for the retracting lens holder frame is secured on the lower right side of the lens barrel. Meanwhile, a driving source and a drive mechanism for driving a group of focusing lenses are disposed on the lower left side of the lens barrel. Accordingly, it is possible to downsize the lens barrel by effectively using the four corners, namely, the upper left side, the upper right side, the lower right side, and the lower left side of the lens barrel having a normal circular shape.

Figure 29:
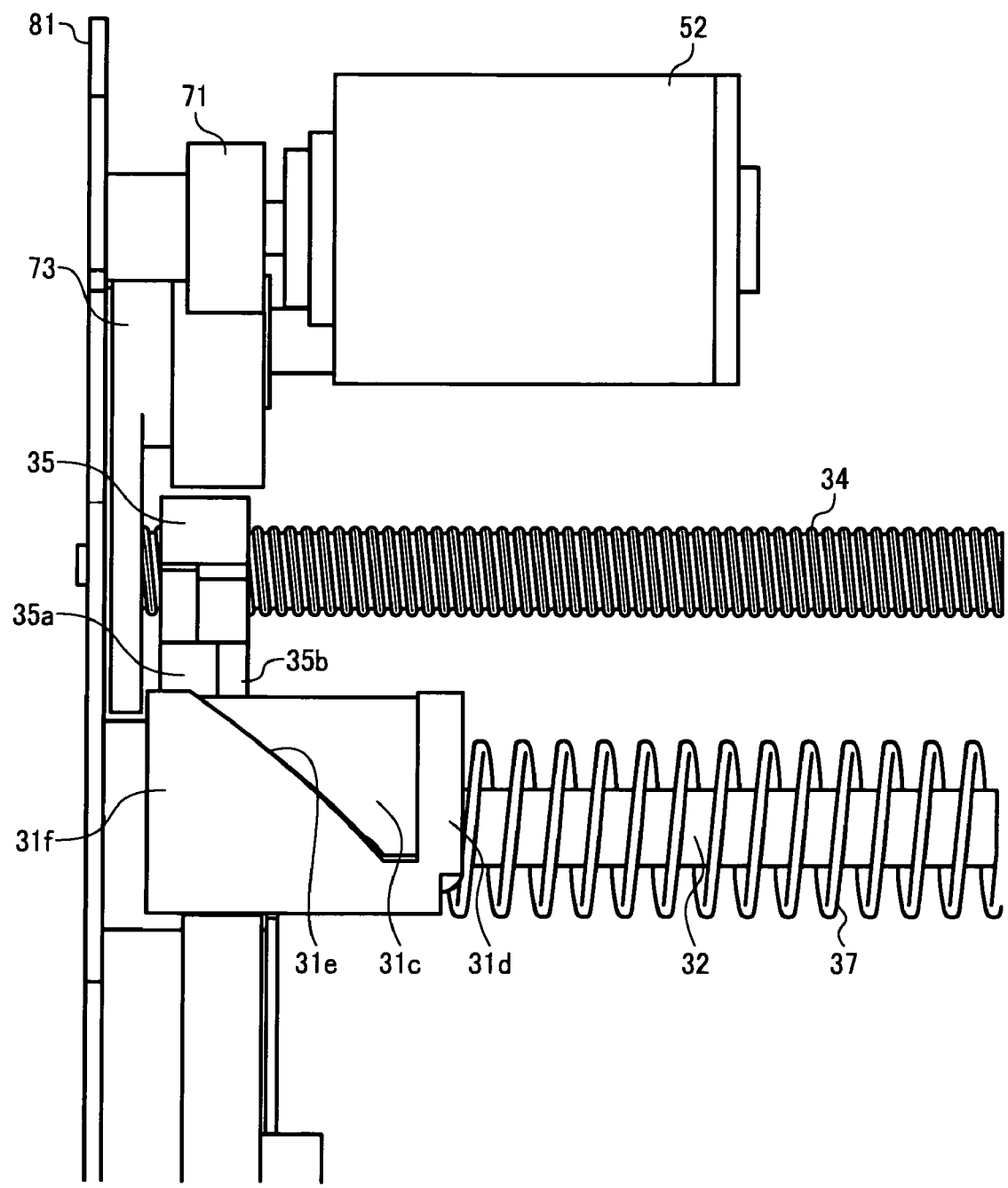
FIG. 29 is an enlarged view of FIG. 14A to clarify the main portions of the first embodiment.

Next, characteristic features of the first embodiment will be described with reference to FIG. 29. FIG. 29 is an enlarged view of FIG. 14A to clarify main portions of the first embodiment.

Figure 30:
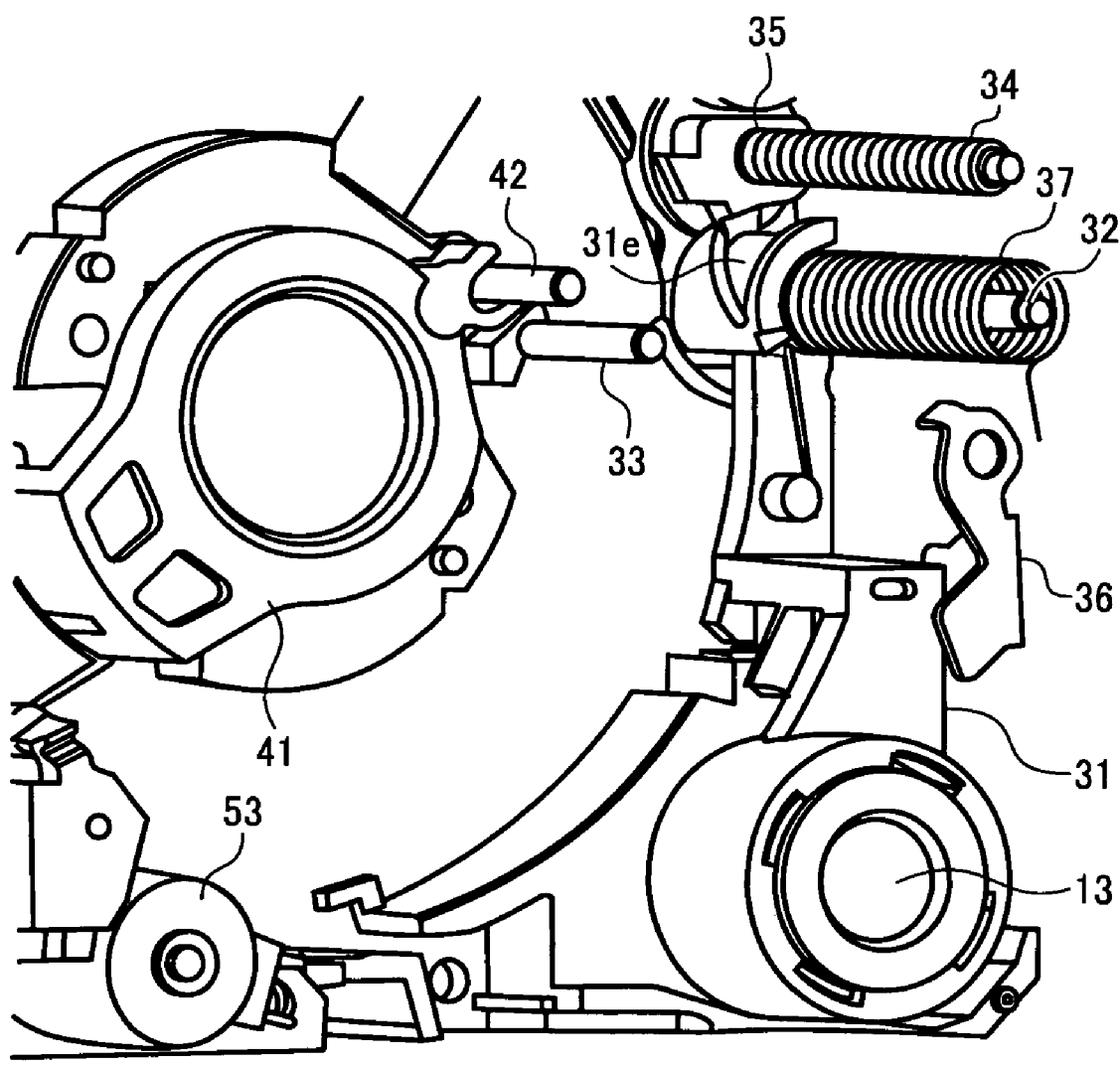
FIG. 30 is a perspective view of FIG. 29.

In the first embodiment, the contact portion 35a of the third group female screw member 35 (a retracting lens holder frame driving member) to be driven by rotation of the third group lead screw 34 is provided with the protrusion 35b (a stopper) that protrudes toward the cam portion 31e of the stepped portion 31c formed on the third lens holder frame 31. In this way, it is possible to prevent the third group female screw member 35 located in the stop position (the housed position) from moving leftwards from the position shown in FIG. 29. In other words, the contact portion 35a and the protrusion 35b collectively form an inversed L-shape (see FIGS. 31A to 31C), and the contact portion 35a functions as a retainer in the housed position by use of the bent cam shape. FIG. 30 is a perspective view of FIG. 29.

Operations of the first embodiment will be described with reference to a schematic diagram shown in FIGS. 31A to 31C.

Figure 31A:
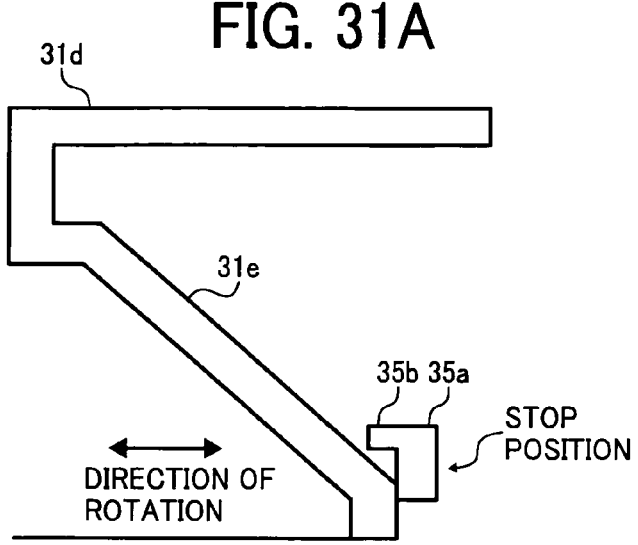
Figure 31B:
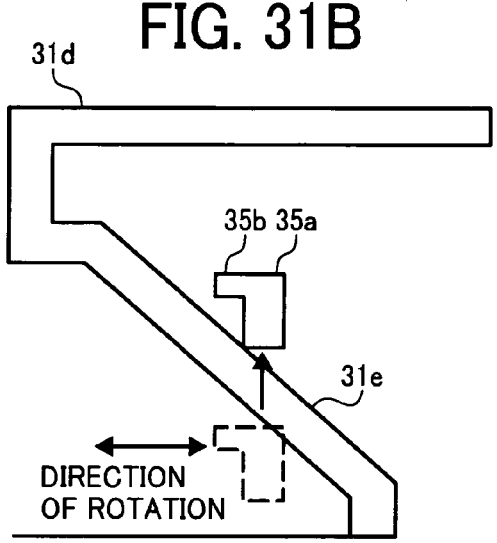
Figure 31C:
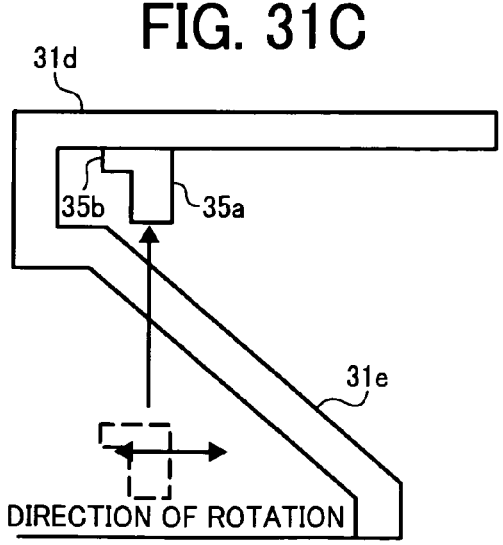

Here, rotation of the cam is shown as movement in a horizontal direction and the driving of the contact portion 35a inclusive of the protrusion 35b of the third group female screw member 35 shown in FIGS. 31A to 31C is shown as movement in a vertical direction.

FIG. 31A shows the stop position in the first embodiment, in which the contact portion 35a inclusive of the protrusion 35b of the third group female screw member 35 (the retracting lens holder frame driving member) is located in the stopped position.

FIG. 31B shows the position in the course of movement on the cam in the first embodiment, in which the contact portion 35a inclusive of the protrusion 35b of the third group female screw member 35 (the retracting lens holder frame driving member) is moved upward to the center of the cam portion 31e and the third lens holder frame 31 is moved rightwards, which means that the third group female screw member 35 is rotating.

FIG. 31C shows the position when rotation of the cam is completed in the first embodiment, in which the contact portion 35a inclusive of the protrusion 36b of the third group female screw member 35 (the retracting lens holder frame driving member) is moved further upward. The cam changes its movement to the vertical direction from this point. The third lens holder frame 31 is moved further rightwards as compared to FIG. 31B, which means that rotation of the third group female screw member 35 is completed.

Therefore, in the first embodiment, the stop position of the third group female screw member 35 is restricted within a housing region attributable to the cam shape shown in FIG. 31A to FIG. 31C. Accordingly, it is possible to reduce malfunction of the third lens holder frame 31 functioning as the retracting lens holder frame in the event of drop impact or the like.

Concerning the stop position of the contact portion 35a inclusive of the protrusion 35b of the third group female screw member 35 in this first embodiment, it is also possible to stop the contact portion 35a inclusive of the protrusion 35b in the housed position so as not to move on the cam based on the position detection by the third group photo interrupter 38 functioning as position detecting means. In this case, it is possible to stop the contact portion 35a stably in the housed portion. Accordingly, it is possible to reduce malfunction of the third lens holder frame 31 functioning as the retracting lens holder frame in the event of drop impact or the like.

Next, a second embodiment will be described with reference to FIGS. 32A and 32B.

In the second embodiment, a protrusion 81a (rotation controlling means) for controlling rotation of the third lens holder frame is provided in addition to the configuration of the first embodiment.

Figure 32A:
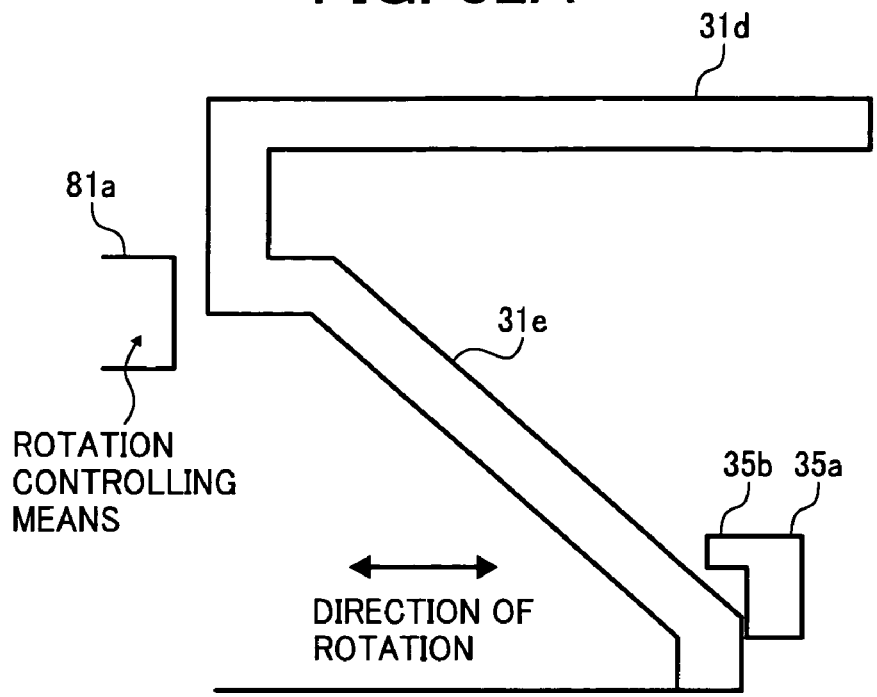
Figure 32B:
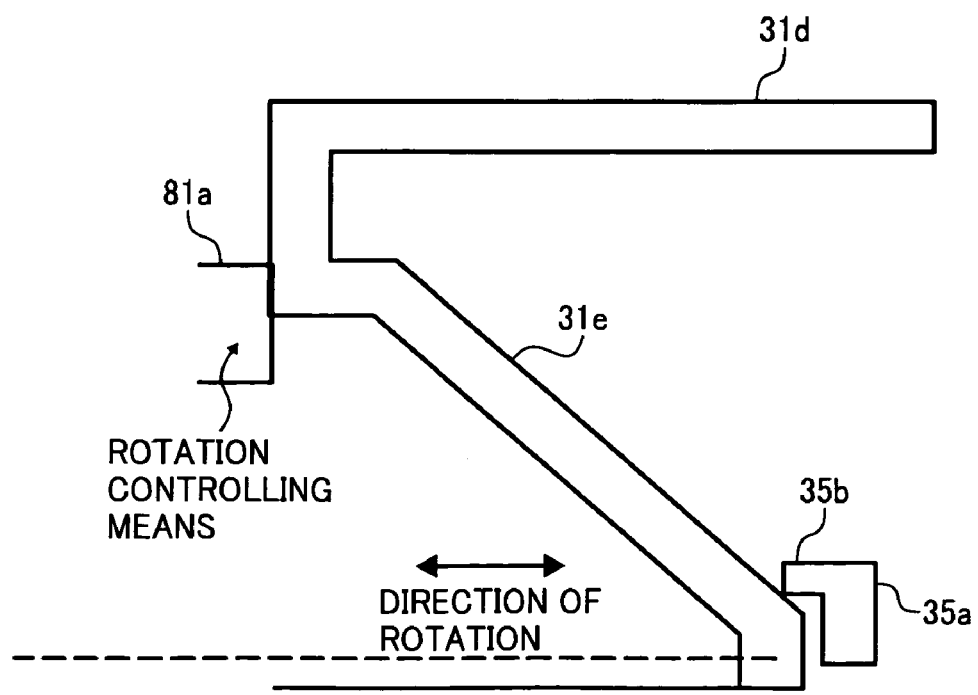

Therefore, even when the contact portion 35a inclusive of the protrusion 35b of the third group female screw member 35 attempts to move from the housed position of the third lens holder frame 31 shown in FIG. 32A, the third frame holder frame 31 cannot move leftwards as shown in FIG. 32B because of the protrusion 81a provided as the rotation controlling means. Accordingly, downward movement of the contact portion 35a inclusive of the protrusion 35b of the third group female screw member 35 is limited to a position indicated with a dotted line in FIG. 32B and the contact portion 35a inclusive of the protrusion 35b never rides on the cam.

As described above, according to the second embodiment, the contact portion 35a inclusive of the protrusion 35b is surely prevented from coming off from the cam by use of the protrusion 81a for controlling rotation of the third lens holder frame 31. Therefore, it is possible to drive the third lens holder frame 31 functioning as the retracting lens holder frame in the event of drop impact or the like.

A lens barrel according to the present invention, a camera including the lens barrel and a digital camera including the lens barrel have been described above based on the first and second embodiments. However, the concrete structure of the lens barrel according to the present invention will not be limited only to these embodiments.

For example, in the first and second embodiments, the stopper to be provided on the retracting lens holder frame driving member is formed into the inversed L-shape by use of the contact portion and the protrusion. However, the concrete shape of the stopper is not limited only to this shape and various design changes are acceptable. After all, the retracting lens holder frame driving member needs only to have the stopper to stop the movement of the retracting lens holder frame driving member, as exceeding the cam-shaped housing region, beyond the cam of the retracting lens holder frame.

For example, the present invention is also applicable to a portable information terminal device incorporating a camera function or to an image input device incorporating a camera function by adopting the optical device including the lens barrel described in the first or second embodiment as an image-taking optical system thereof.

As described above, according to the lens barrel, the camera, the digital camera, the portable information terminal device, and the image input device of the present invention, it is possible to exert an effect to reduce malfunction of the retracting lens holder frame in the event of drop impact or the like. This effect is achieved by providing the lens barrel that includes: a main lens group holder driving unit capable of holding and driving a main lens group having at least one lens; and a sub lens group holder driving unit, which is fitted to the main lens group holder driving unit, and which is capable of holding and driving a sub lens group having at least one lens that forms an image-taking optical system together with the main lens group held by the main lens group holder driving unit. Here, the lens barrel is configured to avoid deviation of a retracting lens holder frame and a retracting lens holder frame driving member from regular positions, and by providing the camera, the portable information terminal, and the image input device applying this lens barrel, the above-mentioned effect is achieved.

Although the present invention has been described in its preferred form with a certain degree of particularity, obviously many changes and variations are possible therein. It is therefore to be understood that the present invention may be practiced otherwise than as specified herein without departing from the scope and spirit thereof.

What is claimed is:

1. A lens barrel configured to change, from a collapsed state established by retracting at least part of multiple lens groups so as to house the lens groups into a main body, to an image-taking state by moving at least part of the lens groups toward an object, the lens barrel comprising:
   a retracting lens formed of at least one of the lens groups, located on the same optical axis as an optical axis of the rest of the lens groups in an image-taking state, and configured to retract to a housed position outside an inner diameter of the lens barrel in a collapsed state;
   a retracting lens holder frame configured to hold and move the retracting lens;
   a cam portion formed on the retracting lens holder frame; and
   a retracting lens holder frame driving member configured to drive the retracting lens holder frame held inside the lens barrel by contacting the cam portion,
   the cam portion having a cam shape so as to drive the retracting lens to an image-taking position and to the housed position by utilizing the retracting lens holder frame driving member, and
   wherein the retracting lens holder frame driving member includes a contact portion configured to contact the cam portion and a stopper protruding from the contact portion toward the cam portion and configured to prevent the retracting lens holder frame driving member from exceeding a housing region in the cam shape and from moving outside the cam portion on the retracting lens holder frame.

2. The lens barrel according to claim 1, wherein the stopper controls a stop position of the retracting lens holder frame driving member so that the stop position is the housed position in the cam shape.

3. The lens barrel according to claim 2, further comprising: a position detecting device configured to detect a position of the retracting lens holder frame, wherein the stopper controls the stop position of the retracting lens holder frame driving member so that the stop position is the housed position in the cam shape on the basis of position detection.

4. The lens barrel according to claim 2, further comprising: a rotational direction control mechanism along a rotational direction of the retracting lens holder frame, wherein the stopper controls a rotational direction so that the stop position of the retracting lens holder frame driving member is the housed position in the cam shape.

5. A camera provided with a lens barrel configured to change, from a collapsed state established by retracting at least one of multiple lens groups so as to house the lens groups into a main body, to an image-taking state by moving the at least one of the lens groups toward an object, the camera comprising:
   a retracting lens formed of the at least one of the lens groups, located on the same optical axis as an optical axis of the rest of the lens groups in an image-taking state, and configured to retract to a housed position outside an inner diameter of the lens barrel in a collapsed state;
   a retracting lens holder frame configured to hold and move the retracting lens;
   a cam portion formed on the retracting lens holder frame; and
   a retracting lens holder frame driving member configured to drive the retracting lens holder frame held inside the lens barrel by contacting the cam portion,
   the cam portion having a cam shape so as to drive the retracting lens to an image-taking position and to the housed position by utilizing the retracting lens holder frame driving member, and
   wherein the retracting lens holder frame driving member includes a contact portion configured to contact the cam portion and a stopper protruding from the contact portion toward the cam portion and configured to prevent the retracting lens holder frame driving member from exceeding a housing region in the cam shape and from moving outside the cam portion on the retracting lens holder frame.

6. A digital camera provided with a lens barrel configured to change, from a collapsed state established by retracting at least one of multiple lens groups so as to house the lens groups into a main body, to an image-taking state by moving the at least one of the lens groups toward an object, the digital camera comprising:

a retracting lens formed of at least one of the lens groups, located on the same optical axis as an optical axis of the rest of the lens groups in an image-taking state, and configured to retract to a housed position outside an inner diameter of the lens barrel in a collapsed state;

a retracting lens holder frame configured to hold and move the retracting lens;

a cam portion formed on the retracting lens holder frame; and a retracting lens holder frame driving member configured to drive the retracting lens holder frame held inside the lens barrel by contacting the cam portion, the cam portion having a cam shape so as to drive the retracting lens to an image-taking position and to the housed position by utilizing the retracting lens holder frame driving member, and wherein the retracting lens holder frame driving member includes a contact portion configured to contact the cam notion and a stopper protruding from the contact portion toward the cam portion and configured to prevent the retracting lens holder frame driving member from exceeding a housing region in the cam shape and from moving outside the cam portion on the retracting lens holder frame.

7. A portable information terminal device provided with a lens barrel configured to change, from a collapsed state established by retracting at least part of multiple lens groups so as to house the lens groups into a main body, to an image-taking state by moving at least part of the lens groups toward an object, the portable information terminal device comprising:

a retracting lens formed of at least one of the lens groups, located on the same optical axis as an optical axis of the rest of the lens groups in an image-taking state, and configured to retract to a housed position outside an inner diameter of the lens barrel in a collapsed state;

a retracting lens holder frame configured to hold and move the retracting lens;

a cam portion formed on the retracting lens holder frame; and a retracting lens holder frame driving member configured to drive the retracting lens holder frame held inside the lens barrel by contacting the cam portion, the cam portion having a cam shape so as to drive the retracting lens to an image-taking position and to the housed position by utilizing the retracting lens holder frame driving member, and wherein the retracting lens holder frame driving member includes a contact portion configured to contact the cam portion and a stopper protruding from the contact portion toward the cam portion and configured to prevent the retracting lens holder frame driving member from exceeding a housing region in the cam shape and from moving outside the cam portion on the retracting lens holder frame.

8. An image input device provided with a lens barrel configured to change, from a collapsed state established by retracting the at least one of multiple lens groups so as to house the lens groups into a main body, to an image-taking state by moving the at least one of the lens groups toward an object, the image input device comprising:

a retracting lens formed of at least one of the lens groups, located on the same optical axis as an optical axis of the rest of the lens groups in an image-taking state, and configured to retract to a housed position outside an inner diameter of the lens barrel in a collapsed state;

a retracting lens holder frame configured to hold and move the retracting lens;

a cam portion formed on the retracting lens holder frame; and a retracting lens holder frame driving member configured to drive the retracting lens holder frame held inside the lens barrel by contacting the cam portion, the cam portion having a cam shape so as to drive the retracting lens to an image-taking position and to the housed position by utilizing the retracting lens holder frame driving member, and wherein the retracting lens holder frame driving member includes a contact portion configured to contact the cam portion and a stopper protruding from the contact portion toward the cam portion and configured to prevent the retracting lens holder frame driving member from exceeding a housing region in the cam shape and from moving outside the cam portion on the retracting lens holder frame.

* * * * *